United States Patent
Motoyama et al.

(10) Patent No.: US 9,972,812 B1
(45) Date of Patent: May 15, 2018

(54) BATTERY AND CONNECTION APPARATUS

(71) Applicant: Sony Corporation, Tokyo (JP)

(72) Inventors: Shigeki Motoyama, Kanagawa (JP); Atsushi Mitani, Kanagawa (JP); Atsuhiro Kumagai, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days. days.

(21) Appl. No.: 15/468,503

(22) Filed: Mar. 24, 2017

(30) Foreign Application Priority Data

Feb. 10, 2017 (JP) ................. 2017-023420

(51) Int. Cl.
*H01M 2/06* (2006.01)
*H01M 2/10* (2006.01)
*H01M 2/20* (2006.01)

(52) U.S. Cl.
CPC ........... *H01M 2/1055* (2013.01); *H01M 2/06* (2013.01); *H01M 2/202* (2013.01); *H01M 2/204* (2013.01); *H01M 2220/30* (2013.01)

(58) Field of Classification Search
CPC ...... H01M 2/1055; H01M 2/06; H01M 2/202; H01M 2/204
See application file for complete search history.

(56) References Cited

U.S. PATENT DOCUMENTS

| | | | |
|---|---|---|---|
| 5,415,947 A | 5/1995 | Mitsui et al. | |
| 5,437,938 A | 8/1995 | Mitsui et al. | |
| 5,672,441 A | 9/1997 | Aoki et al. | |
| 5,805,069 A | 9/1998 | Mitsui et al. | |
| 2002/0034683 A1 | 3/2002 | Takeshita et al. | |
| 2004/0058231 A1 | 3/2004 | Takeshita et al. | |
| 2006/0068280 A1 | 3/2006 | Takeshita et al. | |
| 2007/0154800 A1 | 7/2007 | Takeshita et al. | |
| 2008/0050650 A1 | 2/2008 | Hara et al. | |
| 2010/0248004 A1* | 9/2010 | Takeshita | H01M 2/1055 429/156 |
| 2012/0045667 A1* | 2/2012 | Yoneda | H01M 2/1055 429/7 |
| 2012/0148912 A1 | 6/2012 | Hara et al. | |

(Continued)

FOREIGN PATENT DOCUMENTS

EP 1829135 A2 9/2007
JP H08-203495 A 8/1996
(Continued)

OTHER PUBLICATIONS

Machine Translation of JP 2007172981 A.*
(Continued)

*Primary Examiner* — Jonathan G Jelsma
(74) *Attorney, Agent, or Firm* — Michael Best & Friedrich LLP

(57) ABSTRACT

A battery includes: a casing that includes a plurality of exterior faces having outer faces facing mutually-different directions and has an arrangement concave part formed; a cell that is housed inside the casing; and a connector that includes a connection terminal connected to an electrode terminal of a connection apparatus and is arranged in the arrangement concave part, in which a face forming the arrangement concave part of the casing is formed as a concave part forming face, and the concave part forming face is present between the exterior faces and the connector.

13 Claims, 40 Drawing Sheets

(56) References Cited

U.S. PATENT DOCUMENTS

| | | | | |
|---|---|---|---|---|
| 2013/0330576 A1* | 12/2013 | Kolden | ............... | H01M 10/425 |
| | | | | 429/7 |
| 2014/0093750 A1 | 4/2014 | Yang et al. | | |
| 2015/0214520 A1* | 7/2015 | Nishikawa | ................ | B25F 5/02 |
| | | | | 429/100 |

FOREIGN PATENT DOCUMENTS

| | | | | | |
|---|---|---|---|---|---|
| JP | 2001-102017 | A | | 4/2001 | |
| JP | 2001-266824 | A | | 9/2001 | |
| JP | 2006-179217 | A | | 7/2006 | |
| JP | 2007172981 | A | * | 7/2007 | .......... H01M 2/1055 |
| JP | 2014-216284 | A | | 11/2014 | |
| JP | 2016-149369 | A | | 8/2016 | |
| WO | WO-2006/067919 | A2 | | 6/2006 | |

OTHER PUBLICATIONS

Japanese Office Action dated May 16, 2017 for corresponding Japanese Application No. 2017-023420.
Extended European Search Report dated Sep. 6, 2017 for corresponding European Application No. 17164837.1.
International Search Report PCT/ISA/220 for PCT/JP2017/036367 dated Dec. 12, 2017.

\* cited by examiner

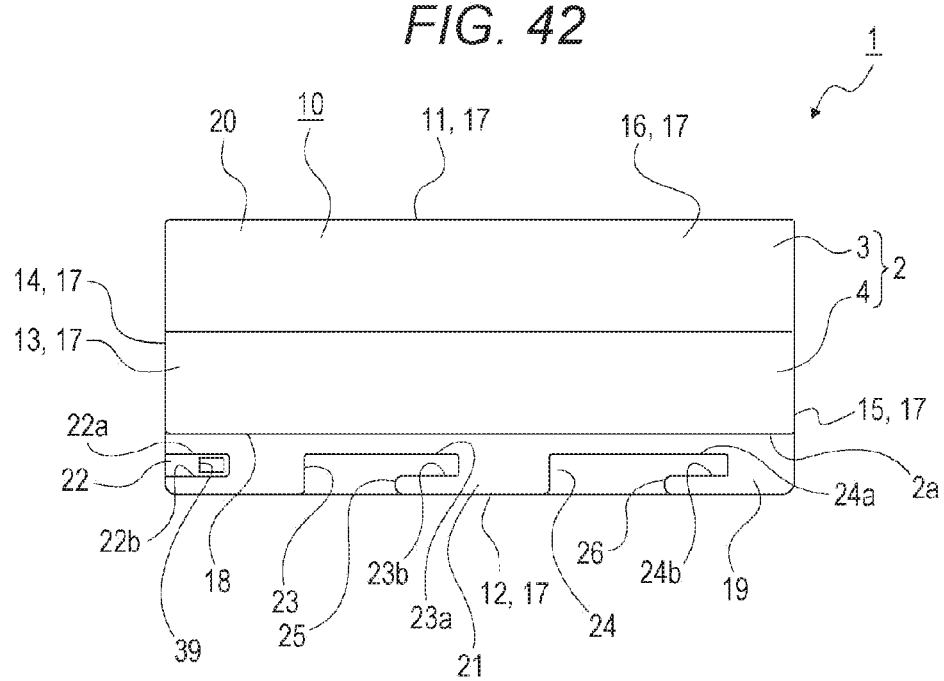
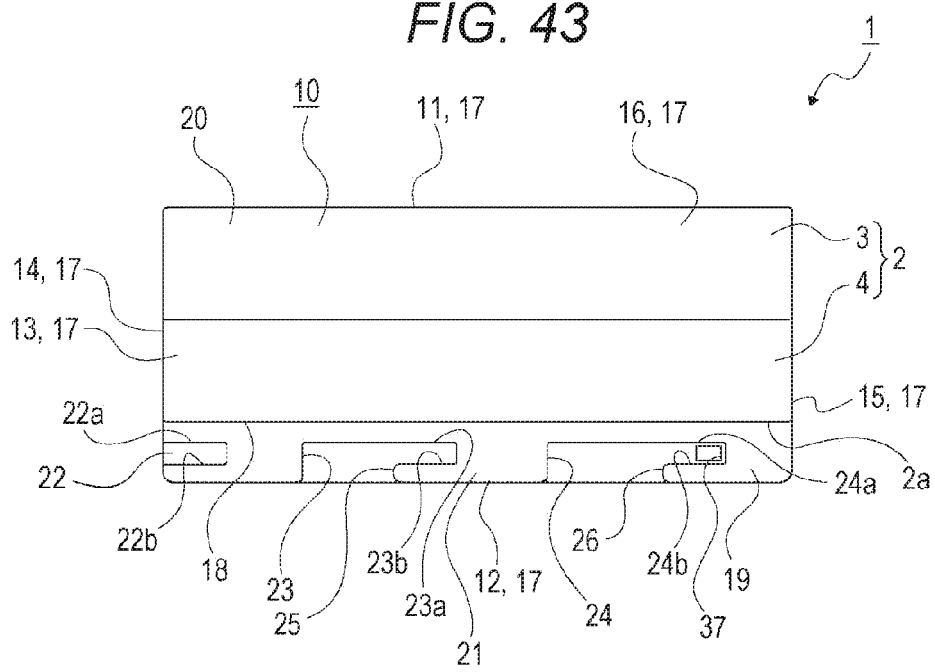

FIG. 46
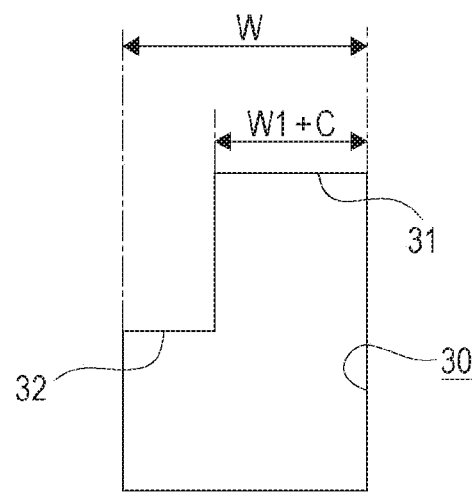
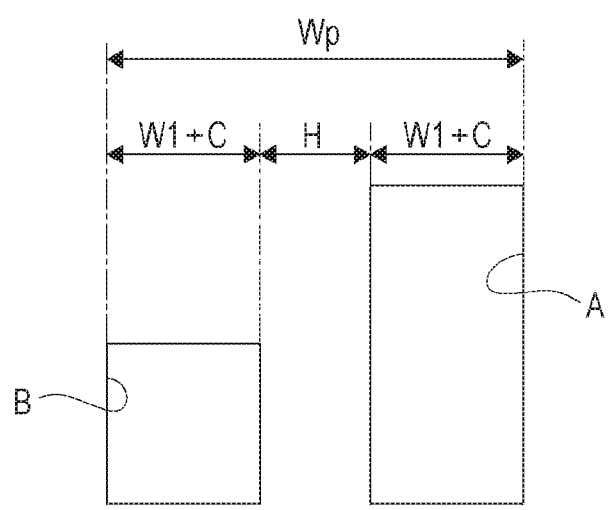

FIG. 54

| CONNECTION APPARATUS \ BATTERY | LOW POWER CAMERA | MIDDLE POWER CAMERA | HIGH POWER CAMERA | CHARGER |
|---|---|---|---|---|
| LARGE CAPACITY BATTERY | Y | Y | Y | Y |
| MIDDLE CAPACITY BATTERY | Y | Y | N | Y |
| SMALL CAPACITY BATTERY | Y | N | N | Y |

BATTERY AND CONNECTION APPARATUS

CROSS REFERENCE TO RELATED APPLICATIONS

This application claims the benefit of Japanese Priority Patent Application JP 2017-023420 filed on Feb. 10, 2017, the entire contents of which are incorporated herein by reference.

TECHNICAL FIELD

The present technology relates to a technical field of a battery having a charging function and a connection apparatus to which the battery is connected.

BACKGROUND ART

Among various electronic apparatuses including imaging apparatuses such as a still camera and a camcorder, there are electronic apparatuses that can be operated by the power of a battery. A battery is charged, for example, by being mounted in a charger and is mounted in a battery mounting unit of an electronic apparatus in a charged state. Such a charger or an electronic apparatus functions as a connection apparatus so as to be connected to the battery.

In the battery described as above, connection terminals including a positive electrode terminal and a negative electrode terminal are arranged, and electrode terminals of a charger or electrode terminals arranged in a battery mounting unit are connected to the connection terminals, and charging of the battery or the supply of power from the battery to an electronic apparatus is performed (for example, see PTL 1).

A battery disclosed PTL 1 includes a casing having an approximately rectangular parallelepiped shape, cells housed inside the casing, and connection terminals electrically connected to the cells, and the connection terminals are arranged at one end in the longitudinal direction of the casing.

CITATION LIST

Patent Literature

[PTL 1]
JP 2015-92511 A

SUMMARY

Technical Problem

Meanwhile a battery is attached/detached to/from a charger or a battery mounting unit by a manual operation. Accordingly, at the time of performing an attachment/detachment operation, at the time of holding the battery using a hand, or the like, there is concern that the battery may be erroneously caused to fall. In addition, at the time of performing an attachment/detachment operation or the like, there is concern that the battery may be brought into contact with other structures.

When such a fall or contact of the battery occurs, there is a possibility that the state of a good connection with the connection apparatus is not secured due to damage or a scratch of a connection terminal.

Therefore, in the present technology, it is preferable to secure the state of a good connection with a connection apparatus by reducing the occurrence of damage or a scratch in a connection terminal.

Solution to Problem

First, a battery according to an embodiment of the present technology includes: a casing that includes a plurality of exterior faces having outer faces facing mutually-different directions and has an arrangement concave part formed; a cell that is housed inside the casing; and a connector that includes a connection terminal connected to an electrode terminal of a connection apparatus and is arranged in the arrangement concave part, wherein a face forming the arrangement concave part of the casing is formed as a concave part forming face, and the concave part forming face is present between the exterior faces and the connector.

Accordingly, at least one end face of the connector is positioned on a further inner side in the casing than the exterior face.

Second, in the above-described battery according to an embodiment of the present technology, it is preferable that the arrangement concave part is open at least in a connection direction of the connection terminal and the electrode terminal, and the concave part forming face is present between the exterior faces and the connector in the connection direction.

In such a case, the connector is positioned on a further inner side in the casing than the exterior face in the connection direction.

Third, in the above-described battery according to an embodiment of the present technology, it is preferable that the arrangement concave part is open in two orthogonal directions, and the concave part forming face is present between the exterior faces and the connector in each of the two directions.

In such a case, the connector is positioned on a further inner side in the casing than the exterior face in the two orthogonal directions.

Fourth, in the above-described battery according to an embodiment of the present technology, it is preferable that a part of the concave part forming face is formed in an inclining face in which an opening area of the arrangement concave part increases as being further spaced apart from the connector in the opening direction of the arrangement concave part.

In such a case, the concave part forming face functions as a guide face at the time of inserting the electrode terminals into the arrangement concave part.

Fifth, in the above-described battery according to an embodiment of the present technology, it is preferable that the concave part forming face includes one pair of wall portions positioned to be spaced apart from each other in a direction orthogonal to the connection direction, and the one pair of wall portions is formed as inclining faces further spaced apart from each other as being further spaced apart from the connector in the connection direction.

In such a case, the one pair of wall portions functions as guide faces at the time of inserting the electrode terminals into the arrangement concave part.

Sixth, in the above-described battery according to an embodiment of the present technology, it is preferable that the concave part forming face includes a middle portion between the one pair of wall portions, and the middle portion is formed in an inclining face in which the opening area of the arrangement concave part increases as being further spaced apart from the connector in the connection direction.

In such a case, the middle portion functions as a guide face at the time of inserting electrode terminals into the arrangement concave part.

Seventh, in the above-described battery according to an embodiment of the present technology, it is preferable that an inclination angle of the concave part forming face with respect to the connection direction is larger than 0 degrees and equal to or smaller than 45 degrees. In such a case, the inclination angle of the concave part forming face functioning as a guide face is an acute angle.

Eighth, a connection apparatus according to an embodiment of the present technology to which a battery is detachably attached, the battery including a casing that includes a plurality of exterior faces having outer faces facing mutually-different directions and has an arrangement concave part formed, a cell that is housed inside the casing, and a connector that includes a connection terminal connected to an electrode terminal and is arranged in the arrangement concave part, wherein, in the battery, a face forming the arrangement concave part of the casing is formed as a concave part forming face, and the concave part forming face is present between the exterior faces and the connector.

In such a case, a battery having at least one end face of the connector positioned on a further inner side in the casing than the exterior face is detachably attached. Ninth, another battery according to an embodiment of the present technology includes: a casing that includes a front portion and a rear portion arranged in a longitudinal direction, a right portion and a left portion arranged between the front portion and the rear portion in a widthwise direction orthogonal to the longitudinal direction, and a top portion and a bottom portion arranged between the front portion and the rear portion and the right portion and the left portion in a height direction orthogonal to both the longitudinal direction and the widthwise direction; a cell that is housed inside the casing; and connection terminals including a positive electrode terminal and a negative electrode terminal that are arranged in a terminal arrangement groove formed on a front end side of the casing and are connected to electrode terminals of a connection apparatus, wherein a front end of at least one of the positive electrode terminal and the negative electrode terminal is positioned on a further rear side than a front end of the front portion.

Accordingly, the front end of at least one of the positive electrode terminal and the negative electrode terminal is positioned on a further inner side in the casing than the front end of the casing.

Tenth, in the above-described another battery according to an embodiment of the present technology, it is preferable that a concave part, in which at least a part of the electrode terminals is arranged, continuous from the terminal arrangement groove is formed in the casing in a state in which the positive electrode terminal and the negative electrode terminal are connected to the electrode terminals, the concave part is open at least in a connection direction of the connection terminals and the electrode terminals, and a concave part forming face forming the concave part is present between an outer face of the casing and the terminal arrangement groove in the connection direction.

In such a case, in the connection direction, at least one of the positive electrode terminal and the negative electrode terminal is positioned on a further inner side in the casing than the front end of the casing.

Eleventh, in the above-described another battery according to an embodiment of the present technology, it is preferable that a concave part, in which at least a part of the electrode terminals is arranged, continuous from the terminal arrangement groove is formed in the casing in a state in which the positive electrode terminal and the negative electrode terminal are connected to the electrode terminals, the concave part is open in two orthogonal directions, and a concave part forming face that is a face forming the concave part is present between an outer face of the casing and the terminal arrangement groove in each of the two directions.

In such a case, in the orthogonal two directions, at least one of the positive electrode terminal and the negative electrode terminal is positioned on a further inner side in the casing than the front end of the casing. Twelfth, in the above-described another battery according to an embodiment of the present technology, it is preferable that a part of the concave part forming face is formed in an inclining face in which an opening area of the concave part increases as being further spaced apart from the terminal arrangement groove in the opening direction of the concave part.

In such a case, the concave part forming face functions as a guide face at the time of inserting electrode terminals into the concave part.

Thirteenth, in the above-described another battery according to an embodiment of the present technology, it is preferable that the concave part forming face includes one pair of wall portions positioned to be spaced apart from each other in a direction orthogonal to the connection direction, and the one pair of wall portions is formed as inclining faces further spaced apart from each other as being further spaced apart from the terminal arrangement groove in the connection direction. In such a case, the one pair of wall portions functions as guide faces at the time of inserting the electrode terminals into the concave part.

Fourteenth, in the above-described another battery according to an embodiment of the present technology, it is preferable that the concave part forming face includes a middle portion between the one pair of wall portions, and the middle portion is formed in an inclining face in which the opening area of the concave part increases as being further spaced apart from the terminal arrangement groove in the connection direction.

In such a case, the middle portion functions as a guide face at the time of inserting electrode terminals into the concave part.

Fifteenth, in the above-described another battery according to an embodiment of the present technology, it is preferable that an inclination angle of the concave part forming face with respect to the connection direction is larger than 0 degrees and equal to or smaller than 45 degrees.

In such a case, the inclination angle of the concave part forming face functioning as a guide face is an acute angle.

Sixteenth, another connection apparatus according to an embodiment of the present technology to which a battery is detachably attached, the battery including a casing that includes a front portion and a rear portion arranged in a longitudinal direction, a right portion and a left portion arranged between the front portion and the rear portion in a widthwise direction orthogonal to the longitudinal direction, and a top portion and a bottom portion arranged between the front portion and the rear portion and the right portion and the left portion in a height direction orthogonal to both the longitudinal direction and the widthwise direction, a cell that is housed inside the casing, and a positive electrode terminal and a negative electrode terminal that are arranged in a terminal arrangement groove formed on a front end side of the casing and are connected to electrode terminals, and, in the battery, a front end of at least one of the positive electrode terminal and the negative electrode terminal is positioned on a further rear side than a front end of the front portion.

Accordingly, a battery having the front end of at least one of the positive electrode terminal and the negative electrode terminal is positioned on a further inner side in the casing than the front end of the casing is detachably attached.

Advantageous Effects of Invention

According to an embodiment of the present technology, since at least one end face of the connector or the connection terminal is positioned on a further inner side in the casing than the exterior face, the occurrence of damage and a scratch in the connection terminal at the time of falling or the like is reduced, and an excellent state of a connection with a connection apparatus can be secured.

In addition, the effects described here are merely examples but are not for the purpose of limiting the effects, and any other effect may be acquired.

BRIEF DESCRIPTION OF DRAWINGS

FIG. 42 is a side view that illustrates an example of a battery in which an engagement concave part is formed to open to a guided groove disposed on the foremost side.

FIG. 43 is a side view that illustrates an example of a battery in which an engagement concave part is formed to open to a guided groove disposed on the rearmost side.

FIG. 46 is a conceptual diagram that illustrates the dimension and the like of an identification groove.

FIG. 54 is a diagram that illustrates the identity of an identification groove.

DESCRIPTION OF EMBODIMENTS

Figure 1:
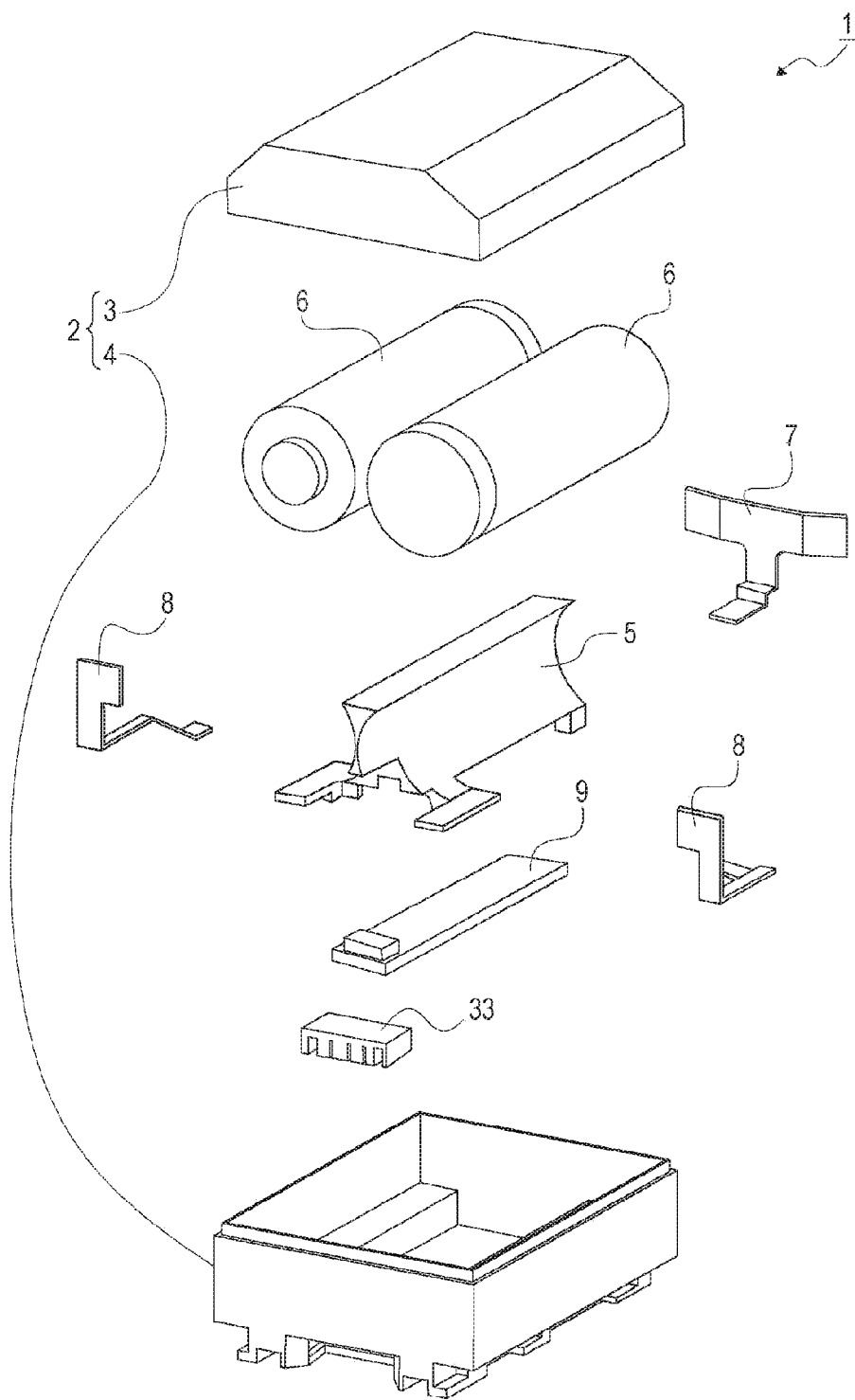
FIG. 1 illustrates a battery and a connection apparatus according to embodiments of the present technology together with FIGS. 2 to 61 and is an exploded perspective view representing the battery.
Figure 2:
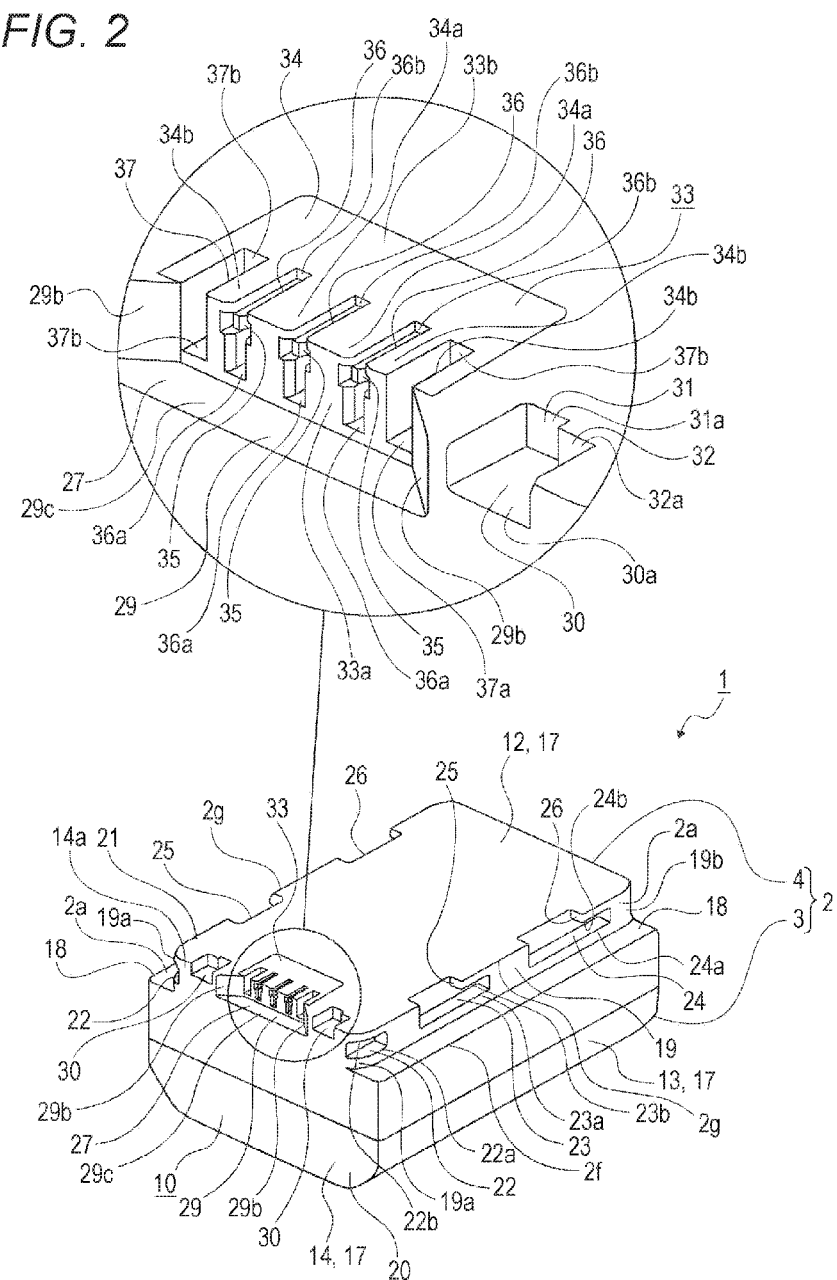
FIG. 2 is a perspective view of the battery.
Figure 3:
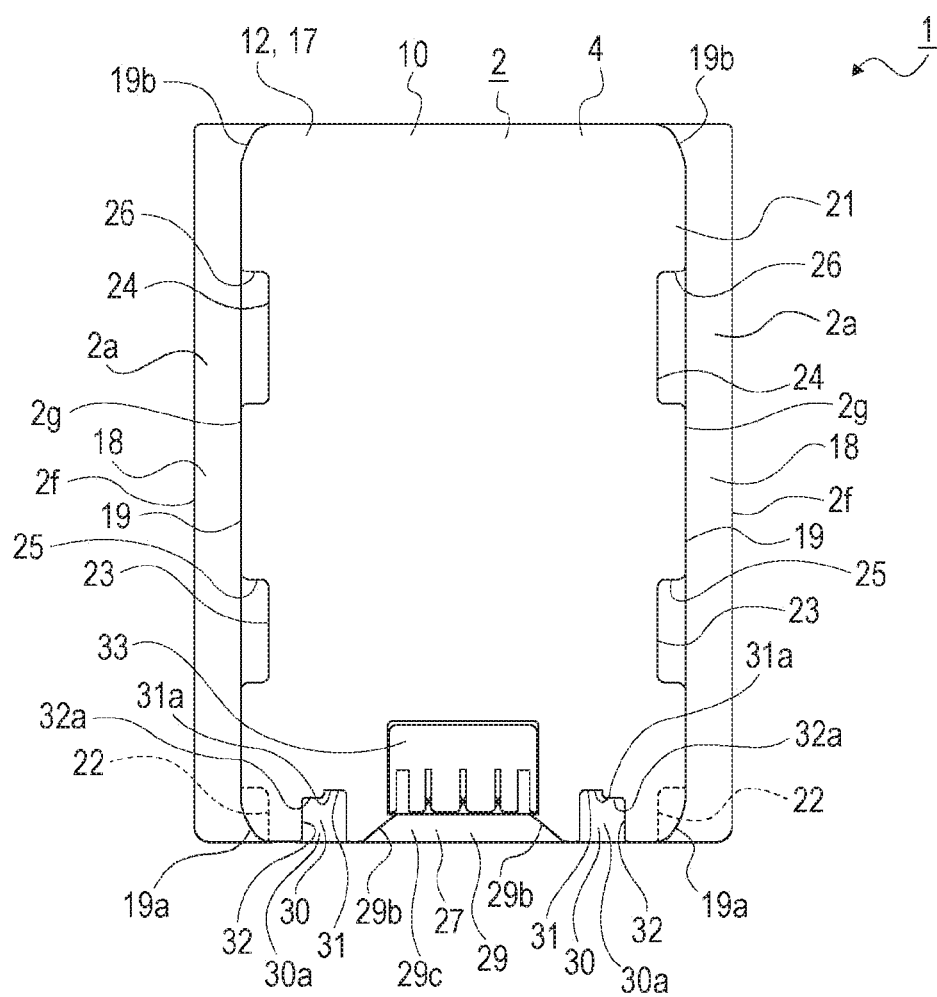
FIG. 3 is a bottom view of the battery.
Figure 4:
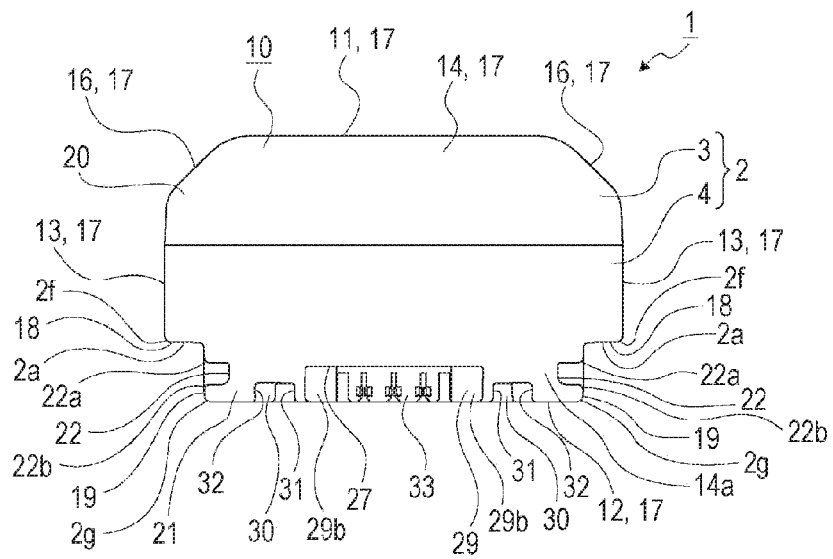
FIG. 4 is a front view of the battery.
Figure 5:
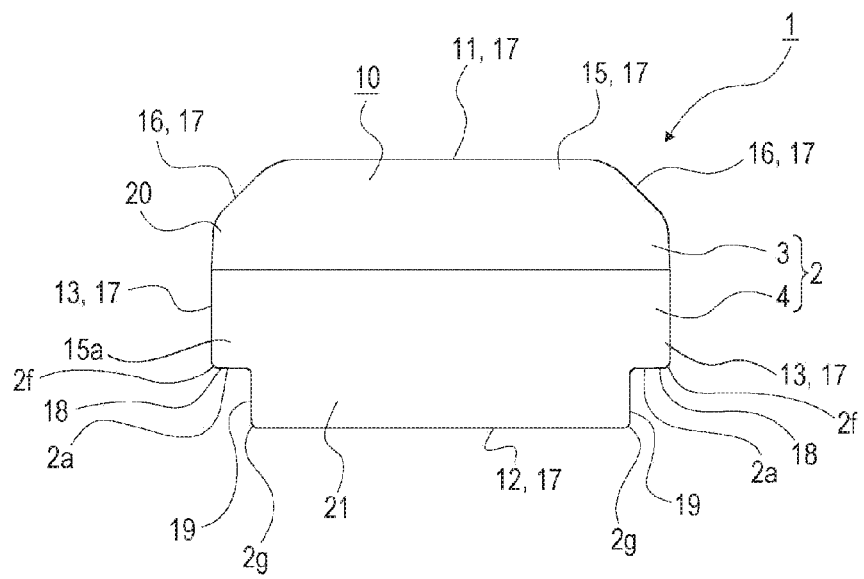
FIG. 5 is a rear view of the battery.
Figure 6:
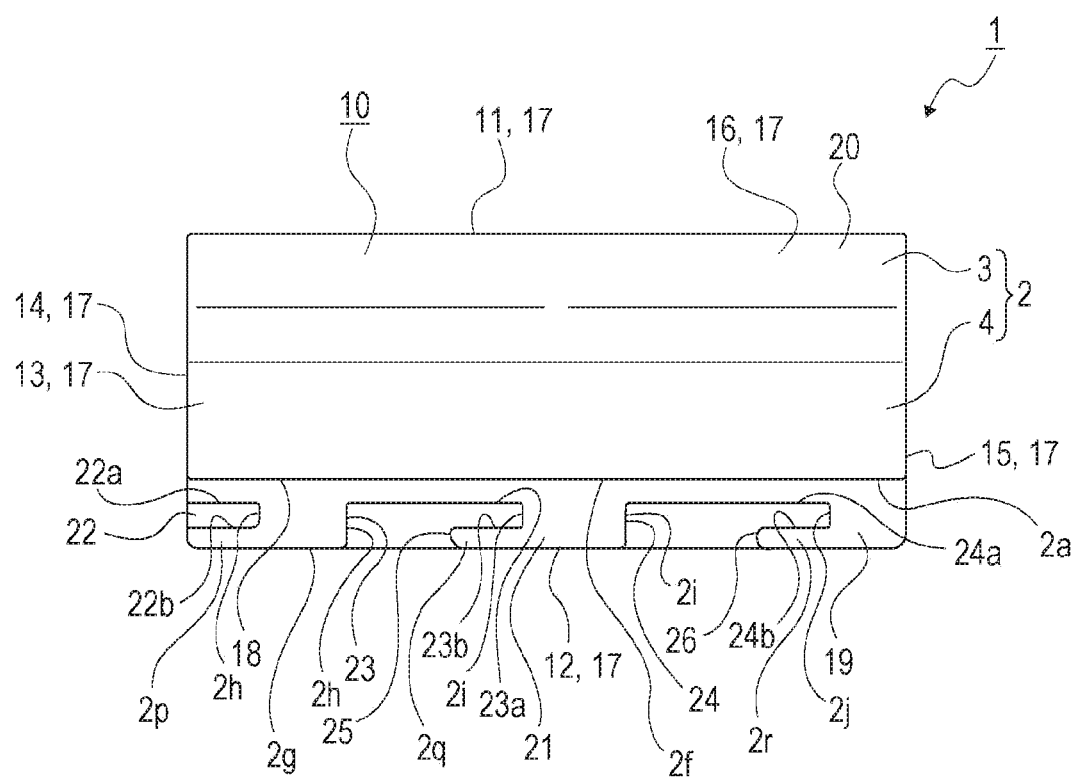
FIG. 6 is a side view of the battery.

Hereinafter, embodiments of a battery and a connection apparatus according to an embodiment of the present technology will be described with reference to the attached drawings.

A battery is formed in an approximate rectangular parallelepiped shape and, in description presented below, the outer faces will be referred to as a top face (upper face), a bottom face (lower face), side faces (horizontal both side faces), and a front face and a rear face so as to represent front, rear, upper, lower, left, and right directions. A vertical direction connecting a top face side (upper face side) and a bottom face side (lower face side) on which the top face (upper face) and the bottom face (lower face) are present will be also referred to as a height direction, a horizontal direction connecting a left side face side and a right side face side on which both the left and right side faces are present will be also referred to as a widthwise direction, and a forward/backward direction connecting a front face side and a rear face side on which the front face and the rear face are present will be also referred to as a longitudinal direction. In addition, a portion of an upper end side including the top face will be referred to as a top portion, a portion of a lower end side including the bottom face will be referred to as a bottom portion, portions of both the left and right end sides including the side faces will be referred to as side portions (a left portion and a right portion), a portion of a front end side including the front face will be referred to as a front portion, and a portion of a rear end side including the rear face will be referred to as a rear portion. In addition, the outer faces of the top portion, the bottom portion, the side portions, the front portion, and the rear portion are not limited to planar faces, but at least parts thereof may be formed as curved faces. Further, as an example of a connection apparatus to which the battery is connected, a still camera that is an imaging apparatus will be represented, and, in description of the still camera, the front, rear, upper, lower, left, and right directions will be represented in a direction seen from a photographer at the time of photographing using the still camera. Thus, an object side is the front side, and the image face side is the rear side.

In addition, hereinafter, as another example of a connection apparatus to which the battery is connected, a charger is also represented. In description of the charger, the front, rear, upper, lower, left, and right directions are represented in a state in which the charger is placed in a base such as a desk or a table. In the charger, an insertion concave part in which the battery is inserted is formed. In the charger, the front, rear, upper, lower, left, and right directions will be represented with a direction in which the battery is inserted set as the lower side and a direction in which the battery is slid and mounted set as the front side. In addition, the front, rear, upper, lower, left, and right directions represented below are for the convenience of the description, and, an embodiment of the present technology is not limited to such directions.

<Configuration of Battery>

First, the configuration of a battery 1 will be described (see FIGS. 1 to 7).

The battery 1 has a configuration in which necessary units are arranged inside/outside a casing 2.

The casing 2 is formed in an approximate rectangular parallelepiped shape and is formed by vertically combining a case cover (upper case) 3 and a housing case (lower case) 4. The case cover 3 is formed in a box shape that is open to the lower side (see FIGS. 1 to 6). The housing case 4 is formed in a box shape that is open to the upper side. In a state in which the casing 2 is configured by vertically combining the case cover 3 and the housing case 4, the internal space of the casing 2 is formed as a housing space.

In the housing space of the casing 2, a separator 5, cells 6 and 6, connecting sheet metals 7, 8, and 8, and a circuit substrate 9 are arranged (see FIG. 1). The separator 5 is mounted in the housing case 4. The cells 6 and 6 are arranged in a state in which the cells are horizontally divided by the separator 5. The connecting sheet metal 7 is connected to one terminal of each of the cells 6 and 6 and has a lower end portion connected to an electrode terminal, which is not illustrated in the drawing, formed on the lower face of the circuit substrate 9. The connecting sheet metals 8 and 8 are connected to the other terminals of the cells 6 and 6 and have lower end portions connected to electrode terminals, which are not illustrated in the drawing, formed on the lower face of the circuit substrate 9. The circuit substrate 9 is mounted in the housing case 4 and is in a state covered with the separator 5 from the upper side except for a portion.

The casing 2 includes a top face 11, a bottom face 12, side faces 13 and 13, a front face 14, and a rear face 15 as outer faces 10. The casing 2 has a front/rear direction (longitudinal direction) size larger than a left/right direction (widthwise direction) size and has a horizontal direction (widthwise direction) size larger than a vertical direction (height direction) size (see FIGS. 1 to 6). In the casing 2, inclining faces 16 and 16 are formed between the top face 11 and the side faces 13 and 13. The inclining faces 16 and 16 are displaced to the lower side as approaching the side faces 13 and 13 from the top face 11.

All the top face 11, the bottom face 12, the side faces 13 and 13, the front face 14, the rear face 15, and the inclining faces 16 and 16 are formed as outer faces 17, 17, . . . .

On the horizontal both side portions of the lower end portion of the casing 2, notches 2a and 2a are formed. The notch 2a is open to the side face (the left side or the right side), the lower side, the front side, and the rear side and is formed by a level difference face 18 extending to the front/rear sides facing the lower side and a groove forming face 19 extending to the front/rear sides facing the lateral side. The outer edge of the level difference face 18 is continuous from the lower edge of the side face 13. The upper edge of the groove forming face 19 is continuous from the inner edge of the level difference face 18, and the lower edge thereof is continuous from the side edge of the bottom face 12. The level difference face 18 and the groove forming face 19 are formed to be continuous over the front face 14 to the rear face 15.

The level difference face 18 and the bottom face 12 are formed as flat faces that are approximately parallel to each other, and a middle portion of the groove forming face 19 in the front/rear direction except for the front/rear both end portions and the side face 13 are formed as faces that are approximately parallel to each other. Front end portions of the groove forming faces 19 and 19 are formed as curved faces 19a and 19a, which are convex toward the outer side, displacing in a direction approaching each other as approaching the front face 14, and rear end portions of the groove forming faces 19 and 19 are formed as curved faces 19b and 19b, which are convex toward the outer side, displacing in a direction approaching each other as approaching the rear face 15. The casing 2 may be regarded as being configured by a main body part 20 that is a portion disposed on a further upper side than a virtual plane including the level difference faces 18 and 18 and a bottom part 21 that is a portion disposed on a further lower side than the virtual plane. In addition, the level difference faces 18 and 18 are included in the main body part 20.

As described above, in the battery 1, since the front/rear both end portions of the groove forming faces 19 and 19 are formed as curved faces 19a, 19a, 19b, and 19b, it is difficult for stress concentration to occur, and, in case of falling or the like, it is difficult for the battery 1 to be in contact with a ground surface or the like, the impact is mitigated, and the occurrence of damage can be reduced.

The casing 2, as described above, a portion that is disposed on the upper side including the level difference faces 18 and 18 with reference to the virtual plane including the level difference faces 18 and 18 is arranged as the main body part 20 and a portion disposed on a further lower side than the main body part 20 is arranged as the bottom part 21. The horizontal width of the bottom part 21 is smaller than that of the main body part 20, a distance between the side faces 13 and 13 in the horizontal direction is longer than a distance between the groove forming faces 19 and 19, and grooves having respective functions and the like are formed in the bottom part 21.

In the horizontal both side portions of the bottom part 21, in order from the front side, first guided grooves 22 and 22, second guided grooves 23 and 23, and third guided grooves 24 and 24 are formed to be spaced apart from each other. Any one of the first guided groove 22, the second guided groove 23, and the third guided groove 24 is open to the groove forming face 19.

Figure 8:
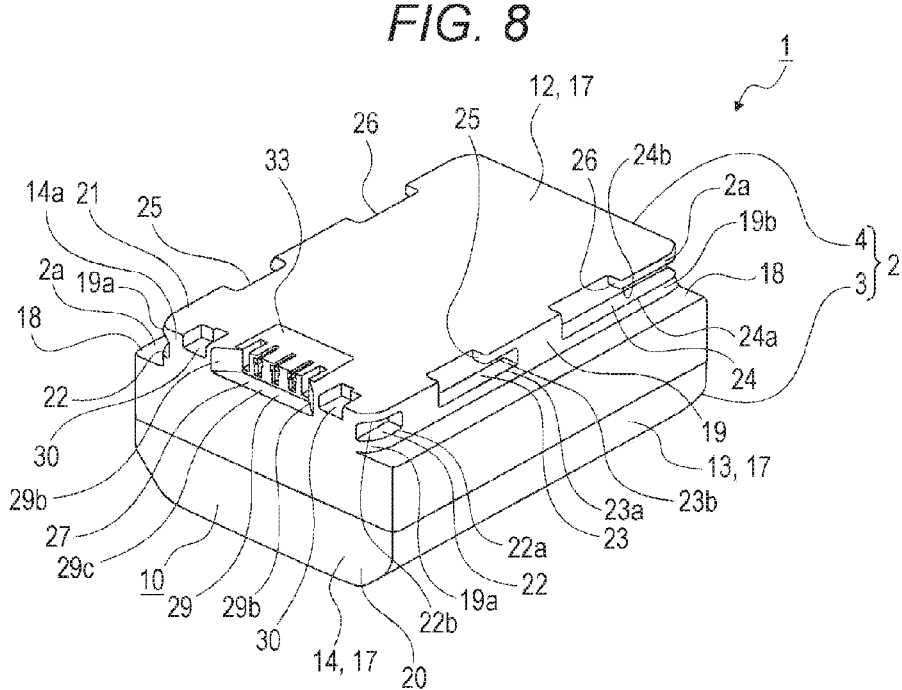
FIG. 8 is a perspective view of a battery that has a different configuration of a guide groove.

The first guided groove 22 is formed in a front end portion of the bottom part 21 and is open to the lateral side and the front side. The second guided groove 23 extends to the front and rear sides and is open to the lateral side. Here, in the casing 2, the second guided groove 23 may not be formed. In such a case, a portion in which the second guided groove 23 is formed is formed by a part of the groove forming face 19 and a part of the bottom face 12. The third guided groove 24 extends to the front and rear sides and is open to the lateral side. Here, the third guided groove 24 may have a shape that is also open to the rear side (see FIG. 8).

In the horizontal both side portions of the bottom part 21, in order from the front side, insertion grooves 25 and 25 and insertion grooves 26 and 26 are formed to be spaced apart from each other. Any one of the insertion grooves 25 and the insertion grooves 26 is open to the groove forming face 19. The insertion groove 25 is open to the lateral side, the upper side, and the lower side, and an upper-side opening communicates with an approximately half portion of the front side of the second guided groove 23. The insertion groove 26 is open to the lateral side, the upper side, and the lower side, and an upper-side opening communicates with an approximately half portion of the front side of the third guided groove 24.

Portions of the casing 2 between the lower edges 22b and 22b of the first guided grooves 22 and 22 and the bottom face 12 are arranged as first engagement claw parts 2p and 2p, portions of the casing 2 between the lower edges 23b and 23b of the second guided grooves 23 and 23 and the bottom face 12 are arranged as second engagement claw parts 2q and 2q, and portions of the casing 2 between the lower edges 24b and 24b of the third guided grooves 24 and 24 and the bottom face 12 are arranged as third engagement claw parts 2r and 2r. Any one of the first engagement claw parts 2p and the second engagement claw parts 2q is positioned on a further front face 14 side than the center in the front/rear directions of the casing 2, and the third engagement claw parts 2r are positioned on a further rear face 15 side than the center in the front/rear directions of the casing 2 or in an area of the rearmost side among areas acquired by equally dividing the casing 2 into three parts.

Figure 9:
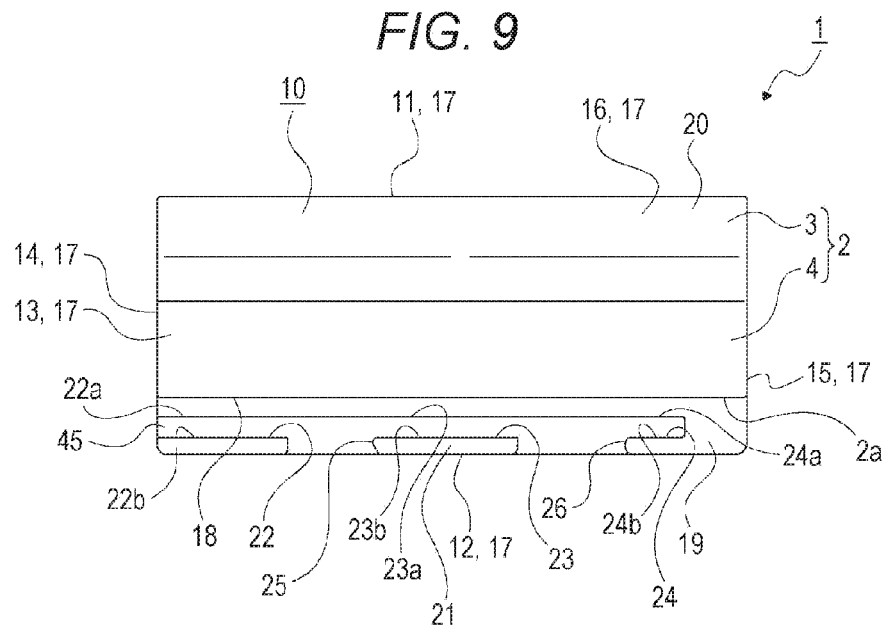
FIG. 9 is a side view of a battery that has a different configuration of a guide groove.
Figure 10:
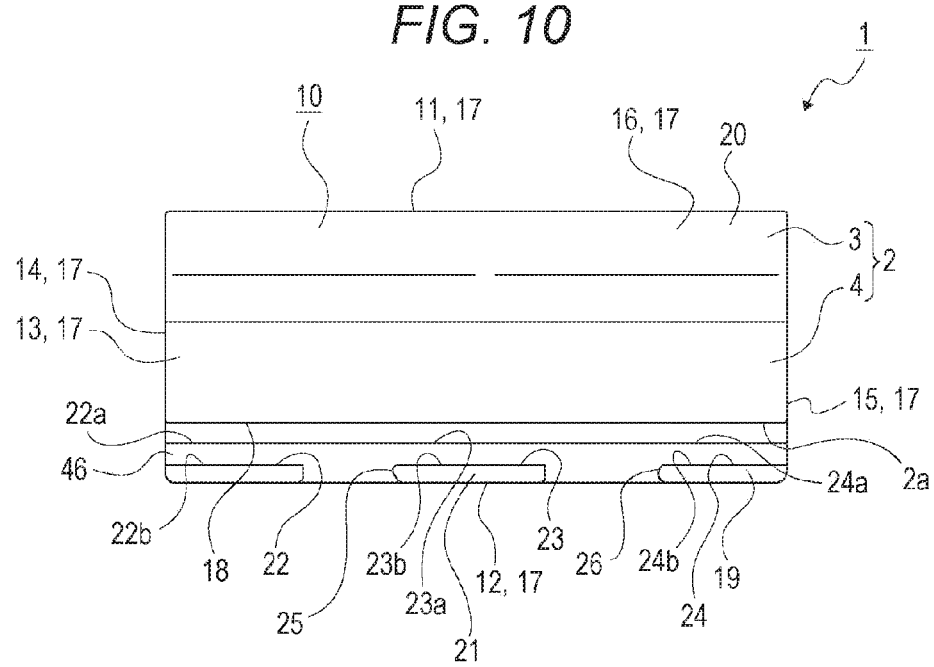
FIG. 10 is a side view of another battery that has a different configuration of a guide groove.

In addition, in the description presented above, while an example has been illustrated in which the first guided groove 22, the second guided groove 23, and the third guided groove 24 are formed to be spaced apart from each other to the front and rear sides, the first guided groove 22, the second guided groove 23, and the third guided groove 24 may be formed as one guide groove 45 (see FIG. 9). The guide groove 45 is formed from the front end to a position near the rear end in the groove forming face 19. Here, the first guided groove 22, the second guided groove 23, and the third guided groove 24 may be formed as one guide groove 46 (see FIG. 10). The guide groove 46 is formed over the front end to the rear end of the groove forming face 19.

In addition, in the description presented above, while an example has been illustrated in which the first guided groove 22, the second guided groove 23, and the third guided groove 24 are formed in each of the horizontal both sides of the casing 2, at least one of the first guided groove 22, the second guided groove 23, and the third guided groove 24 may be formed in each of the horizontal both sides of the casing 2.

Figure 11:
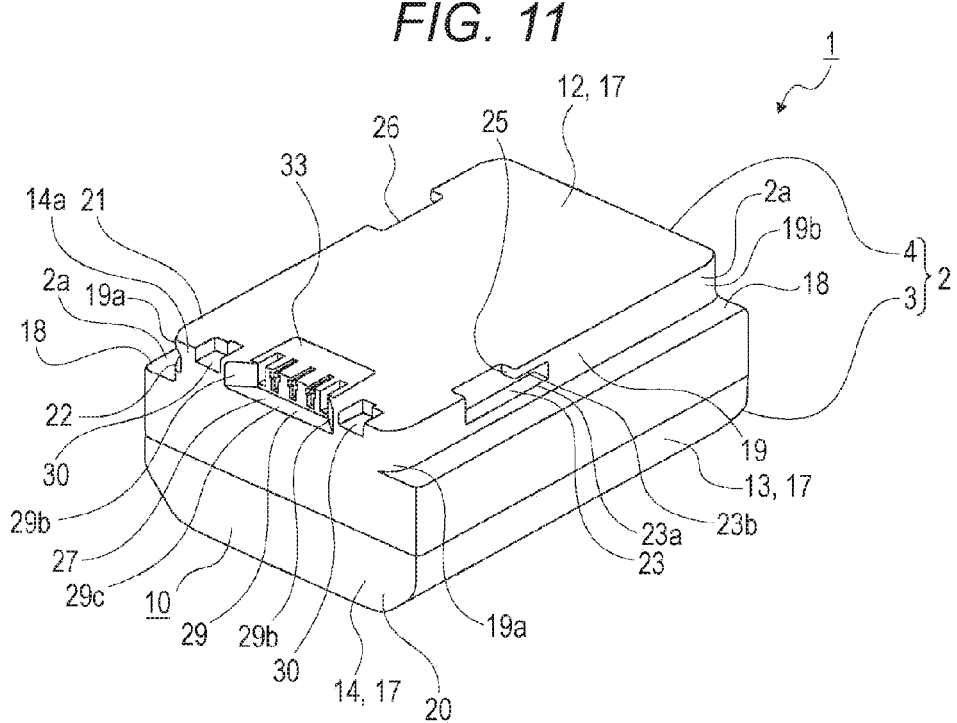
FIG. 11 is a perspective view of a battery that has a different configuration of a guide groove.
Figure 12:
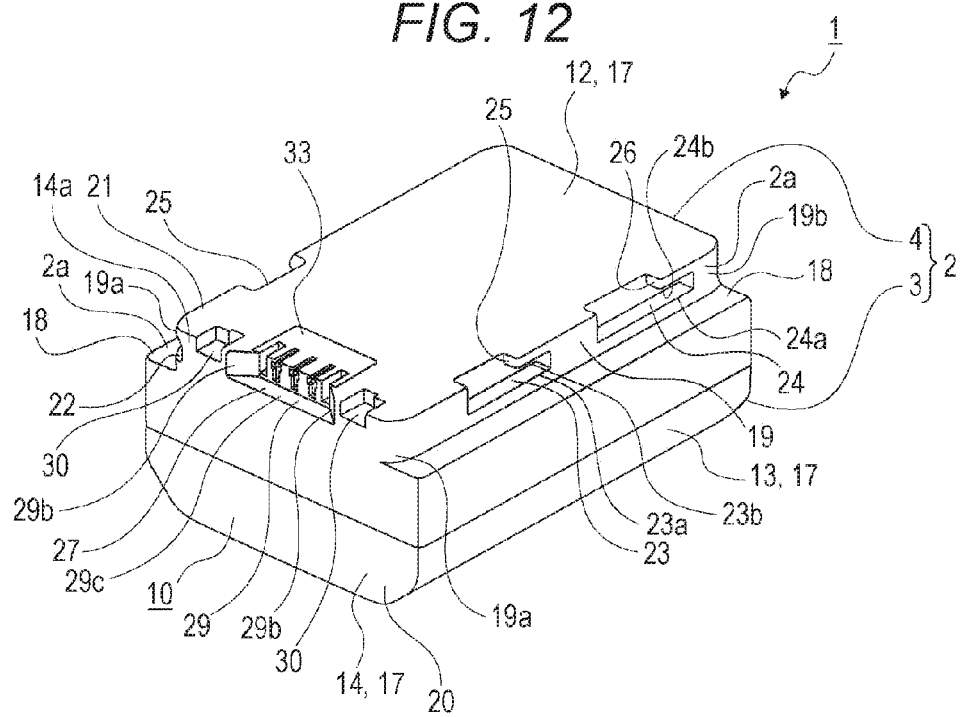
FIG. 12 is a perspective view of another battery that has a different configuration of a guide groove.
Figure 13:
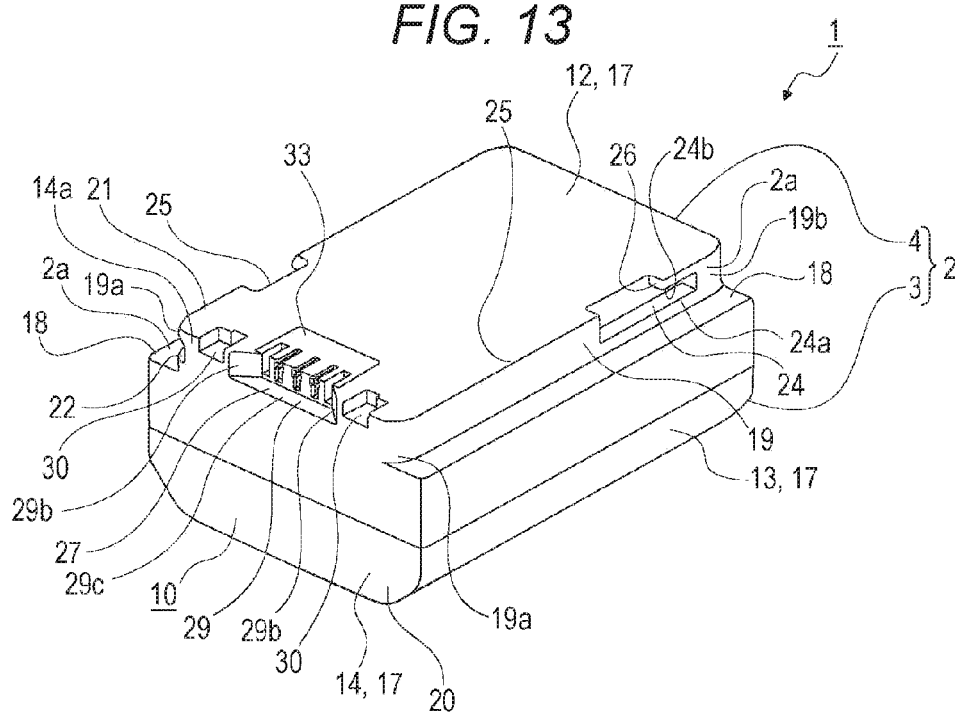
FIG. 13 is a perspective view of further another battery that has a different configuration of a guide groove.

For example, it may be configured such that only the first guided groove 22 and the third guided groove 24 are formed on one of the left and right sides, and only the second guided groove 23 is formed on the other of the left and right sides (see FIG. 11). In addition, for example, it may be configured such that only the first guided groove 22 and the second guided groove 23 are formed on one of the left and right sides, and only the second guided groove 23 and the third guided groove 24 are formed on the other of the left and right sides (see FIG. 12). Furthermore, for example, it may be configured such that only the first guided groove 22 and the second guided groove 23 are formed on one of the left and right sides, and only the third guided groove 24 is formed on the other of the left and right sides (see FIG. 13).

In addition, as examples of such a configuration, including the examples (see FIGS. 11 to 13) described above, there is an example in which only one guide groove among the first guided groove 22, the second guided groove 23, and the third guided groove 24 is formed on one of the left and right sides, and one, two, or three guide grooves among the first guided groove 22, the second guided groove 23, and the third guided groove 24 are formed on the other of the left and right sides. Furthermore, there is an example in which only any two guide grooves among the first guided groove 22, the second guided groove 23, and the third guided groove 24 are formed on one of the left and right sides, and only two or three guide grooves among the first guided groove 22, the second guided groove 23, and the third guided groove 24 are formed on the other of the left and right sides.

Figure 7:
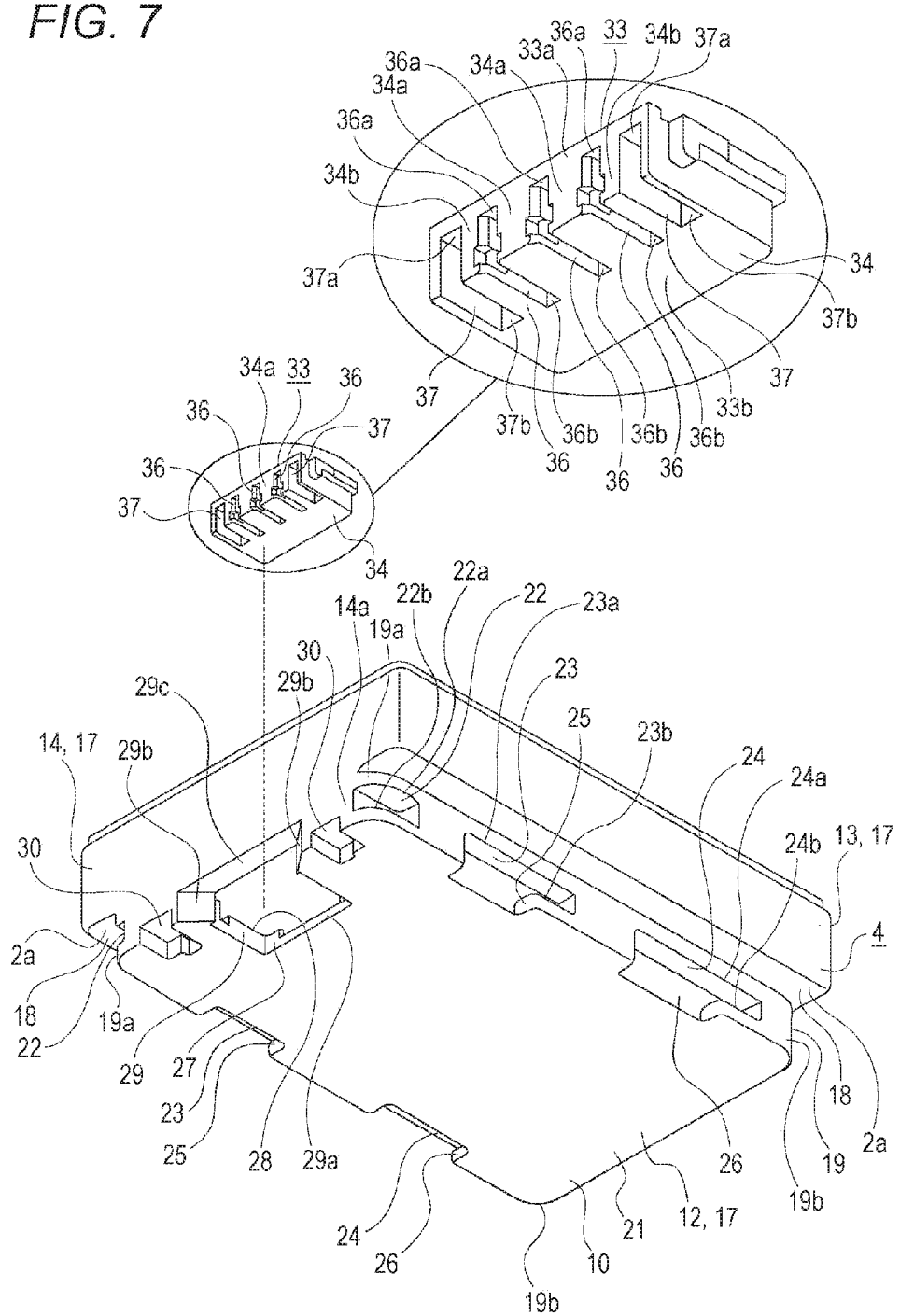
FIG. 7 is an exploded perspective view that illustrates a housing case and connectors of the battery.

In a front end portion of the bottom part 21, an arrangement concave part 27 is formed (see FIG. 7). The arrangement concave part 27 is formed at approximately center in the horizontal direction and is open to the front side and the lower side. In the casing 2, an arrangement hole 28 that communicates with portions other than the front end portion of the arrangement concave part 27 and allows vertical passing through is formed. Any one of the upper edge 22a of the first guided groove 22, the upper edge 23a of the second guided groove 23, and the upper edge 24a of the third guided groove 24 is positioned on a further lower side than the level difference face 18, and, between the first guided groove 22 and the level difference face 18, between the second guided groove 23 and the level difference face 18, and between the third guided groove 24 and the level difference face 18, a part of the groove forming face 19 is present in any one thereof (see FIGS. 2 to 7). Accordingly, any one of a distance from the lower end of the groove forming face 19 to the upper edge 22a of the first guided groove 22, a distance from the lower end of the groove forming face 19 to the upper edge 23a of the second guided groove 23, and a distance from the lower end of the groove forming face 19 to the upper edge 24a of the third guided groove 24 is shorter than a distance from the upper end to the lower end of the groove forming face 19. In addition, a vertical distance (groove width) of each of the first guided groove 22, the second guided groove 23, and the third guided groove 24 may be longer or smaller than a distance from the upper end of the groove forming face 19 to each of the upper edges 22a, 23a, and 24a, and the vertical distance of each of the first guided groove 22, the second guided groove 23, and the third guided groove 24 may be the same as a distance from the upper end of the groove forming face 19 to each of the upper edges 22a, 23a, and 24a.

In addition, corner portions 2f at which the level difference face 18 and the side face 13 intersect with each other may be chamfered, and the corner portions 2f extend in a direction from the front face 14 to the rear face 15 and may be of a length that is the same as or about ½ or ⅓ of the length of the casing 2.

Furthermore, one corner portion 2f may be chamfered, or both corner portions 2f and 2f may be chamfered. The size of the chamfered width of each corner portion 2f may be the same as the size of the width of the level difference face 18 or may be smaller than the width of the level difference face 18.

In addition, a corner portion 2g at which the groove forming face 19 and the bottom face 12 intersect with each other may be chamfered. Furthermore, any or all of corner portions 2h and 2h between the first guided groove 22 and the second guided groove 23, corner portions 2i and 2i between the second guided groove 23 and the third guided groove 24, and a corner portion 2j between the third guided groove 24 and the rear face 15 may be chamfered. In such a case, one of the left and right sides of the casing 2 or the corner portions 2g, 2h, 2i, and 2j of left and right both sides may be chamfered. The arrangement concave part 27 is formed by concave part forming faces 29. The concave part forming faces 29 are formed by a base portion 29a, wall portions 29b and 29b, and a middle portion 29c. The lower edges of the concave part forming faces 29 and 29 are continuous from left and right both-side frames of the bottom face 12, and a distance from the bottom face 12 to the upper edges of the concave part forming faces 29 and 29 is longer than a distance from the bottom face 12 to the upper edges 22a, 23a, and 24a. In addition, the upper edges of the concave part forming faces 29 and 29 are continuous from the inner edges of the level difference faces 18 and 18, and a distance from the bottom face 12 to the upper edges of the concave part forming faces 29 and 29 is the same as a distance from the bottom face 12 to the level difference faces 18 and 18. Any one of the lower edge 22b of the first guided groove 22, the lower edge 23b of the second guided groove 23, and the lower edge 24b of the third guided groove 24 is positioned on a further upper side than the lower edge of the groove forming face 19, and the positions thereof in the vertical direction are the same.

The base portion 29a is formed in the shape of "Π" open to the front side and is in a state facing the horizontal direction. The wall portions 29b and 29b are continuous from the front end of the base portion 29a and are formed as inclining faces spaced apart from each other in the left/right directions toward the front side. In other words, the wall portion 29b disposed on the left side is formed as an inclining face that further approaches the side face 13 disposed on the left side toward the front side, and the wall portion 29b disposed on the right side of wall portion 29b is formed as an inclining face further approaching the side face 13 disposed on the right side toward the front side. In addition, in the wall portions 29b and 29b, it may be configured such that one wall portion 29b is formed as an inclining face, and the other wall portion 29b is formed as a face toward the left side or the right side without inclining. The middle portion 29c is formed between the lower edges of the wall portions 29b and 29b facing the lower side. The wall portions 29b and 29b, for example, incline by 45 degrees with respect to faces facing the left and right directions. The middle portion 29c is positioned on a further lower side than the level difference face 18 and is positioned at an approximately same height as that of the upper edges 22a, 23a, and 24a of the first guided groove 22, the second guided groove 23, and the third guided groove 24 or is positioned on a further slightly lower side than the upper edges 22a, 23a, and 24a. In addition, the middle portion 29c may be positioned on a further upper side than the upper edges 22a, 23a, and 24a. In the front end portion of the bottom part 21, identification grooves 30 and 30 are formed to be spaced apart from each other to the left and right sides. The identification grooves 30 have a role as functional grooves having a predetermined function and, for example, are used for identifying the type of a charger or the like, which will be described later, functioning as a connection apparatus. Here, the functional grooves are not limited to the identification grooves 30, but, as the functional grooves, for example, grooves having functions other than an identifying function such as positioning grooves positioning the charger or the like or detection grooves detecting the connection state or the like of a charger or the like may be formed instead of the identification grooves 30.

Here, by configuring the predetermined function to be an identifying function identifying the type of connection apparatus, the type of connection apparatus is identified using the functional grooves, and, as a battery is mounted in a connection apparatus, or as a battery is in a state not mounted in the connection apparatus, the type of connection apparatus connected to the battery can be easily identified.

In addition, the predetermined function may be a function for identifying the type of battery.

The identification grooves 30 and 30 are formed on opposite sides having the arrangement concave part 27 interposed therebetween. The identification groove 30 is formed by continuously forming a first identification part 31 and a second identification part 32, which have different front/rear lengths, in the left/right directions.

The first identification part 31 and the second identification part 32 have roles as a first functional unit and a second functional unit.

Among faces forming the identification groove 30, a face, which is positioned on the upper side, facing the lower side is formed as an inner bottom face 30a. The inner bottom face 30a is positioned on a further lower side than the middle portion 29c, which is positioned on the upper side, facing the lower side among the concave part forming faces 29. Accordingly, a depth of the identification groove 30 in the vertical direction is smaller than the depth of the arrangement concave part 27 in the vertical direction. In addition, the inner bottom face 30a is positioned on a further lower side than the upper edges 22a, 23a, and 24a of the first guided groove 22, the second guided groove 23, and the third guided groove 24 and the level difference face 18. Furthermore, the inner bottom face 30a is positioned on a further upper side than the lower edges 22b, 23b, and 24b of the first guided groove 22, the second guided groove 23, and the third guided groove 24. However, the inner bottom face 30a may be positioned on a further lower side than the lower edges 22b, 23b, and 24b and may be positioned at a same height as that of the lower edges 22b, 23b, and 24b.

Among the faces forming the identification groove 30, a face, which is positioned on the rear side of the first identification part 31, facing the front side is formed as an inner bottom face 31a, and a face, which is positioned on the rear side of the second identification part 32, facing the front side is formed as an inner bottom face 32a. The inner bottom faces 31a and 32a are positioned on a further front side than a face, which is positioned on the rearmost side of the base portion 29a, facing the front side among the concave part forming faces 29 and is positioned on a further rear side than the front face of a connector 33. In addition, the inner bottom faces 31a and 32a are positioned on a further front side than an inner bottom face 36a of a terminal arrangement groove 36 and an inner bottom face 37a of the positioning groove 37. Furthermore, the inner bottom faces 31a and 32a are positioned on a further front side than the rear end edge of the first guided groove 22. Here, the inner bottom faces 31a and 32a may be positioned on a further rear side than the rear end edge of the first guided groove 22 and may be positioned at a same position as that of the rear end edge of the first guided groove 22 in the front/rear directions.

The first identification part 31 has a front/rear length longer than the second identification part 32, the inner bottom face 31a is positioned on a further rear side than the inner bottom face 32a, and the first identification part 31 is positioned on a further arrangement concave part 27 side than the second identification part 32. It can be stated that the second identification part 32 is positioned on a further side face 13 side than the first identification part 31. The second identification part 32 has a width in the horizontal direction that is smaller than the width of the first identification part 31 in the horizontal direction.

In the arrangement concave part 27 of the casing 2, the connector 33 is arranged. The connector 33 is a part that is connected to an electrode terminal of a charger, which will be described later, functioning as a connection apparatus or the like, functions as a terminal part and at least includes a positive electrode terminal and a negative electrode terminal.

The connector 33 includes a housing 34 formed using a non-conductive material and connection terminals 35, 35, and 35 formed using a conductive material, and at least parts of the connection terminals 35, 35, and 35 are held in the housing 34 in a state being arranged in the terminal arrangement grooves 36, 36, and 36 formed in the housing 34. The connection terminal 35 has one pair of contact parts in which one end portion of a metal piece horizontally branches at a predetermined portion, and the one pair of contact parts has elasticity in a direction in which tip end portions thereof contact each other and is arranged in the terminal arrangement groove 36 in a contacting state or an approaching state.

The connection terminals 35, 35, and 35 respectively function as a positive electrode terminal, a negative electrode terminal, and an information terminal and has an arrangement in which the positive electrode terminal, the information terminal, and the negative electrode terminal are aligned in order from the left side or an arrangement in which the positive electrode terminal, the information terminal, and the negative electrode terminal are aligned in order from the right side.

The information terminal is used not only for a connection apparatus to be described later to recognize the internal temperature of the battery 1 but also for the connection apparatus to recognize various kinds of information of the battery 1 such as a charge residual amount or degradation information of the battery 1. In addition, in the connector 33, two terminal arrangement grooves 36 and 36 and two connection terminals 35 and 35 may be disposed. In a case where two connection terminals 35 and 35 are disposed, the two connection terminals 35 and 35 respectively function as a positive electrode terminal and a negative electrode terminal and have an arrangement in which the positive electrode terminal and the negative electrode terminal are aligned in order from the left side or an arrangement in which the positive electrode terminal and the negative electrode terminal are aligned from the right side. Furthermore, in the connector 33, four terminal arrangement grooves 36, 36, . . . and four connection terminals 35, 35, . . . may be disposed. In a case where four connection terminals 35 and 35 are disposed, the four connection terminals 35, 35, . . . respectively function as a positive electrode terminal, a negative electrode terminal, an information terminal, and a communication terminal and have an arrangement in which the positive electrode terminal, the information terminal, the communication terminal, and the negative electrode terminal are aligned in order from the left side, an arrangement in which the positive electrode terminal, the information terminal, the communication terminal, and the negative electrode terminal are aligned in order from the right side, an arrangement in which the positive electrode terminal, the communication terminal, the information terminal, and the negative electrode terminal are aligned in order from the left side, or an arrangement in which positive electrode terminal, the communication terminal, the information terminal, and the negative electrode terminal are aligned in order from the right side. The communication terminal is used for a connection apparatus to recognize various kinds of information of the battery 1 such as a charge residual amount and degradation information of the battery 1, and, in such a case, the information terminal is used only for informing the connection apparatus of temperature information.

The terminal arrangement grooves 36, 36, and 36 are open to the front side and the lower side and are formed to be horizontally spaced apart from each other. In the housing 34, on the outer side of the terminal arrangement grooves 36, 36, and 36 in the horizontal direction, positioning grooves 37 and 37 that are open to the front side and the lower side are formed.

Portions of the connector 33 between the terminal arrangement grooves 36, 36, and 36 in the housing 34 are disposed as terminal separation ribs 34a and 34a, and portions between the terminal arrangement grooves 36 and 36 and the positioning grooves 37 and 37 in the housing 34 are disposed as inter-groove ribs 34b and 34b. A horizontal width of the terminal separation rib 34a is configured to be larger than a horizontal width of the inter-groove rib 34b such that a contact between the connection terminals 35, 35, and 35 can be prevented. A face positioned on the most top face 11 side of the terminal arrangement groove 36 and a face positioned on the most top face 11 side of the positioning groove 37 are respectively formed as inner bottom faces 36a and 37a, and the inner bottom faces 36a and 37a have vertical positions that are approximately the same. The inner bottom faces 36a and 37a are positioned on a further lower side than the level difference face 18. In addition, the inner bottom faces 36a and 37a are positioned on a further lower side than the upper edge 22a of the first guided groove 22, the upper edge 23a of the second guided groove 23, and the upper edge 24a of the third guided groove 24 and is positioned on a further upper side than the lower edge 22b of the first guided groove 22, the lower edge 23b of the second guided groove 23, and the lower edge 24b of the third guided groove 24. The connection terminal 35 can be elastically transformed in an approximately horizontal direction and is held in the housing 34 in the state being inserted into the terminal arrangement groove 36.

Figure 14:
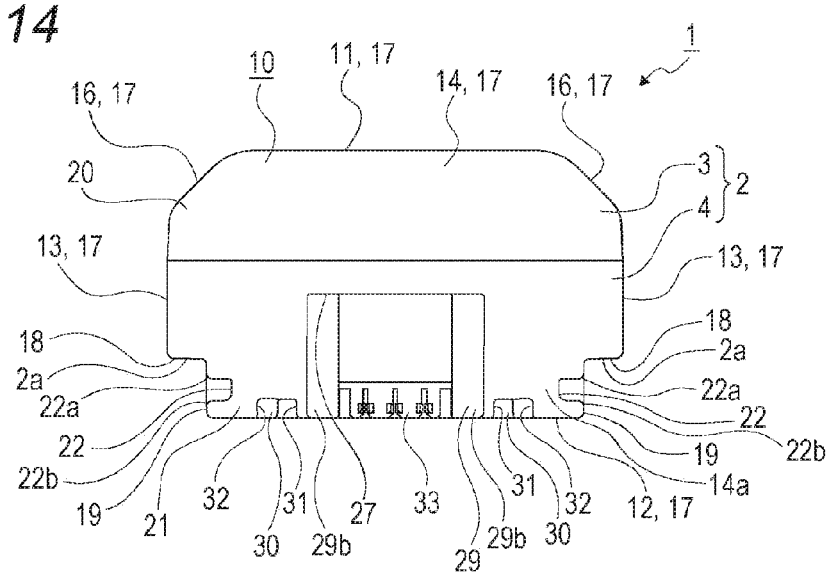
FIG. 14 is a front view of a battery that has a different configuration of an arrangement concave part.

In addition, in the description presented above, while an example is illustrated in which the upper ends of the wall portions 29b and 29b and the middle portion 29c are positioned at a same height as that of the upper end of the housing 34 of the connector 33 on the concave part forming face 29. For example, the upper ends of the wall portions 29b and 29b and the middle portion 29c may be positioned on a further upper side than the upper end of the housing 34 (see FIG. 14). In such a case, the upper ends of the wall portions 29b and 29b and the middle portion 29c may be positioned at arbitrary positions among positions disposed on a further lower side than the upper end of the casing 2.

Figure 15:
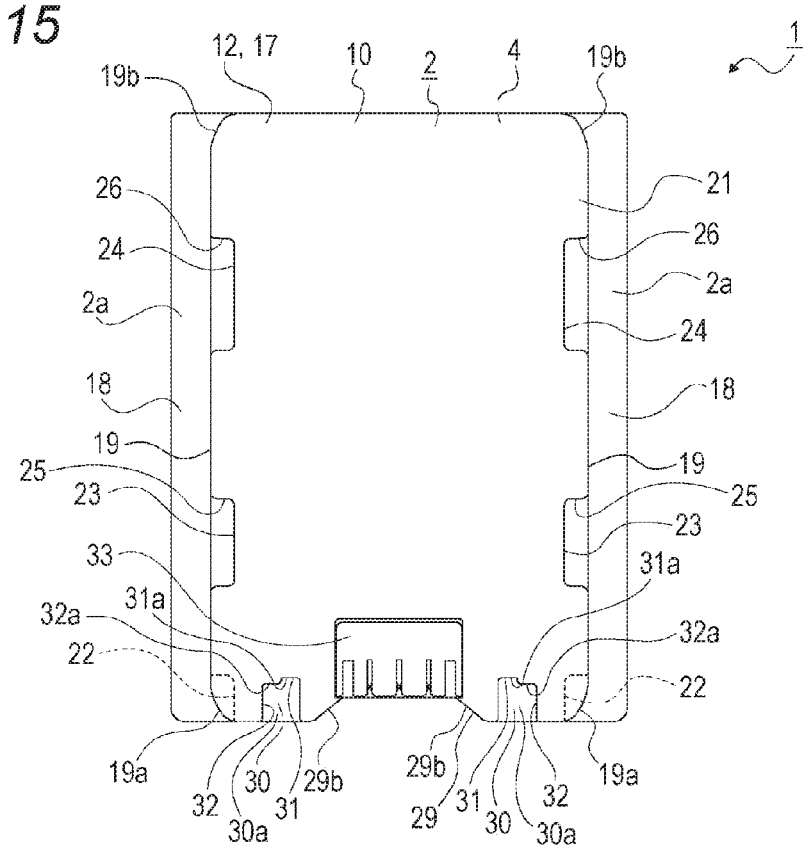
FIG. 15 is a bottom view of another battery that has a different configuration of an arrangement concave part.
Figure 16:
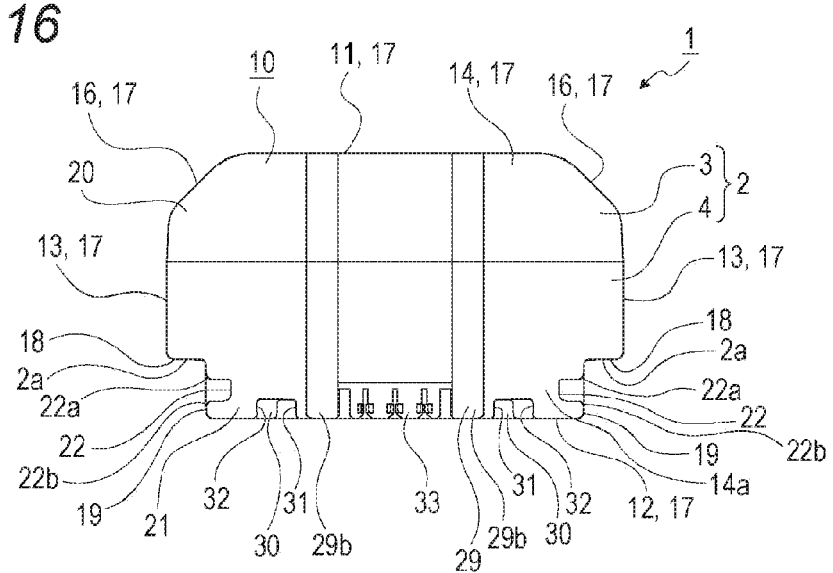
FIG. 16 is a front view of another battery that has a different configuration of an arrangement concave part.
Figure 17:
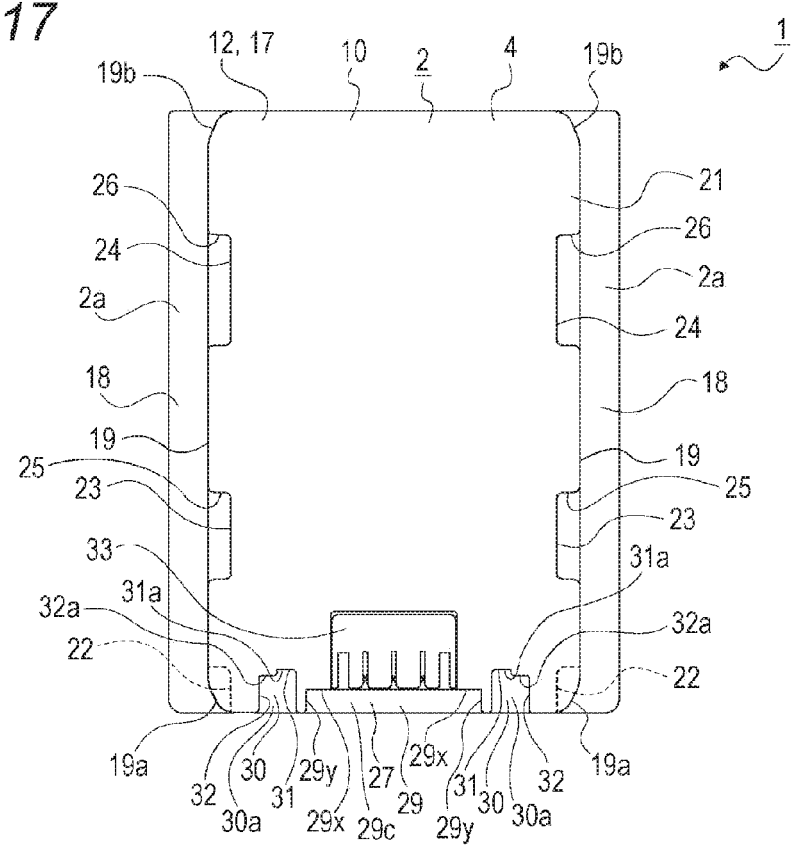
FIG. 17 is a bottom view of further another battery that has a different configuration of an arrangement concave part.
Figure 18:
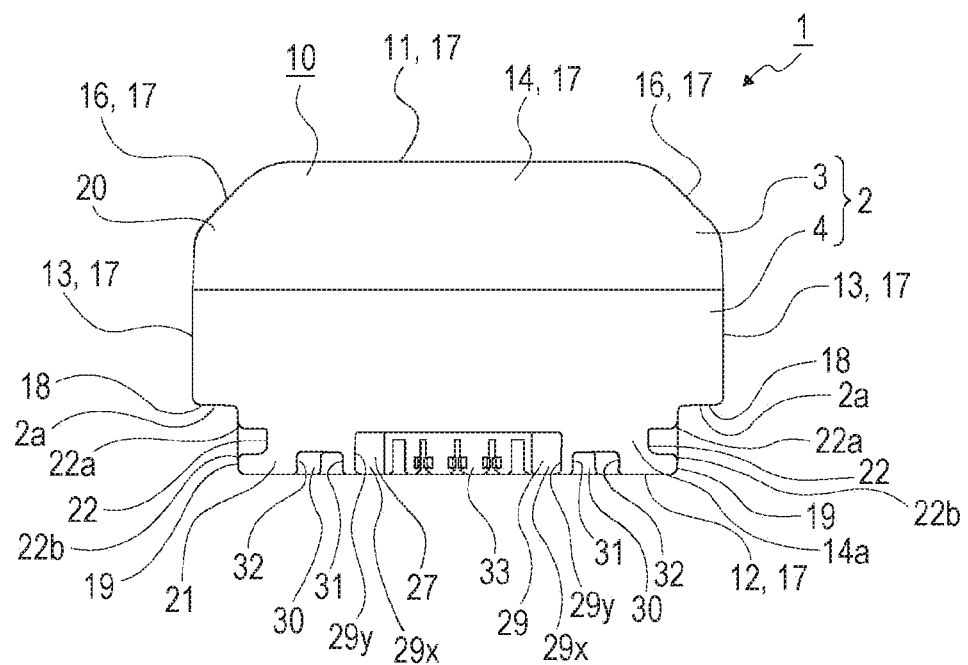
FIG. 18 is a front view of further another battery that has a different configuration of an arrangement concave part.

In addition, on the concave part forming face 29, for example, it may be configured such that the middle portion 29c is not present, and the wall portions 29b and 29b are formed at positions ranging from the upper end to the lower end of the casing 2 (see FIGS. 15 and 16). Furthermore, the wall portions 29b and 29b inclining to the front, rear, left, right sides may not be formed, but, instead of the wall portions 29b and 29b, first wall face portions 29x and 29x facing the front side and second wall face portions 29y and 29y that are continuous from horizontal outer frames of the first wall face portions 29x and 29x and face each other in the horizontal direction may be formed (see FIGS. 17 and 18). In addition, the first wall face portions 29x and 29x and the second wall face portions 29y and 29y may incline at an arbitrary angle in the horizontal direction, the front/rear direction, or the vertical direction.

The connector 33 is connected to the circuit substrate 9 in which one end portions of the connection terminals 35, 35, and 35 are arranged inside the casing 2 through the arrangement hole 28.

The front face 33a is positioned on a further rear side than the front face 14 of the casing 2 in a state in which the connector 33 is arranged in the arrangement concave part 27. The connector 33 is positioned in an area of the arrangement concave part 27 that is surrounded by the base portion 29a of the concave part forming face 29 and, on the front side of the connector 33, the wall portions 29b and 29b and the middle portion 29c of the concave part forming face 29 are positioned. The lower face 33b is positioned on a same plane as that of the bottom face 12 of the casing 2 in a state in which the connector 33 is arranged in the arrangement concave part 27.

<Example of Configuration of Connection Apparatus>

Next, as an example of the connection apparatus to which the battery 1 is connected, an imaging apparatus (still camera) 50 will be described (see FIGS. 19 to 21).

Figure 19:
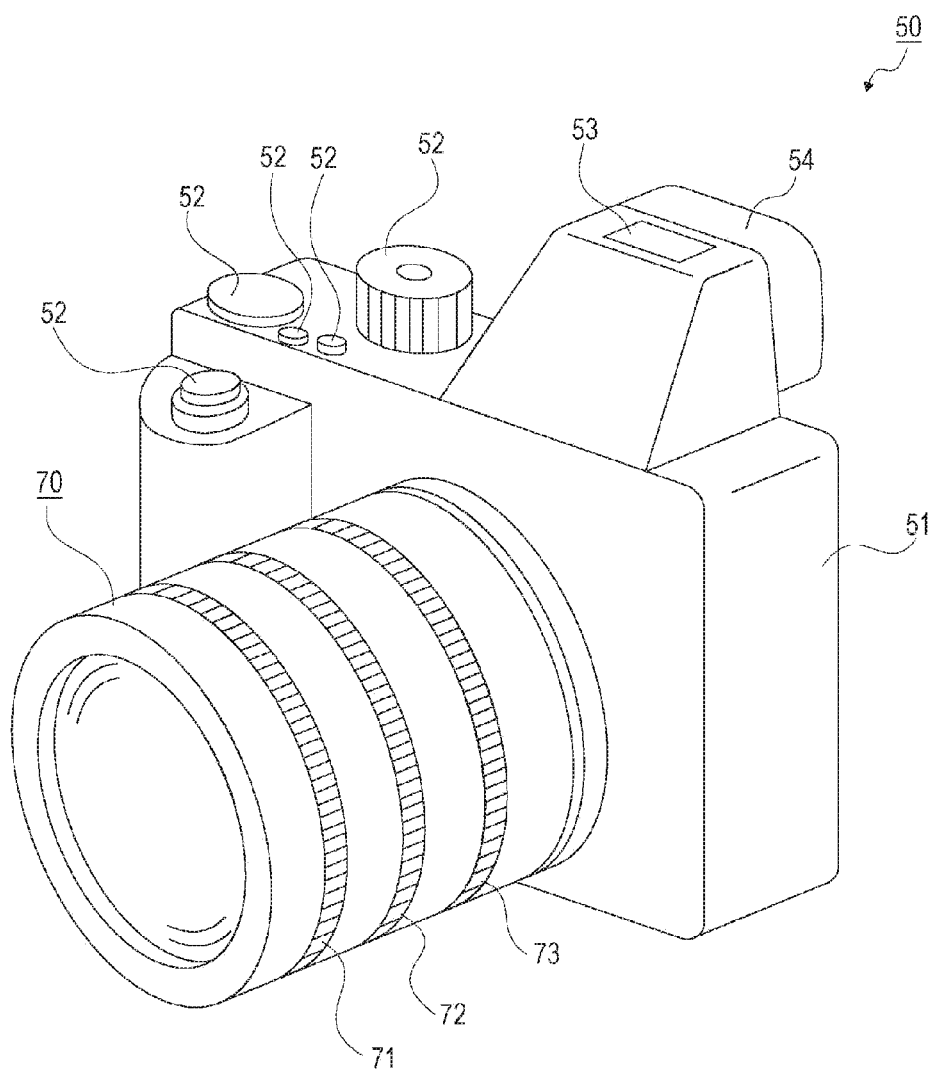
FIG. 19 is a perspective view of an imaging apparatus.

The imaging apparatus 50 is formed, for example, by arranging units necessary for the inside and the outside of a flat external casing 51 that is horizontally long (see FIG. 19). An interchangeable lens 70 and an accessory such as an adaptor not illustrated in the drawing can be detachably attached to the imaging apparatus 50. In the interchangeable lens 70, operation rings 71, 72, and 73 that are operated to rotate are arranged. The operation rings 71, 72, and 73 function as a focus ring used for focusing, a zoom ring used for adjusting a viewing angle, and an iris ring used for adjusting a light intensity.

On an upper face of the external casing 51, various operation units 52, 52, . . . are arranged. As the operation units 52, 52, . . . , for example, a photographing button, a zoom knob, a power button, a mode selection knob, and the like are arranged. In an upper end portion of the external casing 51, a flash 53 that can be taken in or out is arranged.

In the upper end portion of the external casing 51, a finder 54 is arranged on the rear side of the flash 53. On a rear face of the external casing 51, a display 55 and various operation units 52, 52, . . . are arranged (see FIG. 20).

Inside the external casing 51, imaging devices not illustrated in the drawing are arranged. As the imaging device, for example, a charge coupled device (CCD), a complementary metal-oxide semiconductor (CMOS), or the like is used.

Figure 20:
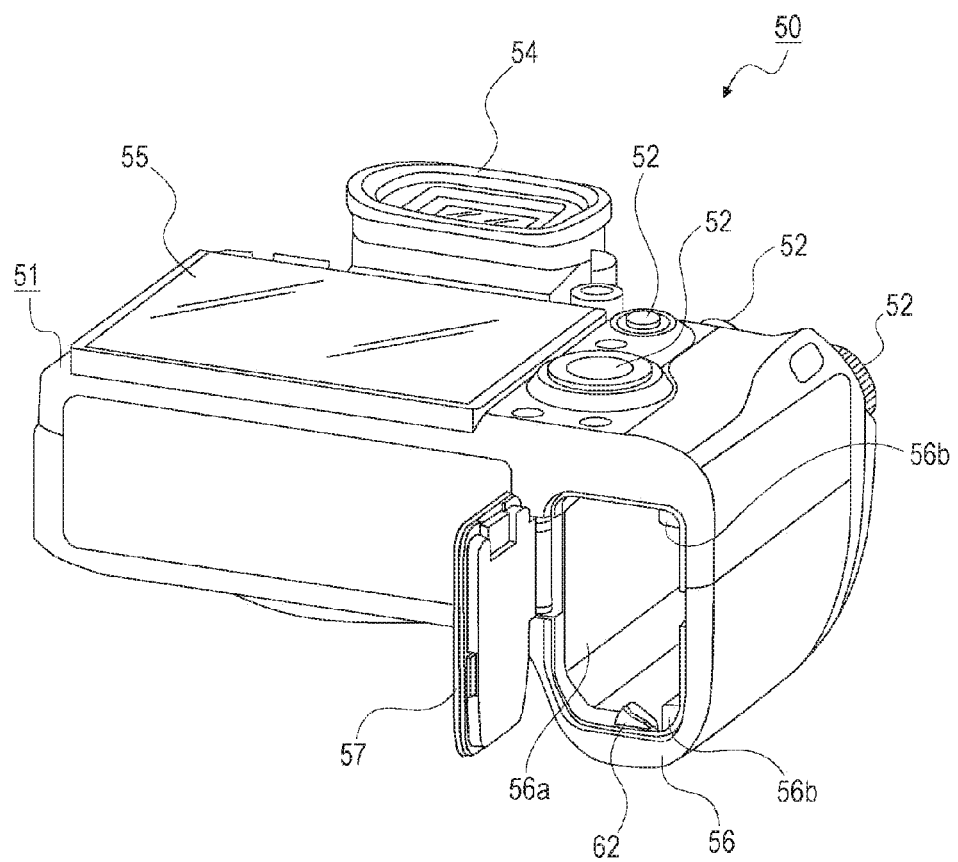
FIG. 20 is a perspective view that illustrates a state of an imaging apparatus in which a mounting space is open.
Figure 21:
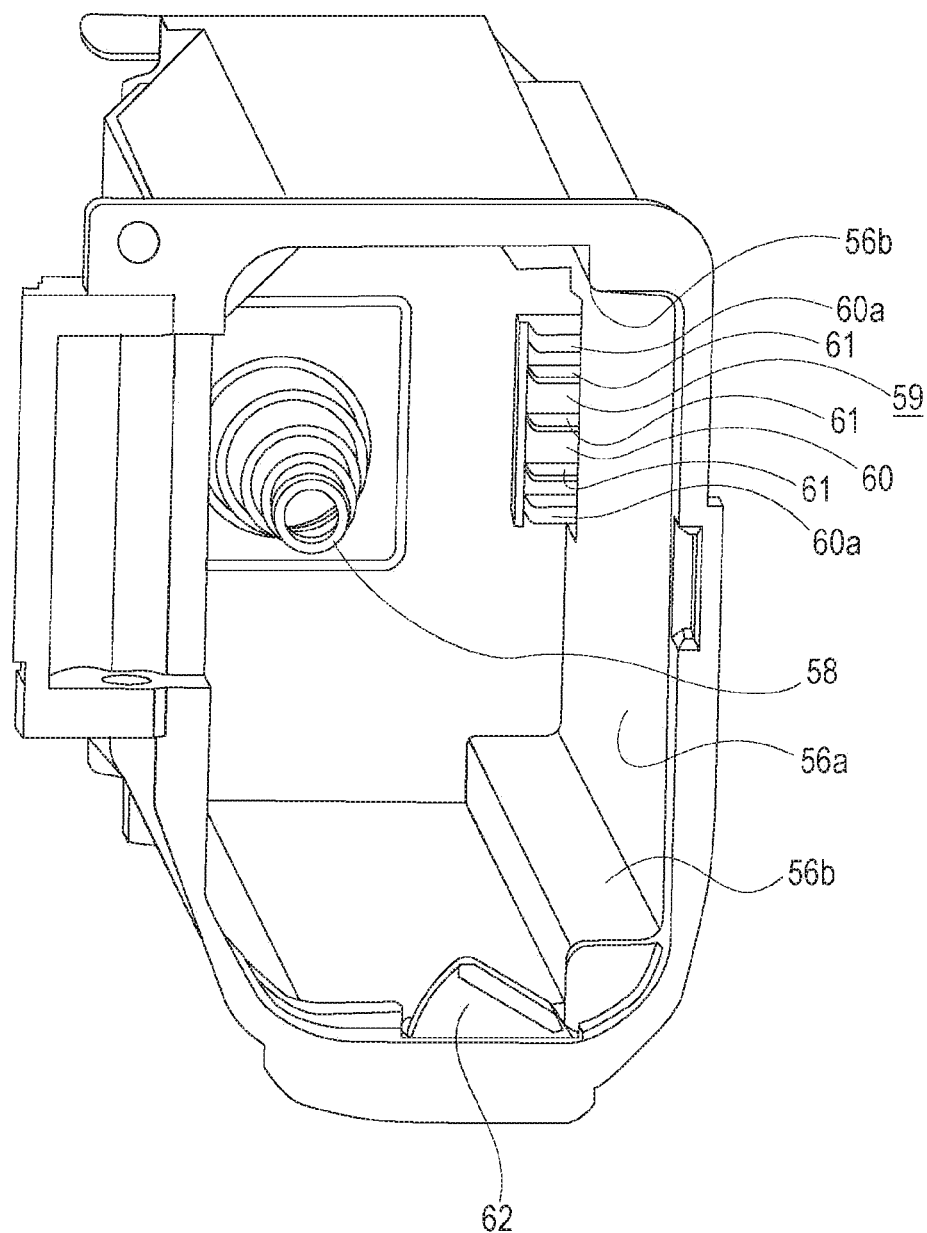
FIG. 21 is a perspective view that illustrates the internal structure of a battery mounting unit.

In a rear portion disposed on a further rear side than a mount (not illustrated in the drawing) to which the interchangeable lens is connected in one end portion of the imaging apparatus 50 in the horizontal direction and the imaging device, a battery mounting unit 56 is arranged (see FIGS. 20 and 21).

The battery mounting unit 56 includes a part of the external casing 51 and a lid body 57 that is rotatable in a lower end portion of the external casing 51. The internal space of the battery mounting unit 56 is formed as a mounting space 56a, and the mounting space 56a is open to the lower side.

In an inner portion (upper end portion) of the battery mounting unit 56, a biasing spring 58 and a terminal connecting unit 59 are arranged. The terminal connecting unit 59 includes a holding portion 60 formed using a non-conductive material and electrode terminals 61, 61, and 61 formed using a conductive material and is held by the holding portion 60 in a state in which the electrode terminals 61, 61, and 61 are horizontally spaced apart from each other.

In the holding portion 60, positioning protruding portions 60a and 60a are arranged outside the electrode terminals 61, 61, and 61 in the horizontal direction. One end portions of the electrode terminals 61, 61, and 61 of the terminal connecting unit 59 are connected to a control substrate, which is not illustrated in the drawing, arranged inside the external casing 51.

In a lower end portion of the battery mounting unit 56, a pressing lever 62 is supported to be rotatable by the opening edge of the mounting space 56a. The pressing lever 62 can rotate between a pressing position and a non-pressing position and, for example, is biased by a spring not illustrated in the drawing in a direction from the non-pressing position to the pressing position. Inside the battery mounting unit 56, erroneous insertion preventing protruding portions 56b and 56b are arranged. In the battery mounting unit 56, a locking mechanism that locks the lid body 57 in a closed state of the mounting space 56a is arranged.

<Battery Mounting for Connection Apparatus (Imaging Apparatus)>

Figure 22:
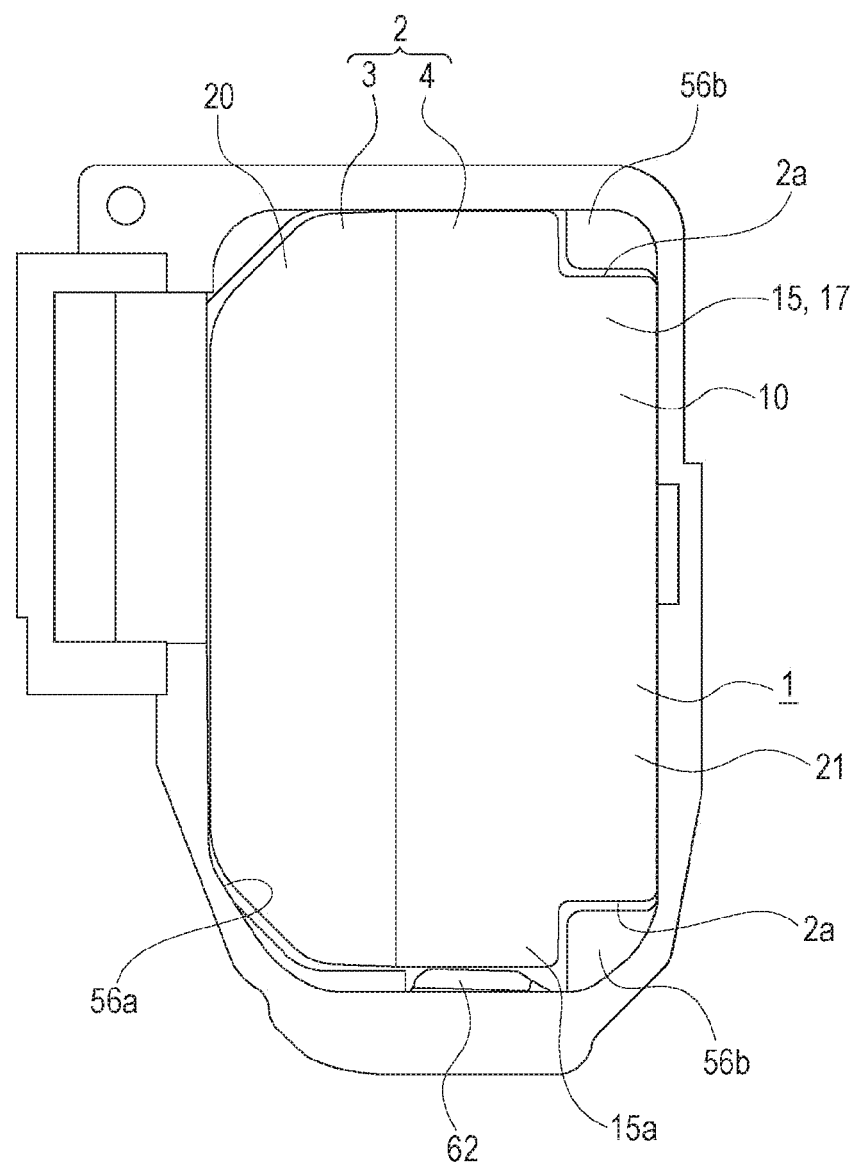
FIG. 22 is a bottom view that illustrates a state in which a battery is inserted into a mounting space of a battery mounting unit.

Hereinafter, the mounting of the battery 1 in the battery mounting unit 56 of the imaging apparatus 50 will be described (see FIGS. 22 to 24).

A user can mount the battery 1 in the battery mounting unit 56 by inserting the battery 1 into the mounting space 56a in a state in which the lid body 57 is open. The battery 1 is inserted into the mounting space 56a from the front face 14 side (see FIG. 22). At this time, the battery 1 is inserted into the mounting space 56a in a direction in which the notches 2a and 2a match the erroneous insertion preventing protruding portions 56b and 56b. Accordingly, when the battery 1 is attempted to be inserted into the mounting space 56a in a direction in which the notches 2a and 2a do not match the erroneous insertion preventing protruding portions 56b and 56b, a part of the casing 2, for example, the inclining face 16 that is a corner portion formed by the top face 11 and the side face 13 is brought into contact with the erroneous insertion preventing protruding portions 56b and 56b, and erroneous insertion of the battery 1 into the mounting space 56a is prevented.

The insertion of the battery 1 into the mounting space 56a is performed in a state in which the pressing lever 62 is rotated up to the non-pressing position. When the battery 1 is inserted into the mounting space 56a, a state is formed in which the pressing lever 62 is slid to one side face 13 of the battery 1, and the rotation of the pressing lever 62 to the pressing position is regulated.

The connection terminals 35, 35, and 35 of the connector 33 of the battery 1 inserted into the mounting space 56a are connected to the electrode terminals 61, 61, and 61 of the terminal connecting unit 59. At this time, the electrode terminal 61 is inserted between one pair of contact portions that branches to the left and right sides of the connection terminal 35 and has elasticity in a contacting direction, and the connection terminal 35 is connected to the electrode terminal 61 in a state in which the one pair of contact portions has the electrode terminal 61 interposed therebetween from both the left and right sides. In addition, at this time, the positioning protruding portions 60a and 60a of the terminal connecting unit 59 are inserted into the positioning grooves 37 and 37 of the connector 33, whereby the connector 33 is positioned with respect to the terminal connecting unit 59.

Figure 23:
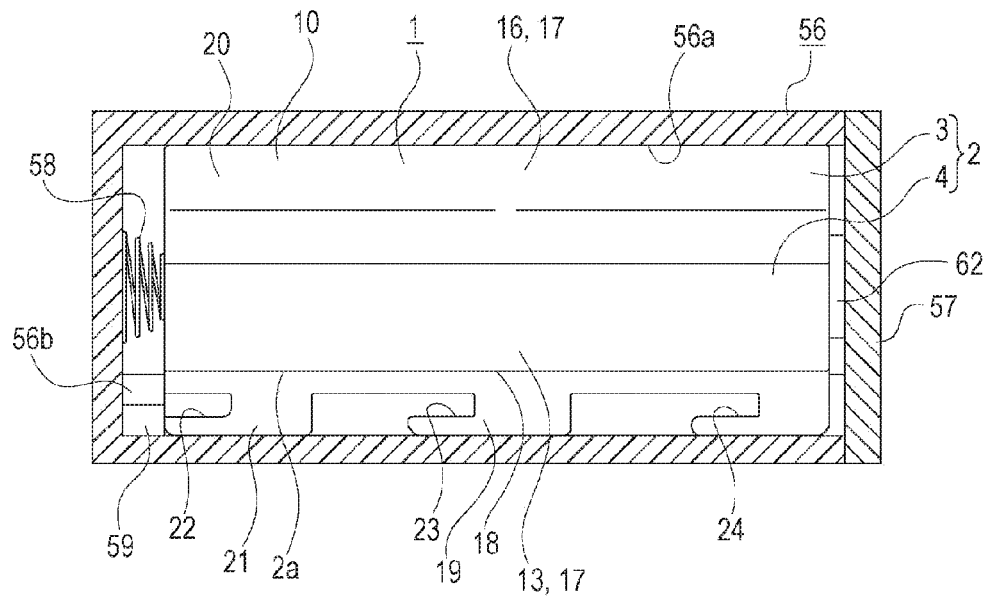
FIG. 23 is a cross-sectional view that illustrates a state in which a battery is mounted in a battery mounting unit.
Figure 24:
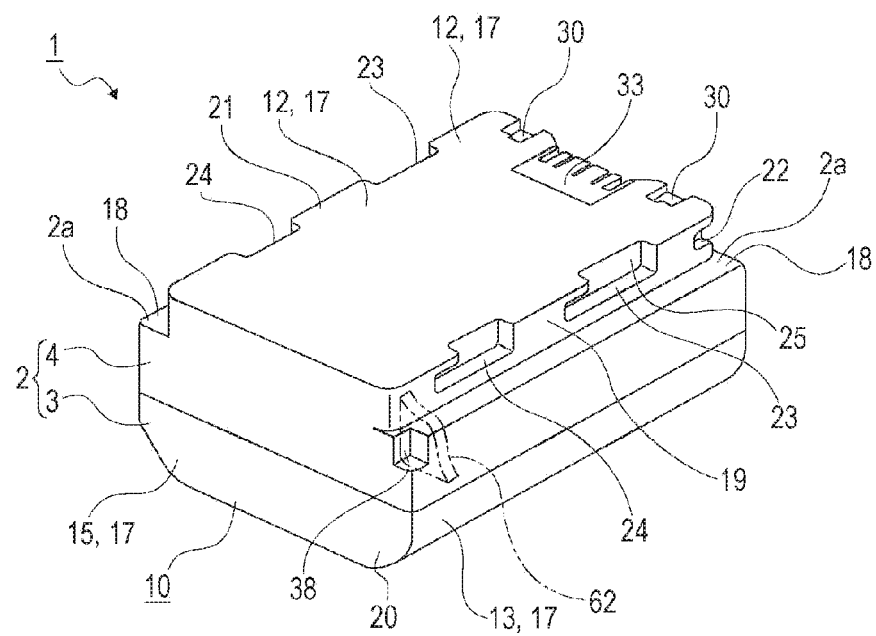
FIG. 24 is a perspective view that illustrates a state in which a concave part pressed to a rear end portion of a battery is formed, and the battery is pressed to a pressing lever.
Figure 25:
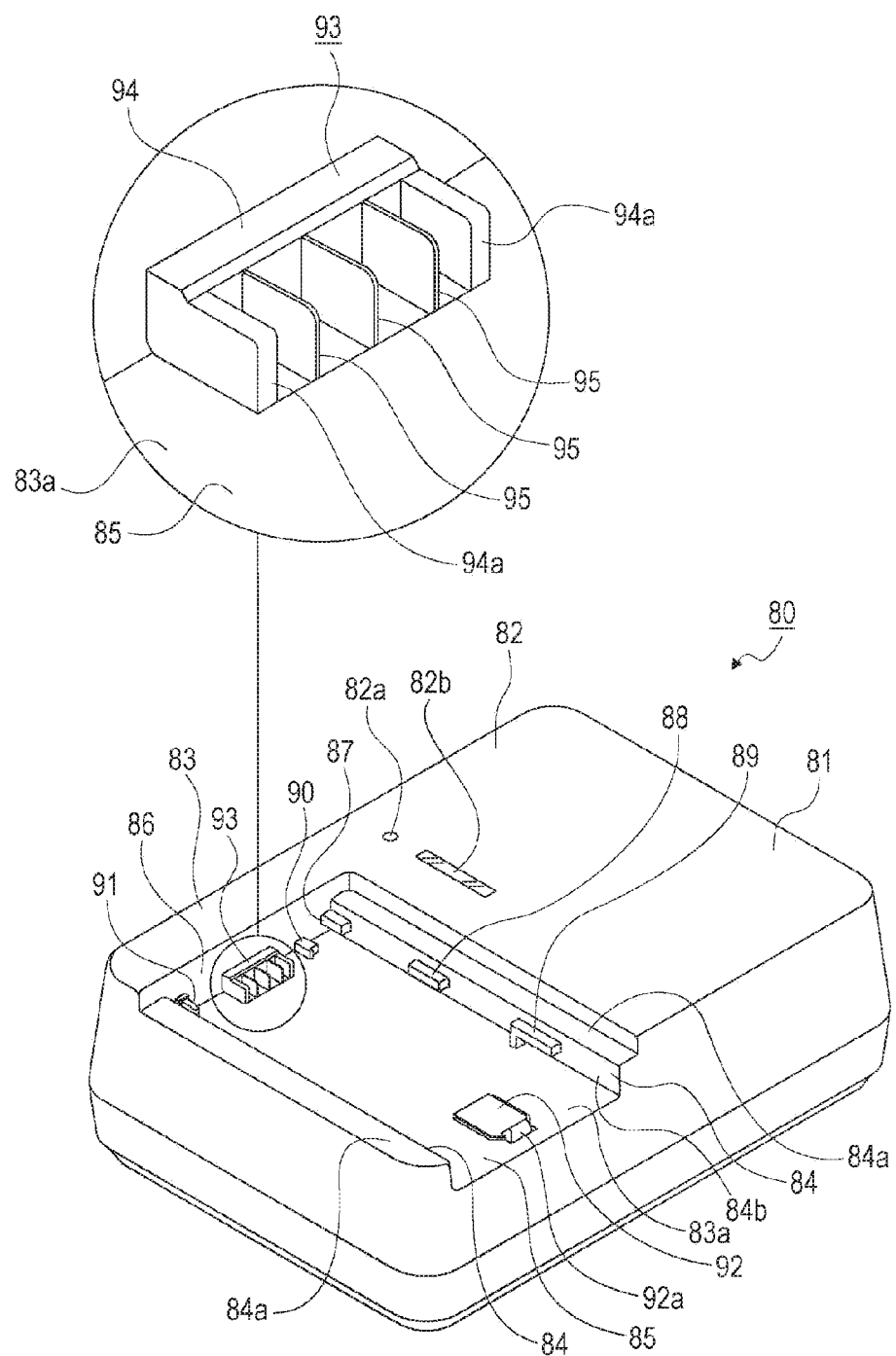
FIG. 25 is a perspective view of a charger.
Figure 26:
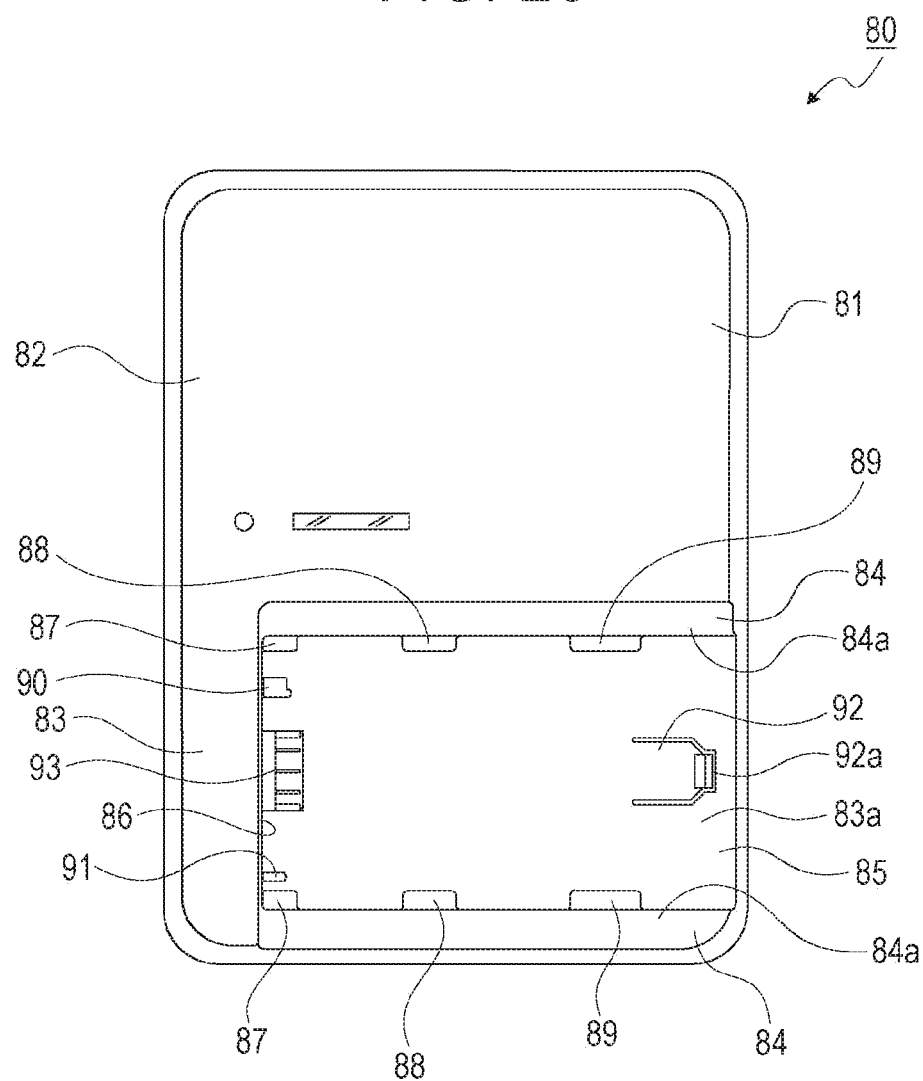
FIG. 26 is a plan view of a charger.
Figure 27:
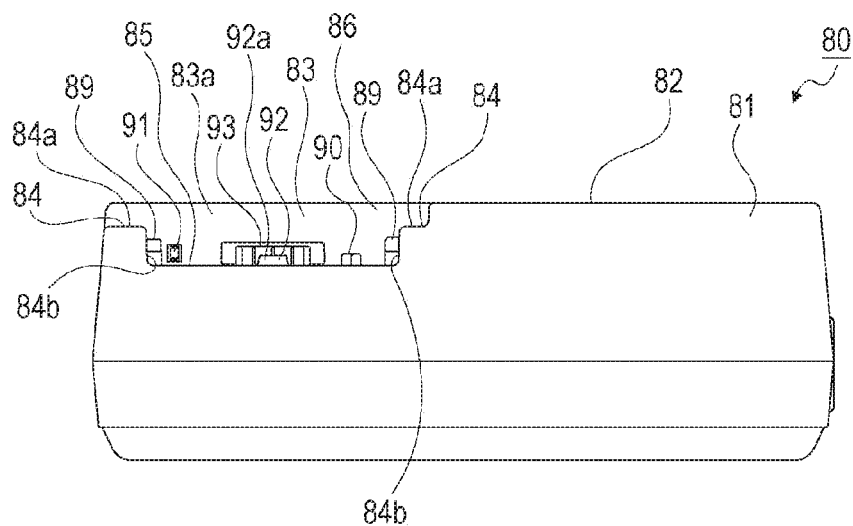
FIG. 27 is a side view of a charger.
Figure 28:
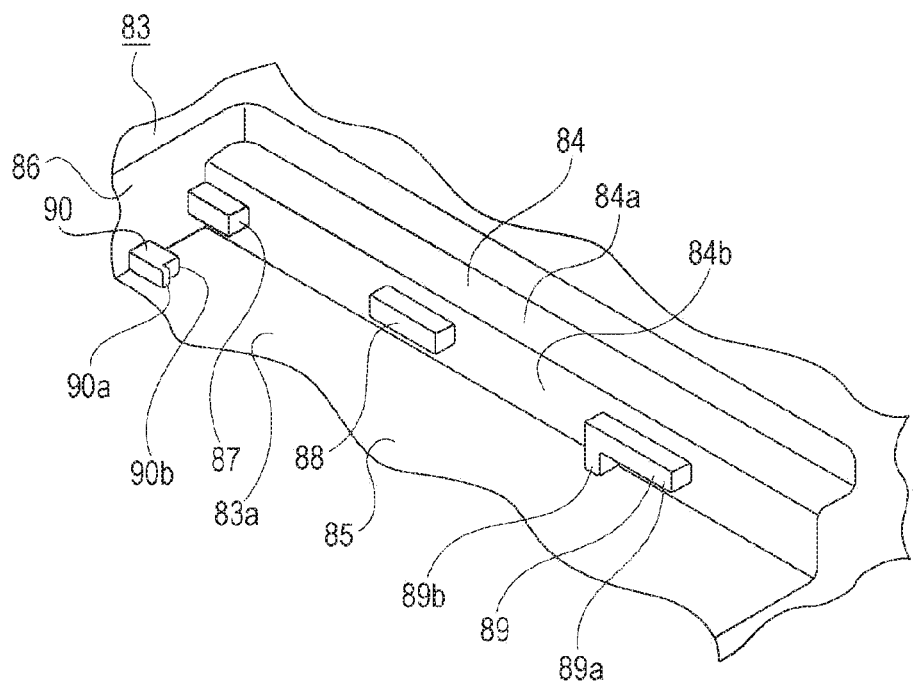
FIG. 28 is an enlarged perspective view that illustrates a guide engaging part and the like of a charger.

In a state in which the connection terminals 35, 35, and 35 are respectively connected to the electrode terminals 61, 61, and 61, the rear face 15 is positioned on a further inner side than the pressing lever 62 in the mounting space 56a, the pressing lever 62 rotates up to the pressing position in accordance with a biasing force of the spring, and the front face 14 is pressed by the biasing spring 58 to bias the battery 1 to the rear side (see FIG. 23). Accordingly, a pressed portion 15a (see FIG. 22) disposed on the rear face 15 is pressed by the pressing lever 62, the battery 1 is regulated not to be dropped out from the mounting space 56a. The pressed portion 15a is positioned on a further top face 11 side than the notch 2a.

As described above, in the state in which the drop-out of the battery 1 from the mounting space 56a is regulated by the pressing lever 62, by closing the mounting space 56a by using the lid body 57, the battery 1 is mounted in the battery mounting unit 56. At this time, the lid body 57 is locked to the external casing 51 by the locking mechanism.

On the other hand, by opening the mounting space 56a by releasing the locking of the lid body 57 with respect to the external casing 51 and rotating the lid body 57 and rotating the pressing lever 62 up to the non-pressing position, the battery 1 can be taken out from the battery mounting unit 56 by drawing out the battery 1 from the mounting space 56a.

In addition, in the description presented above, while an example has been illustrated in which the drop-out of the battery 1 from the mounting space 56a is regulated by pressing the pressed portion 15a of the rear face 15 to the pressing lever 62. For example, a configuration may be employed in which a pressed concave part 38 that is open at least to the rear side is formed in a rear end portion of the battery 1, a part of the pressing lever 62 is inserted into the pressed concave part 38, and the drop-out of the battery 1 from the mounting space 56a is regulated (see FIG. 24).

In this way, by forming the pressed concave part 38 into which a part of the pressing lever 62 is inserted in the battery 1, the pressing lever 62 can be positioned on the inside of the mounting space 56a, and the size of the imaging apparatus 50 can be decreased by that much.

<Another Example of Configuration of Connection Apparatus>

Next, as another example of a connection apparatus to which the battery 1 is connected, a charger 80 will be described (see FIGS. 25 to 29). In addition, while the charger 80 is an apparatus that is separate from the imaging apparatus 50 and the like, a connection structure of the charger 80 illustrated below may be integrally arranged in various apparatuses such as an imaging apparatus and the like. Thus, the battery 1 can be connected to an imaging apparatus or the like to which the connection structure of the charger 80 represented below is disposed.

The charger 80 is formed by arranging necessary units inside and outside a case body 81. In the charger 80, the connection structure represented below is arranged. The case body 81 is formed in an approximately rectangular parallelepiped shape, one approximately half portion in the horizontal direction is arranged as a mechanism arranging unit 82, and the other approximately half portion in the horizontal direction is arranged as a battery mounting unit 83.

Inside the mechanism arranging unit 82, a substrate, a light emitting body such as a light emitting diode, and the like, which are not illustrated in the drawing, are arranged. In an upper face portion of the mechanism arranging unit 82, window portions 82a and 82b are arranged. Light emitted from a light emitting diode through the window portions 82a and 82b is emitted toward the outside, the state of a charging operation, the state of a charged amount, and the like can be recognized on the basis of the state of emission through the window portions 82a and 82b.

In the battery mounting unit 83, a mounting concave part 83*a* that is open to the upper side and the rear side is formed. In both horizontal side portions of the mounting concave part 83*a*, step portions 84 and 84 are arranged, and the step portions 84 and 84 are formed in a shape protruding to the upper side and extending to the front and rear sides. The step portions 84 and 84 include flat faces 84*a* and 84*a* facing the upper side and opposing faces 84*b* and 84*b* that are continuous from the inner edges of the flat faces 84*a* and 84*a* and face each other. In addition, while a battery having a configuration in which only one notch 2*a* is formed in the casing is present, in the case of the battery mounting unit in which such a battery is mounted, one end portion 84 may be arranged.

The mounting concave part 83*a*, in addition to the step portions 84 and 84, includes face portions including a bottom plate face portion 85, which is positioned between the step portions 84 and 84, facing the upper side and a front plate face portion 86 facing the rear side, and the front plate face portion 86 is continuous from the front edges of the step portions 84 and 84 and the front edge of the bottom plate face portion 85. In the step portions 84 and 84, in order from the front side, first guide engaging parts 87 and 87, second guide engaging parts 88 and 88, and third guide engaging parts 89 and 89 are respectively disposed to be spaced apart from each other to the front and rear sides. Each of the first guide engaging parts 87 and 87, the second guide engaging parts 88 and 88, and third guide engaging parts 89 and 89 protrudes from the opposing faces 84*b* and 84*b* in a direction approaching each other.

The first guide engaging part 87 is formed in a protruding shape extending to the front and rear sides, and the front end is continuous from the front plate face portion 86 and protrudes from a middle portion of the opposing face 84*b* in the vertical direction. The second guide engaging part 88 is formed in a protruding shape extending to the front and rear sides and is positioned at a same height as that of the first guide engaging part 87. The third guide engaging part 89 is formed by an engagement portion 89*a* extending to the front and rear sides and a vertical wall portion 89*b* protruding from the front end portion of the engagement portion 89*a* to the lower side, and the lower end of the vertical wall portion 89*b* is continuous from the bottom plate face portion 85.

In addition, in a case where a battery of a type in which guided grooves are formed to be horizontally alternating such that only a first guided groove 22 and a third guided groove 24 are formed on one of the left and right sides, and only a second guided groove 23 is formed on the other of the left and right sides is mounted, only guide engaging parts corresponding to the guided grooves may be arranged. For example, in a case where a battery in which only the first guided groove 22 and the third guided groove 24 are formed on one of the left and right sides, and only the second guided groove 23 is formed on the other of the left and right sides is mounted, it may be configured such that only a first guide engaging part 87 and a third guide engaging part 89 are arranged on one of the left and right sides, and only a second guide engaging part 88 is arranged on the other of the left and right sides.

In the battery mounting unit 83, an identification protruding portion 90 protruding from the front end portion of the bottom plate face portion 85 to the upper side is arranged. In the identification protruding portion 90, a long portion 90*a* and a short portion 90*b* having mutually-different lengths in the front/rear direction are continuously arranged horizontally, and the length of the long portion 90*a* in the front/rear direction is longer than the length of the short portion 90*b* in the front/rear direction. The horizontal width of the long portion 90*a* is smaller than the horizontal width of the short portion 90*b*.

The identification protruding portion 90 has a front end to be continuous from the front plate face portion 86 and is arranged at a position near the first guide engaging part 87 of one of the left and right sides. More specifically, the identification protruding portion 90 is positioned on a further side of the first guide engaging part 87 of the one side than the center of a gap between the center of the bottom plate face portion 85 and the first guide engaging part 87 of the one side in the horizontal direction and is positioned on a further side of the first guide engaging part 87 of the one side than the center of a gap between the terminal connecting unit 93 and the first guide engaging part 87 of the one side. In the identification protruding portion 90, the short portion 90*b* is positioned on a further side of the first guide engaging part 87 of the one side than the long portion 90*a*.

In the front end portion of the battery mounting unit 83, a detection protruding portion 91 that can be moved to the front and rear sides is arranged. The detection protruding portion 91 is biased to the rear side by a spring member not illustrated in the drawing and is arranged at a position near the first guide engaging part 87 of the other side of the left and right sides. In addition, the detection protruding portion 91 may be arranged at a symmetrical position near the first guide engaging part 87 of the one side with respect to the center of the bottom plate face portion 85 in the horizontal direction. Furthermore, in the description presented above, while an example has been illustrated in which the identification protruding portion 90 and the detection protruding portion 91 are positioned on opposite sides in the horizontal direction with the terminal connecting unit 93 interposed therebetween, both the identification protruding portion 90 and the detection protruding portion 91 may be positioned on the left side or the right side of the terminal connecting unit 93. In such a case, the terminal connecting unit 93 and the detection protruding portion 91 are positioned on opposite sides in the horizontal direction with the identification protruding portion 90 interposed therebetween.

A part of the bottom plate face portion 85 is arranged as an engagement holding portion 92. The engagement holding portion 92 is a portion of the inner side of a slit of a "Π" shape formed in a part of the bottom plate face portion 85 and can be elastically transformed approximately vertically using the front end portion as a supporting point. An engagement protruding portion 92*a* protruding to the upper side is arranged in a rear end portion of the engagement holding portion 92.

In the front end portion of the battery mounting unit 83, the terminal connecting unit 93 is arranged. The terminal connecting unit 93 includes a holding portion 94 formed using a non-conductive material and electrode terminals 95, 95, and 95 formed using a conductive material and is held by the holding portion 94 in a state in which the electrode terminals 95, 95, and 95 are horizontally spaced apart from each other.

In the holding portion 94, positioning protruding portions 94*a* and 94*a* are arranged on the outer side of the electrode terminals 95, 95, and 95 in the horizontal direction. The size of the horizontal width of the positioning protruding portions 94*a* and 94*a* is larger than the size of the horizontal width of the electrode terminals 95, 95, and 95.

One ends of the electrode terminals 95, 95, and 95 of the terminal connecting unit 93 are connected to a substrate arranged inside the case body 81.

<Mounting Battery in Connection Apparatus (Charger)>

Hereinafter, the mounting of the battery 1 in the battery mounting unit 83 of the charger 80 will be described (see FIGS. 29 to 31).

A user can mount the battery 1 in the battery mounting unit 83 by inserting a part of the battery 1 in the mounting concave part 83*a*.

Figure 29:
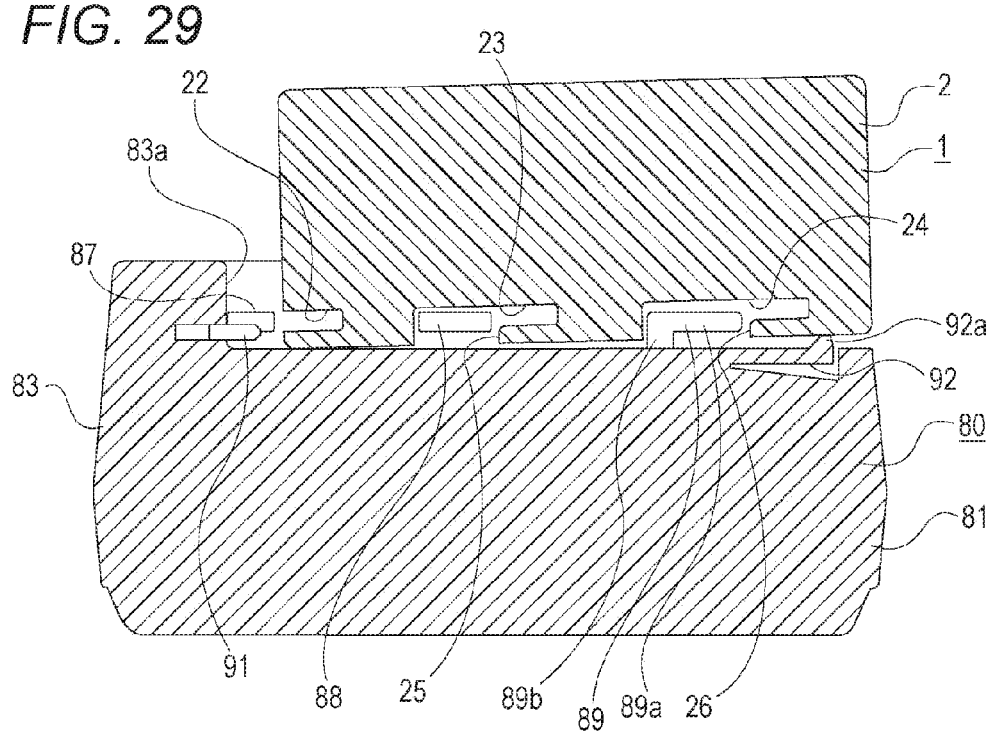
FIG. 29 is a cross-sectional view that illustrates a state in which a battery is inserted into a mounting concave part of a charger.

The battery 1 is inserted into the mounting concave part 83*a* from the upper side (see FIG. 29). At this time, the second guide engaging parts 88 and 88 are inserted into the second guided grooves 23 and 23 through the insertion grooves 25 and 25, and the engagement portions 89*a* and 89*a* of the third guide engaging parts 89 and 89 are inserted into the third guided grooves 24 and 24 through the insertion grooves 26 and 26. Thus, the step portions 84 and 84 of the charger 80 are respectively inserted into the notches 2*a* and 2*a* of the battery 1, the level difference faces 18 and 18 are positioned to face the flat faces 84*a* and 84*a* in the vertical direction, and the groove forming faces 19 and 19 are positioned to face the opposing faces 84*b* and 84*b* in the horizontal direction. At this time, since the battery 1 is arranged in the bottom plate face portion 85, the engagement protruding portion 92*a* is pressed to the lower side, and accordingly, the engagement holding portion 92 is elastically transformed.

On the other hand, when the battery 1 is attempted to be inserted into the mounting concave part 83*a* in a direction in which the step portions 84 and 84 are not inserted into the notches 2*a* and 2*a*, a part of the casing 2 is brought into contact with the step portions 84 and 84, and erroneous insertion of the battery 1 into the mounting concave part 83*a* is prevented.

Figure 30:
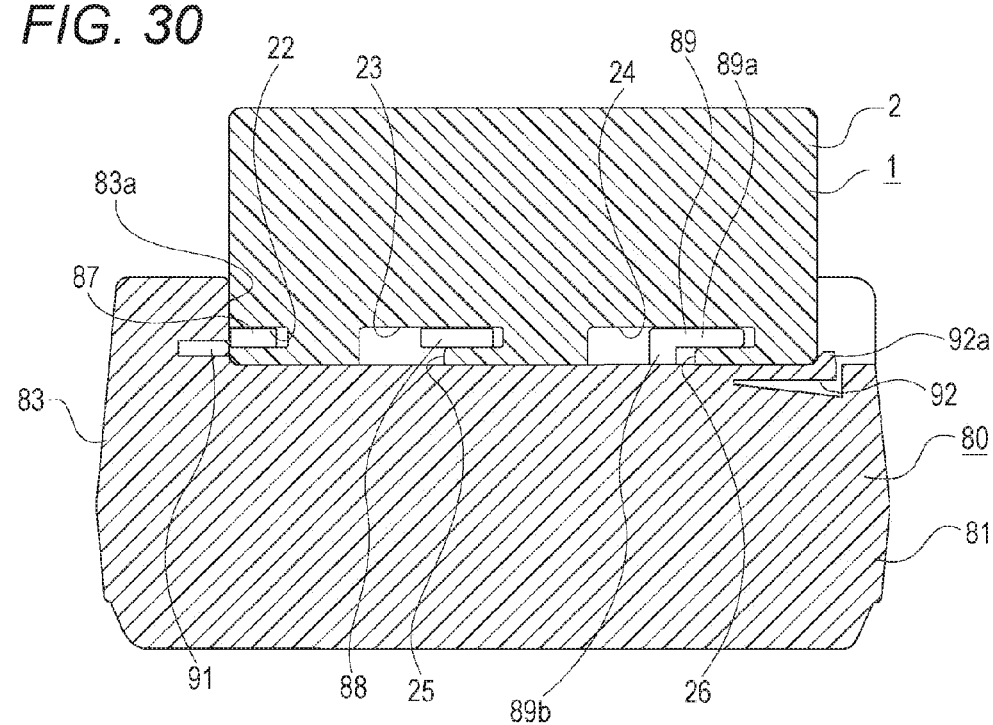
FIG. 30 is a cross-sectional view that illustrates a state in which a battery is mounted in a battery mounting unit of a charger.

Next, the battery 1 is slid to the front side with respect to the charger 80 (see FIG. 30). When the battery 1 is slid to the front side, the first guided grooves 22 and 22 are respectively guided to the first guide engaging parts 87 and 87, the second guided grooves 23 and 23 are respectively guided to the second guide engaging parts 88 and 88, and the third guided grooves 24 and 24 are respectively guided to the engagement portions 89*a* and 89*a* of the third guide engaging parts 89 and 89. The battery 1 is slid to the front side up to a movement end at which the rear opening edges of the third guided grooves 24 and 24 are respectively brought into contact with the regulation portions 89*b* and 89*b* of the third guide engaging parts 89 and 89.

In the state in which the battery 1 is slid to the front side up to the movement end, the opening edges of the first guided grooves 22 and 22 are respectively engaged with the first guide engaging parts 87 and 87, the opening edges of the second guided grooves 23 and 23 are respectively engaged with the second guide engaging parts 88 and 88, and the opening edges of the third guided grooves 24 and 24 are respectively engaged with the engagement portions 89*a* and 89*a* of the third guide engaging parts 89 and 89. Accordingly, the upper edge of the first engagement claw part 2*p* is engaged at least with a part of the lower edge of the first guide engaging part 87, the upper edge of the second engagement claw part 2*q* is engaged at least with a part of the lower edge of the second guide engaging part 88, and the upper edge of the third engagement claw part 2*r* is engaged at least with a part of the lower edge of the third guide engaging part 89.

At this time, the rear end edge of the battery 1 is positioned to the front side of the engagement protruding portion 92*a* of the engagement holding portion 92, the engagement protruding portion 92*a* is engaged with the lower end portion of the lower end edge of the battery 1 in accordance with elastic return of the engagement holding portion 92, whereby the battery 1 is mounted in the battery mounting unit 83.

When the battery 1 is mounted in the battery mounting unit 83, the detection protruding portion 91 of the charger 80 is pressed and operated by a pressed portion 14*a* for detection that is arranged on the front face 14 of the battery 1. As the detection protruding portion 91 is moved to the front side, and the detection protruding portion 91 is moved to the front side, it is detected by a detection unit not illustrated in the drawing that the battery 1 is mounted in the battery mounting unit 83. In a case where it is detected that the battery 1 is mounted in the battery mounting unit 83, in a state in which the charger 80 is connected to a power supply, light is emitted from a light emitting diode, and the light is emitted to the upper side through the window portions 82*a* and 82*b*. Accordingly, by visually recognizing the state of the light emitted through the window portions 82*a* and 82*b*, a chargeable state/non-chargeable state and the charged amount of the battery 1 can be recognized by a user.

Figure 31:
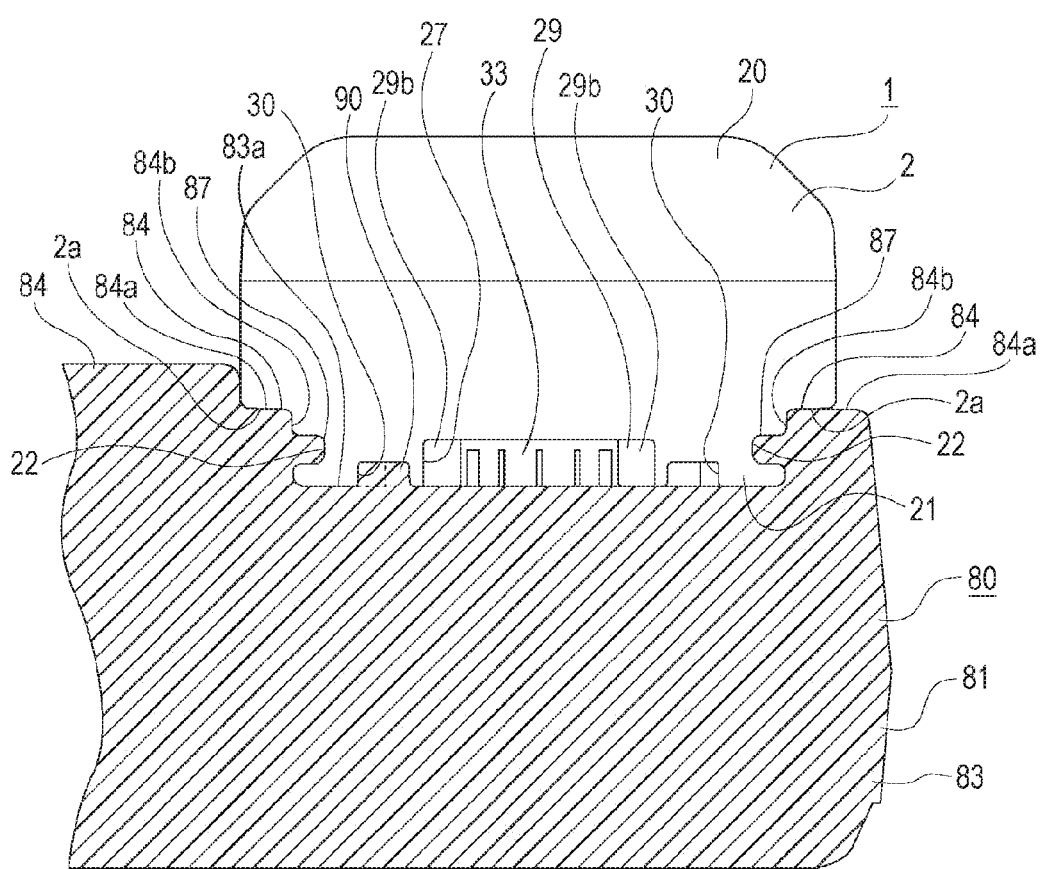
FIG. 31 is a cross-sectional view that illustrates a state in which a battery is mounted in a battery mounting unit of a charger.

In addition, when the battery 1 is mounted in the battery mounting unit 83, the identification protruding portion 90 of the charger 80 is inserted into the identification groove 30 of one side of the battery 1 (see FIG. 31). The identification protruding portion 90 has the long portion 90*a* inserted into the first identification part 31 and the short portion 90*b* inserted into the second identification parts 32.

As the identification protruding portion 90 is inserted into the identification groove 30, it is identified that the battery 1 mounted in the battery mounting unit 83 is of a type that can be charged by the charger 80. The battery 1, for example, is of a type having a medium chargeable power capacity.

Figure 32:
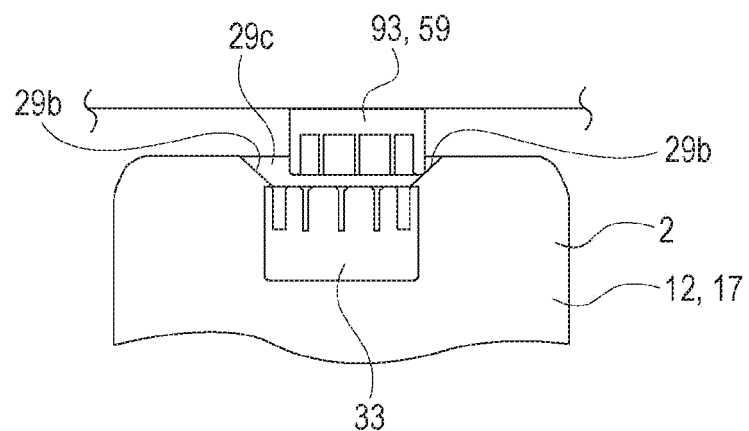
FIG. 32 is a conceptual diagram that illustrates a state in which a battery is guided to a terminal connecting unit when the battery is mounted in a charger.

In addition, when the battery 1 is mounted in the battery mounting unit 83, the terminal connecting unit 93 of the charger 80 is inserted between the wall portions 29*b* and 29*b* of the battery 1. At this time, since there are a gap, a dimensional tolerance, and the like used for securing smooth insertion of the battery 1 into the battery mounting unit 83 between the battery 1 and the charger 80, there is a possibility that the battery 1 is inserted into the battery mounting unit 83 in a state inclining to the left or right side or a displaced state with respect to the charger 80 (see FIG. 32).

Figure 33:
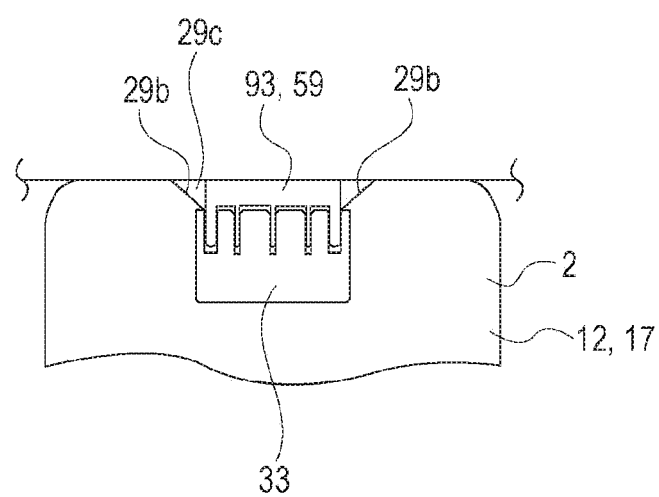
FIG. 33 is a conceptual diagram that illustrates a state in which a battery is mounted in a charger, and a terminal connecting unit and a connector are connected.

Also in a case where the battery 1 is inserted into the charger 80 in the inclining state or the displaced state, since the wall portions 29*b* and 29*b* are formed as inclining faces that are spaced apart from each other in the horizontal direction as the wall portions advance to a further front side, the terminal connecting unit 93 is guided to the wall portions 29*b* and 29*b* to become closer to the connector 33. Accordingly, the connection terminals 35, 35, and 35 of the connector 33 of the battery 1 are reliably connected to the electrode terminals 95, 95, and 95 of the terminal connecting unit 93 (see FIG. 33). At this time, the positioning protruding portions 94*a* and 94*a* of the terminal connecting unit 93 are respectively inserted into the positioning grooves 37 and 37 of the connector 33, and the positioning of the connector 33 with respect to the terminal connecting unit 93 is performed.

On the other hand, by releasing the engagement of the engagement protruding portion 92*a* with the rear end edge and releasing the engagement of the first guide engaging parts 87 and 87, the second guide engaging parts 88 and 88, and the third guide engaging parts 89 and 89 by sliding the battery 1 to the rear side and taking out the battery 1 from the mounting concave part 83*a* to the upper side, the battery 1 can be taken out from the battery mounting unit 83.

<Summary>

As described above, in the battery 1, a face forming the arrangement concave part 27 of the casing 2 is formed as the concave part forming face 29, and the middle portion 29c that is a part of the concave part forming face 29 is present between the front face 14 of the outer face 10 and the connector 33.

Accordingly, since the front face 33a of the connector 33 is positioned on a further inner side in the casing 2 than the front face 14 of the casing 2, the occurrence of damage and a scratch in the connector 33 at the time of falling or the like is reduced, and an excellent state of a connection of the connection terminal 35 with the electrode terminals 61 and 95 can be secured.

Particularly, since it is difficult for an impact force to be transmitted to the connector 33 in accordance with a falling impact, it is difficult for a crack in solder used for connecting the connection terminal 35 to the circuit substrate 9 to occur, and the occurrence of an electrical connection defect can be reduced.

Figure 34:
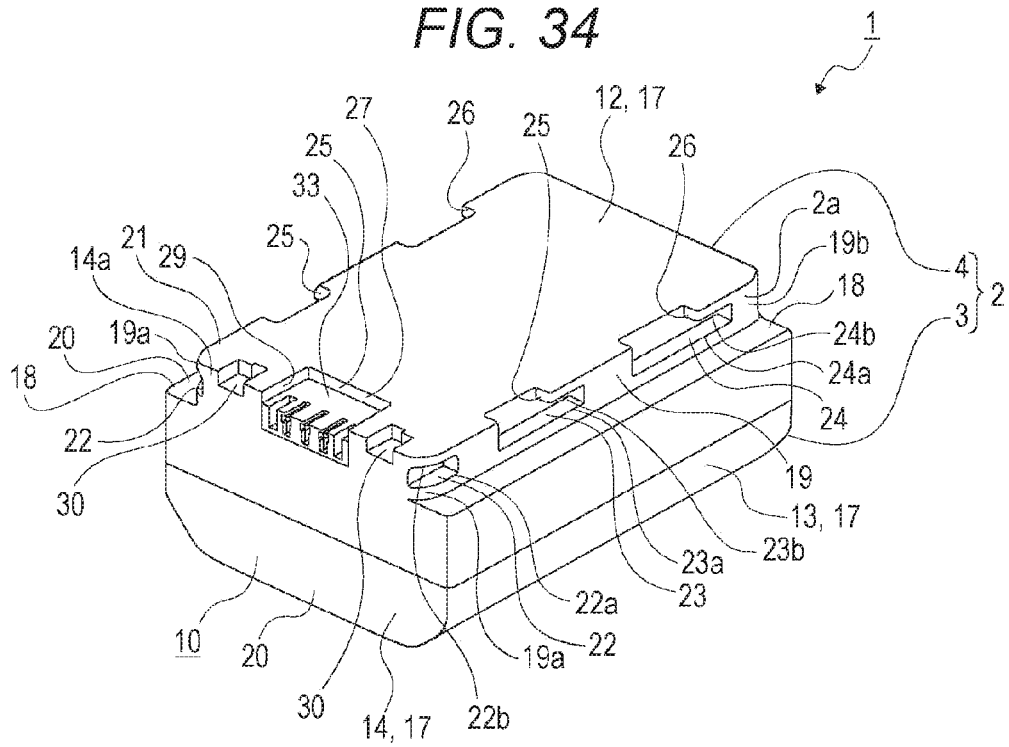
FIG. 34 is a perspective view that illustrates an example in which a connector is positioned on a further upper side than the bottom face.

In addition, since the occurrence of damage or a scratch in the connector 33 is reduced, it is difficult for the connection terminal 35 to be exposed from the housing 34, and a high quality of the connector 33 can be secured. In addition, in the description presented above, while an example has been illustrated in which the front face 33a of the connector 33 is positioned on a further inner side in the casing 2 than the front face 14 of the casing 2, for example, the lower face 33b of the connector 33 may be positioned on a further inner side in the casing 2 than the bottom face 12 of the casing 2 (see FIG. 34). In this way, also in a case where the lower face 33b of the connector 33 is positioned on a further inner side in the casing 2 than the bottom face 12 of the casing 2, the occurrence of damage and a scratch in the connector 33 at the time of falling or the like is reduced, and an excellent state of a connection of the connection terminal 35 with the electrode terminals 61 and 95 can be secured.

Figure 35:
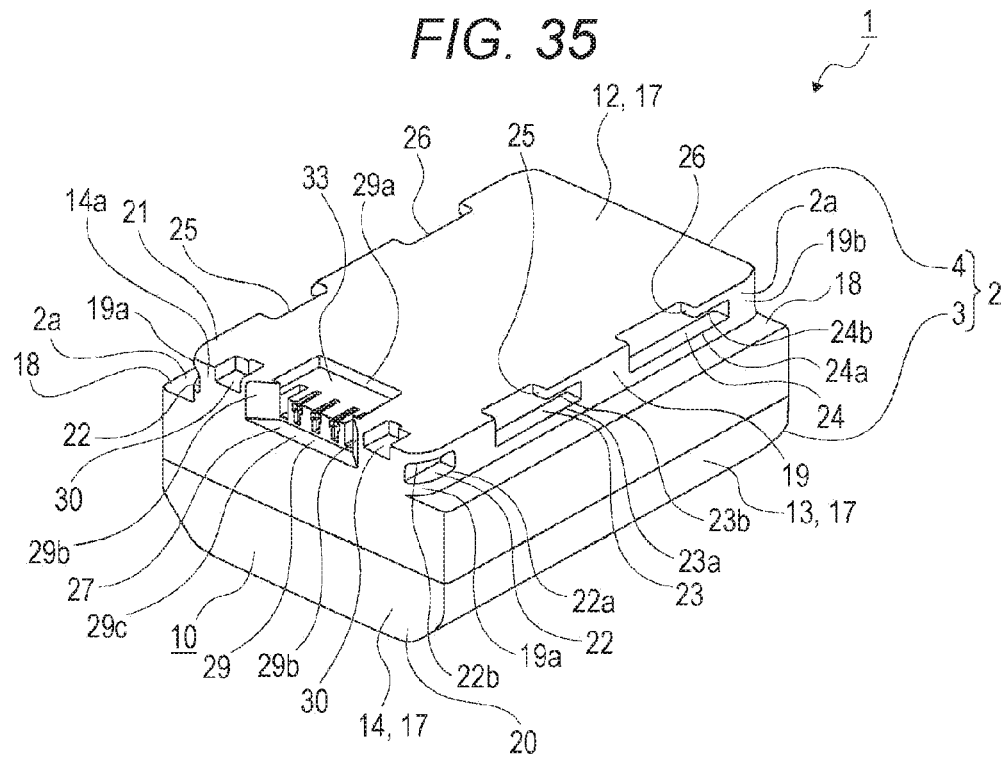
FIG. 35 is a perspective view that illustrates an example in which a connector is positioned on a further rear side than a front face and on a further upper side than the bottom face.

In addition, for example, it may be configured such that the front face 33a of the connector 33 is positioned on a further inner side in the casing 2 than the front face 14 of the casing 2, and the lower face 33b of the connector 33 is positioned on a further inner side in the casing 2 than the bottom face 12 of the casing 2 (see FIG. 35).

In this way, in a case where the front face 33a is positioned on a further inner side in the casing 2 than the front face 14, and the lower face 33b is positioned on a further inner side in the casing 2 than the bottom face 12, the whole connector 33 is positioned on the inner side of the casing 2. Accordingly, the occurrence of damage and a scratch in the connector 33 at the time of falling or the like is further reduced, and a more excellent state of a connection of the connection terminal 35 with the electrode terminals 61 and 95 can be secured.

In addition, in the battery 1, the arrangement concave part 27 is open in a direction of the connection of the connection terminal 35 with the electrode terminals 61 and 95, and a middle portion 29c that is the concave part forming face 29 is present between the outer face 10 and the connector 33 in the connection direction.

Accordingly, since the connector 33 is positioned on a further inner side in the casing 2 than the outer face 10, the electrode terminals 61 and 95 are inserted up to the inner side of the arrangement concave part 27 at the time of connection, and the size of the connection apparatus (the imaging apparatus 50 or the charger 80) in the connection direction can be decreased.

In addition, a part of the concave part forming face 29 is formed as an inclining face in which the opening area of the arrangement concave part 27 increases as the part is further spaced apart from the connector 33 in the opening direction (connection direction) of the arrangement concave part 27.

Accordingly, since a part of the concave part forming face 29 functions as a guide face at the time of inserting the electrode terminals 61 and 95 into the arrangement concave part 27, an excellent state of the connection between the connection terminal 35 and the electrode terminals 61 and 95 can be secured.

Furthermore, the concave part forming face 29 includes one pair of the wall portions 29b and 29b positioned to be spaced apart from each other in a direction orthogonal to the connection direction, and the wall portions 29b and 29b are formed as inclining faces further spaced apart from each other in the connection direction.

Accordingly, since the wall portions 29b and 29b function as guide faces at the time of inserting the electrode terminals 61 and 95 into the arrangement concave part 27, a more excellent state of the connection between the connection terminal 35 and the electrode terminals 61 and 95 can be secured.

Figure 36:
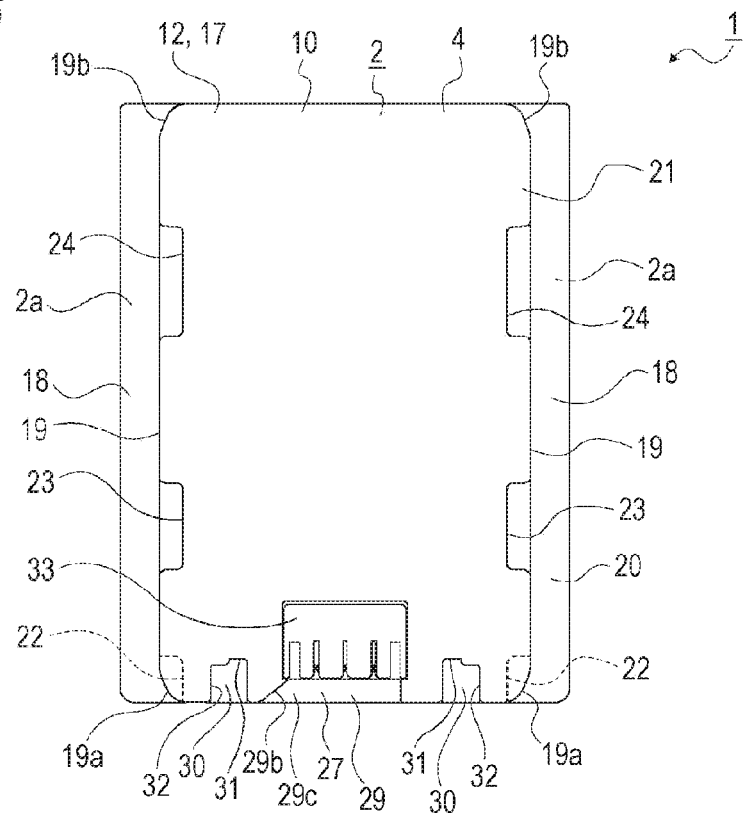
FIG. 36 is a bottom view that illustrates an example in which one of wall portions of a concave part forming face inclines.

In addition, in the description presented above, while an example has been illustrated in which one pair of the wall portions 29b and 29b is formed as inclining faces spaced apart from each other in the connection direction, for example, one wall portion 29b may be formed as an inclining face having an opening area of the arrangement concave part 27 that increases along the connection direction (see FIG. 36).

Figure 37:
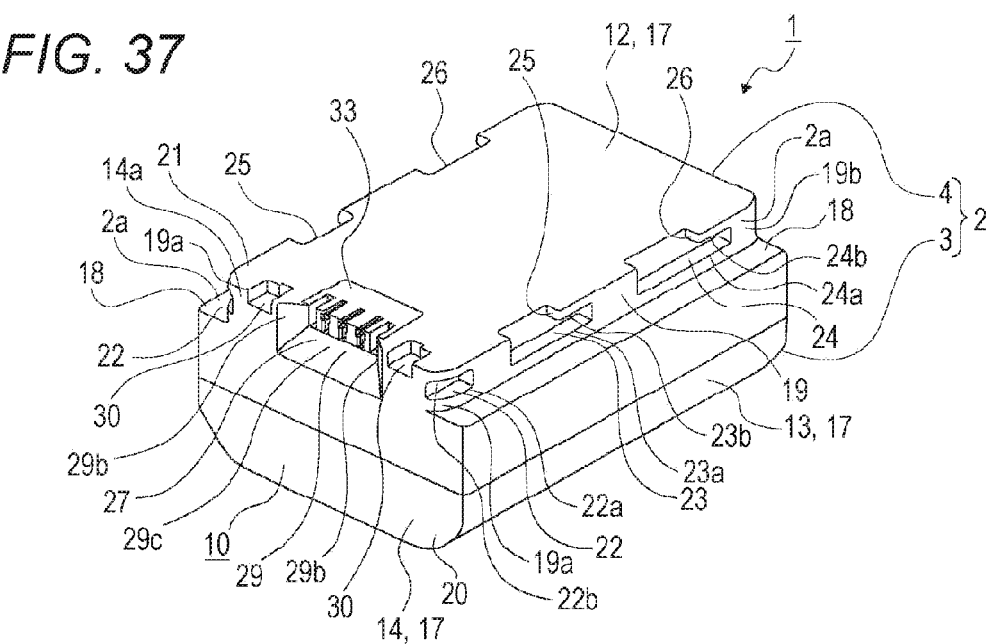
FIG. 37 is a perspective view that illustrates an example in which one pair of wall portions and a middle portion of a concave part forming face incline.

In addition, in the battery 1, the middle portion 29c of the concave part forming face 29 may be formed as an inclining face having an opening area of the arrangement concave part 27 that increases as the middle portion is further spaced apart from the connector 33 in the connection direction (see FIG. 37).

In this way, by forming the middle portion 29c as the inclining face, the middle portion 29c functions as a guide face at the time of inserting the electrode terminals 61 and 95 into the arrangement concave part 27, and accordingly, a more excellent state of the connection between the connection terminal 35 and the electrode terminals 61 and 95 can be secured.

In addition, in such a case, the wall portions 29b and 29b may be formed as inclining faces in addition to the middle portion 29c, one wall portion 29b may be formed as an inclining face in addition to the middle portion 29c, or only the middle portion 29c may be formed as an inclining face.

Here, while the inclination angle of the wall portion 29b or the middle portion 29c with respect to the connection direction is arbitrary, for example, it is preferable that the inclination angle is larger than 0 degrees and equal to or smaller than 45 degrees.

By configuring the inclination angle of the wall portion 29b or the middle portion 29c to be larger than 0 degrees and equal to or smaller than 45 degrees, the inclination angle of the concave part forming face 29 functioning as a guide face is an acute angle, and accordingly, the electrode terminals 61 and 95 guided to the guide face can be smoothly inserted into the arrangement concave part 27.

Figure 38:
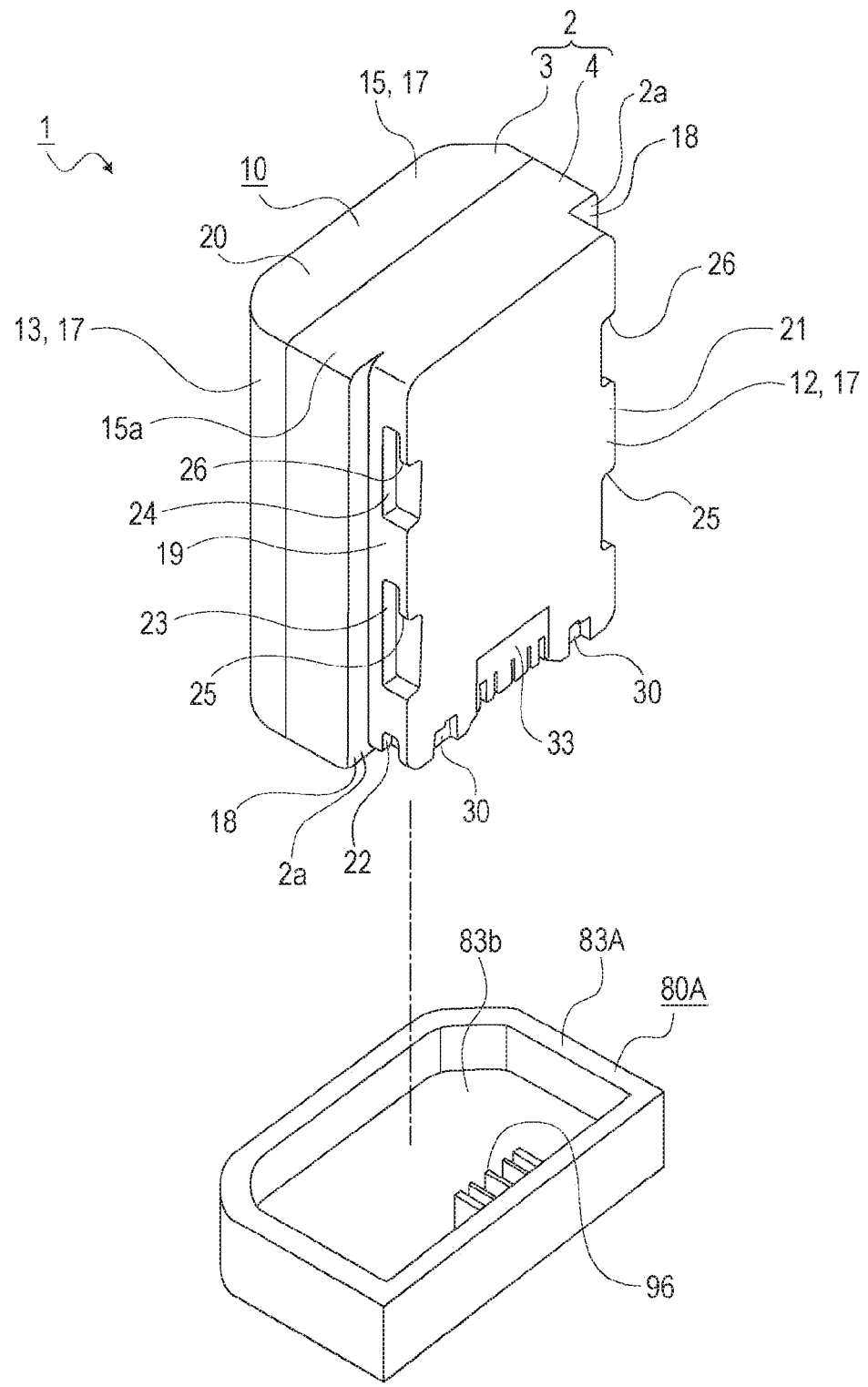
FIG. 38 is a perspective view that illustrates another example of a charger together with a battery.

In addition, in the description presented above, while the charger 80 of a type in which the battery 1 is inserted into the mounting concave part 83a from the upper side and then is slid to the front side for mounting has been illustrated as an example, as another type, there is a charger 80A in which the battery 1 is mounted by inserting the battery 1 from the upper side (see FIG. 38).

For example, the whole charger 80A is arranged as a battery mounting unit 83A, and a mounting concave part 83b that is open to the upper side is formed in the battery mounting unit 83A. In the battery mounting unit 83A, a terminal connecting unit 96 having electrode terminals is arranged. The battery 1 is inserted into the mounting concave part 83b of the charger 80A in a direction in which the front face 14 faces the lower side.

In such a case, by forming at least one of the wall portions 29b and 29b and the middle portion 29c of the battery 1 as an inclining face (guide face), the terminal connecting unit 96 is guided to the inclining face in accordance with the own weight of the battery 1 at the time of inserting the battery 1 into the mounting concave part 83b.

Accordingly, an easy and excellent connection state of the battery 1 for the charger 80A can be secured. In the battery 1, in the casing 2, the notch 2a is formed according to the level difference face 18 continuous from the side face 13 and the groove forming face 19 continuous from the bottom face 12, the first guided groove 22, the second guided groove 23, and the third guided groove 24 that are open to the groove forming face 19 are formed, and the first guided groove 22, the second guided groove 23, and the third guided groove 24 are positioned on a further bottom face 12 side than the level difference face 18.

Accordingly, the first guided groove 22, the second guided groove 23, the third guided groove 24 and the level difference face 18 are not positioned to be continuous, but a part of the groove forming face 19 is positioned between the first guided groove 22, the second guided groove 23, the third guided groove 24 and the level difference face 18. Therefore, the groove forming face 19 and the level difference face 18 are closer to the cell 6 than a case where the first guided groove 22, the second guided groove 23, the third guided groove 24 and the level difference face 18 are positioned to be continuous, the size of the battery 1 can be decreased.

In addition, since the notches 2a and 2a are formed respectively at positions continuous from the two side faces 13 and 13, the notches 2a and 2a are present on both sides of the two side faces 13 and 13, and the outer face 10 of the casing 2 is positioned to be close to the cells 6 and 6 at two places, and the size of the battery 1 can be further decreased.

Furthermore, the first guided grooves 22 and 22, the second guided grooves 23 and 23, and the third guided grooves 24 and 24 are formed to be spaced apart from each other in the direction of connecting the connection terminal 35 to the electrode terminals 61 and 95.

Accordingly, portions between the first guided groove 22, the second guided groove 23, and the third guided groove 24 in the casing 2 are formed as protruding portions with respect to the first guided groove 22, the second guided groove 23, and the third guided groove 24, and therefore, the protruding portions function as reinforcing ribs, and the strength of the casing 2 is improved.

<Another Configuration Example of Battery>

Hereinafter, another configuration example of the battery 1 will be described (see FIGS. 39 to 44).

Figure 39:
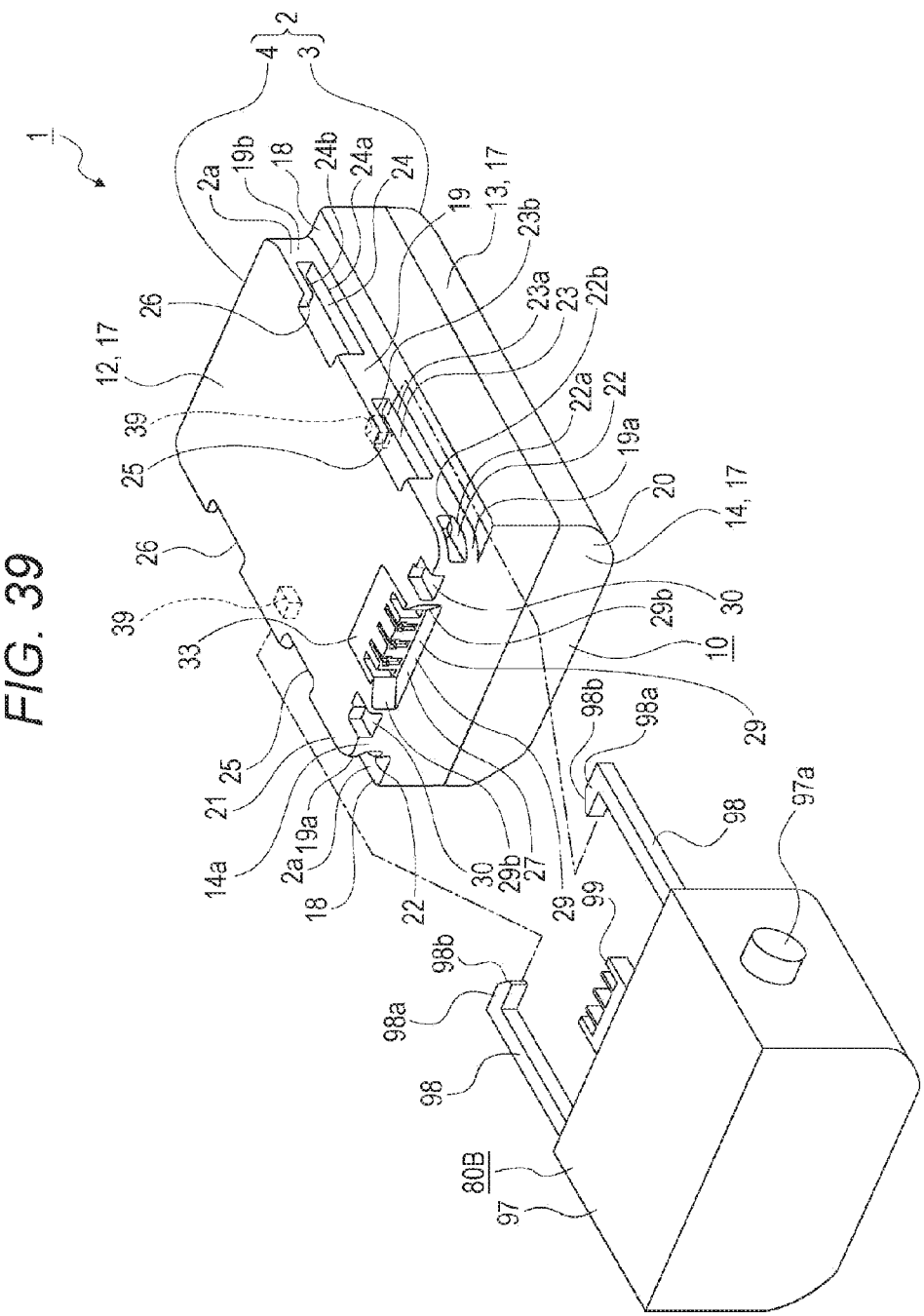
FIG. 39 is a perspective view that illustrates further another example of a charger together with a battery.
Figure 40:
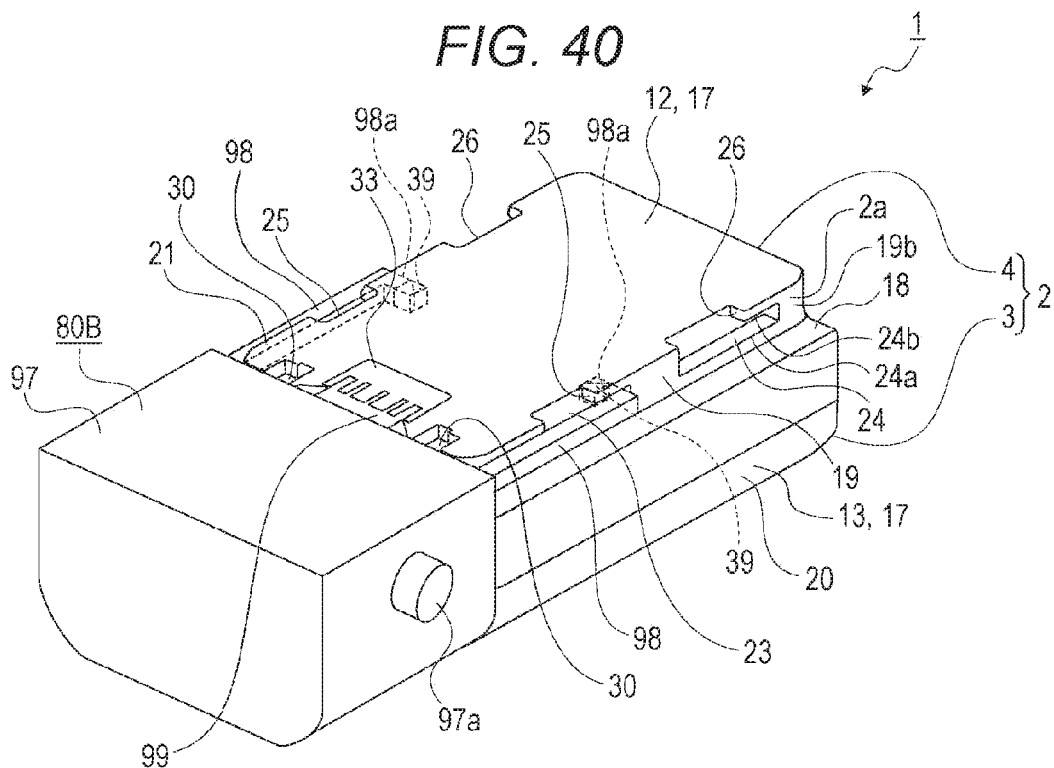
FIG. 40 is a perspective view that illustrates a state in which a battery is held in a charger of the further another example.

At least horizontal both sides of the battery 1, engagement concave parts 39 and 39 may be formed (see FIG. 39). The engagement concave parts 39 and 39, for example, are respectively open to second guided grooves 23 and 23. The battery 1 in which such engagement concave parts 39 and 39 are formed, for example, is connected in a state being held by a charger 80B. The charger 80B includes a main body 97, holding arms 98 and 98 protruding from the main body 97 to the rear side, and a terminal connecting unit 99 including electrode terminals arranged in the main body 97 in the state of protruding to the rear side. In the main body 97, an operation button 97a is arranged, and, by operating the operation button 97a, the holding arms 98 and 98 operate in a direction of being spaced apart from each other.

The holding arms 98 and 98 are arranged as engagement protruding parts 98a and 98a bending in directions in which the tip end portions approach each other. In the tip end portions of the holding arms 98 and 98, sliding faces 98b and 98b inclining in directions approaching each other as approaching the main body 97 are formed. The holding arms 98 and 98 are biased in directions approaching each other by springs, which are not illustrated in the drawings, arranged inside the main body 97.

As the battery 1 is moved to the front side with respect to the charger 80B, the front edge of the battery 1 is slid to sliding faces 98b and 98b to cause the holding arms 98 and 98 to move in directions being spaced apart from each other against the biasing forces of the springs, and the holding arms 98 and 98 are respectively inserted into the first guided grooves 22 and 22. The holding arms 98 and 98 are relatively moved respectively from the first guided grooves 22 and 22 toward the second guided grooves 23 and 23 and are temporarily placed on the groove forming faces 19 and 19 from the first guided grooves 22 and 22 and moved again in the directions approaching each other to be inserted into the second guided grooves 23 and 23, and the engagement protruding parts 98a and 98a are respectively engaged with the engagement concave parts 39 and 39 (see FIG. 40). The engagement protruding parts 98a and 98a of the charger 80B are engaged with the engagement concave parts 39 and 39 and are in a state of pinching the battery 1 from horizontal both sides, whereby the battery 1 is held by the charger 80B. When the engagement protruding parts 98a and 98a are respectively engaged with the engagement concave parts 39 and 39, simultaneously, the connector 33 is connected to the terminal connecting unit 99.

In a case where the holding of the battery 1 in the charger 80B is released, the releasing operation can be performed by moving the holding arms 98 and 98 in the directions spaced apart from each other by operating the operation button 97a to release the engagement state of the engagement protruding parts 98a and 98a with the engagement concave parts 39 and 39 and pulling the battery 1 and the charger 80B away from each other. In addition, in the description presented above, while an example has been illustrated in which the engagement concave parts 39 and 39 are respectively open to the second guided grooves 23 and 23, the engagement concave parts 39 and 39 may be respectively open to insertion grooves 24 and 24. However, in a case where the engagement concave parts 39 and 39 are open to the guided grooves 23 and 23, the engagement protruding parts 98a and 98a of the charger 80B are inserted into the guided grooves 23 and 23 and guided, and accordingly, the engagement protruding parts 98a and 98a can be reliably engaged with the engagement concave parts 39 and 39. As described above, by forming the engagement concave parts 39 and 39 with which the engagement protruding parts 98a and 98a that are respectively open in opposite directions in the casing 2 are engaged, the battery 1 can be held by engaging the engagement protruding parts 98a and 98a with the engagement concave parts 39 and 39 from the opposite sides, and accordingly, the battery 1 can be easily held in a stable state.

Figure 41:
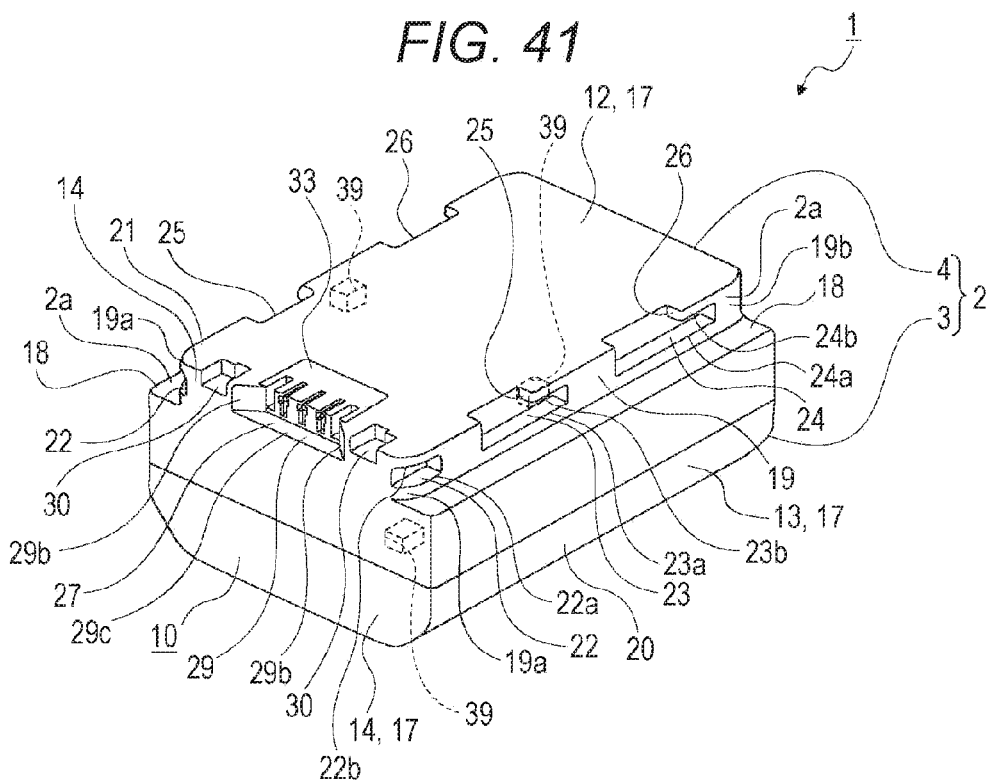
FIG. 41 is a perspective view that illustrates an example of a battery in which three engagement concave parts are formed.
Figure 44:
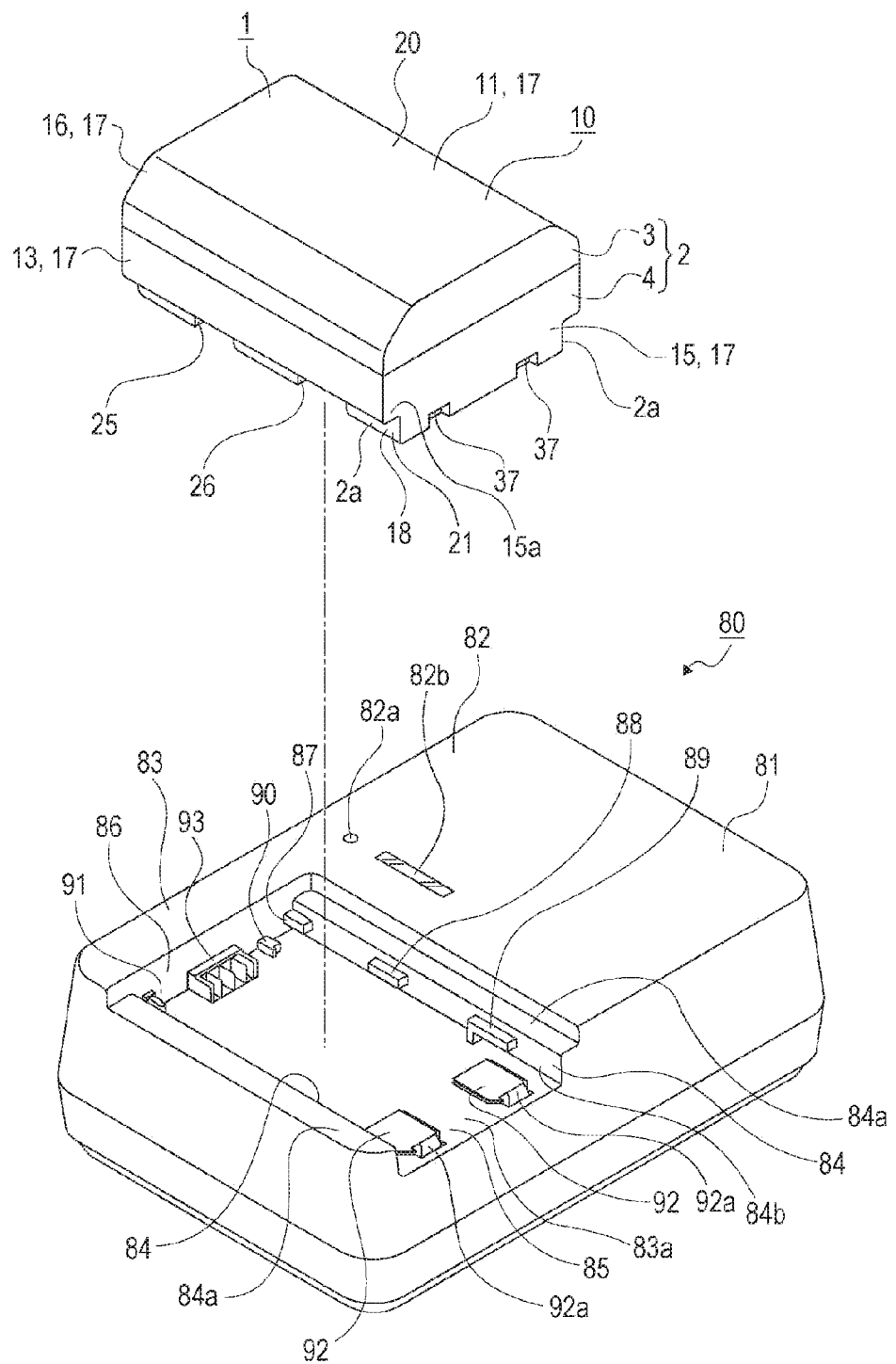
FIG. 44 is a perspective view that illustrates an example of a battery in which an engagement concave part is formed in a lower end portion of a rear end portion.

In addition, in the description presented above, while an example has been illustrated in which the engagement concave parts 39 and 39 are formed on the horizontal both sides of the battery 1, for example, in addition to the engagement concave parts 39 and 39 of the horizontal both sides, an engagement concave part 39 that is open to at least one of the top face 11 or the bottom face 12 may be formed (see FIG. 41).

In this way, by forming the engagement concave part 39 that is open to the top face 11 or the bottom face 12 orthogonal to the faces of the horizontal both sides facing the opposite sides, the battery 1 can be held by engaging the engagement protruding parts 98*a*, 98*a*, and 98*a* with the engagement concave parts 39, 39, and 39 from opposite sides and a side orthogonal to the opposite sides, and accordingly, the battery 1 can be held in a more stable state.

In addition, since the engagement concave part 39 is formed in an area in which the second guided groove 23 is present, the engagement protruding part 98*a* is guided by the second guided groove 23 to be engaged with the engagement concave part 39, and accordingly, the engagement of the engagement protruding part 98*a* with the engagement concave part 39 can be performed easily and reliably.

Furthermore, the engagement concave part 39 may be formed in an area in which the first guided groove 22 is present (see FIG. 42) instead of the area in which the second guided groove 23 is present or may be formed in an area in which the third guided groove 24 is present (see FIG. 43).

Particularly, in a case where the engagement concave part 39 is formed in the area in which the first guided groove 22 is present, the engagement concave part 39 is present in an area in which the first guided groove 22 positioned on the front end side in the connection direction. Accordingly, when the battery 1 is mounted in the charger 80B, it is not necessary for the engagement protruding part 98*a* to go over the groove forming face 19, and the engagement of the engagement protruding part 98*a* with the engagement concave part 39 can be easily performed in a speedy manner.

In addition, when the engagement protruding part 98*a* is engaged with the engagement concave part 39, the electrode terminals of the terminal connecting unit 99 are connected to the connection terminals 35 of the connector 33.

Accordingly, since the engagement of the engagement protruding part 98*a* with the engagement concave part 39 and the connection of the electrode terminals to the connection terminals 35 are simultaneously performed, it is not necessary to individually perform the operation of engaging the engagement protruding part 98*a* with the engagement concave part 39 and the operation of connecting the electrode terminals to the connection terminals 35, and the operability can be improved.

In addition, the engagement concave part 39 may be formed in an area other than the area in which the first guided groove 22, the second guided groove 23 or the third guided groove 24 is present and may be formed in a state being open to the groove forming face 19. For example, in lower end portions of the rear end portions of the groove forming faces 19 and 19, engagement concave parts 39 and 39 that are open at least to the lower side and the rear side may be formed (see FIG. 44).

By configuring the engagement concave parts 39 and 39 to be respectively formed in the lower end portions of the rear end portions of the groove forming faces 19 and 19, the battery 1 can be held by the charger 80 or the like, for example, by arranging two engagement holding portions 92 and 92 in the charger 80 or the like and locking the locking protruding portions 92*a* and 92*a* of the engagement holding portions 92 and 92 into the opening edges of the engagement concave parts 39 and 39.

In such a case, since the engagement concave parts 39 and 39 are positioned on a further front side than the rear face 15 of the battery 1, the locking protruding portions 92*a* and 92*a* are positioned also on the front side to that extend, and the length of the charger 80 or the like in the front/rear direction is shortened, whereby the size of the charger 80 or the like can be decreased.

<Configuration and the Like of Identification Groove>

Next, the configuration and the like of the identification groove 30 will be described (see FIGS. 45 to 56).

Figure 45:
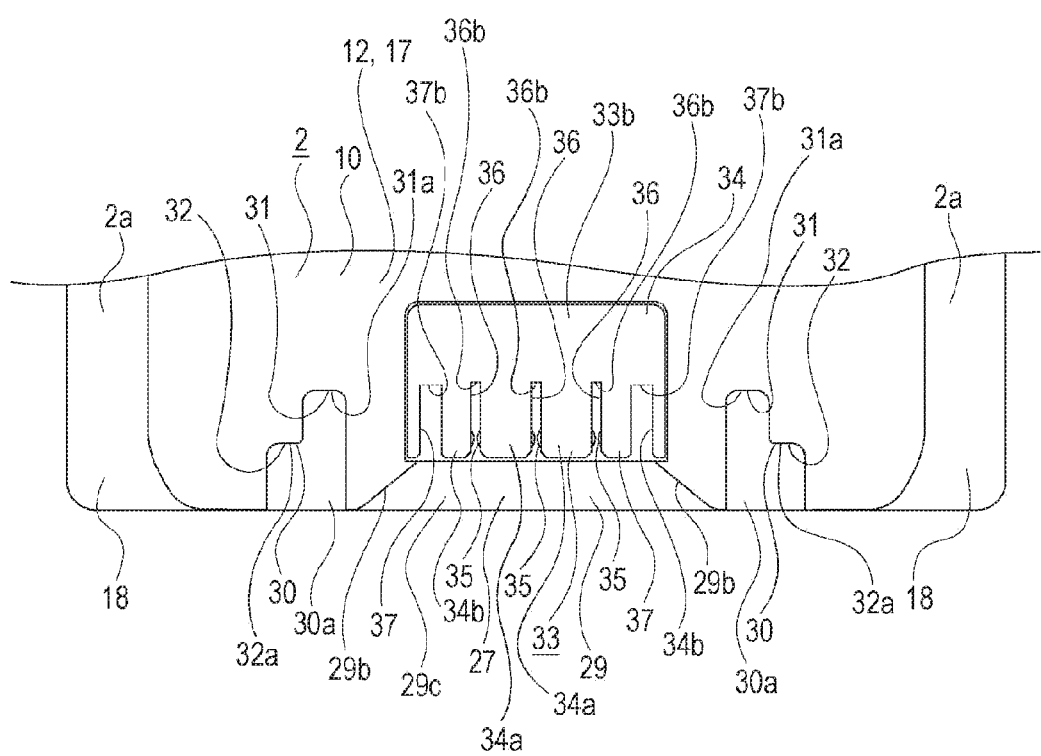
FIG. 45 is an enlarged bottom view that illustrates a front end portion of a battery.

The identification groove 30, as described above, is configured by a first identification part 31 and a second identification parts 32 having mutually different lengths in the front/rear direction, and the first identification part 31 and the second identification parts 32 are continuous in the horizontal direction (see FIG. 45 and an upper stage of FIG. 46). Each of the first identification part 31 and the second identification parts 32 has discernment.

Meanwhile, in a battery of related art, a first identification groove A corresponding to the first identification part 31 and a second identification groove B corresponding to the second identification parts 32 are formed having a predetermined gap therebetween to be spaced apart from each other in the horizontal direction (see a lower stage of FIG. 46).

Generally, the horizontal width of the identification groove is determined on the basis of the fluidity of a resin at the time of molding a casing, the grade of flame retardance, and the like.

In addition, the width of the identification groove is formed in a size for securing the strength of an identification protruding portion to be inserted into the identification groove. More specifically, in a case where the width of the identification groove is small, it is necessary to configure the width of the inserted identification protruding portion to be small. However, in a case where the width of the identification protruding portion is small, the strength of the identification protruding portion is lowered, and there is a high possibility that damage or a crack occurs. Accordingly, in order to secure the strength of the identification protruding portion to be predetermined strength or more, it is necessary to configure the width to be a predetermined width or more, and it is necessary to configure the width of the identification groove to be a predetermined width or more.

On the other hand, the horizontal width of the mounting concave part 83*a* of the charger 80 is larger than the horizontal width of the battery 1 by an amount corresponding to a margin (looseness) used for securing smooth insertion of the battery 1 into the mounting concave part 83*a*. Accordingly, as the width of the identification groove, a dimension corresponding to a margin used for reliably insertion of the identification protruding portion is necessary. In addition, the width of the identification groove is formed in a size considering a dimensional tolerance or an assembly tolerance of each portion, and the width of the identification groove is set to include such a margin. Furthermore, in a battery of related art, a predetermined gap H is formed between the first identification groove A and the second identification groove B, and a width of a predetermined dimension or more is necessary for securing the strength of the gap H to be predetermined strength or more.

Thus, when the width of the identification protruding portion to be inserted into each of the first identification groove A and the second identification groove B is W1 in a battery of related art, the width of each of the first identification groove A and the second identification groove B is "W1+C" wherein a margin (looseness+dimensional tolerance) is C. In addition, since a gap H between the first identification groove A and the second identification groove B is necessary, a horizontal dimension Wp that is necessary for the casing for forming the first identification groove A and the second identification groove B is "2W1+2C+H". Meanwhile, in the battery 1, the first identification part 31 corresponding to the first identification groove A and the second identification parts 32 corresponding to the second identification groove B are continuously formed in the horizontal direction (see an upper stage of FIG. 46). Accordingly, since the gap H is not necessary, a horizontal dimension W that is necessary in the casing 2 so as to form the identification groove 30 configured by the first identification part 31 and the second identification parts 32 is a dimension of "2W1+2C" or less.

In addition, in the identification groove 30, since the first identification part 31 and the second identification parts 32 are continuously formed in the horizontal direction, one margin C out of the margin 2C is not necessary for the dimension W, and the dimension W is a dimension of "2W1+C" or less.

Furthermore, since the identification protruding portion to be inserted into the second identification parts 32 having a shorter length may be partly inserted into the first identification part 31, the width of the second identification parts 32 can be configured to be less than the width W1, and, when the dimension that can be decreased is α, the dimension W is "2W1−α+C". Accordingly, the horizontal dimension W that is necessary for the casing 2 to form the identification groove 30 is decreased from the horizontal dimension Wp that is necessary in the casing of a battery of related art by "C+H+α", and the size of the battery 1 can be decreased by that amount.

Figure 47:
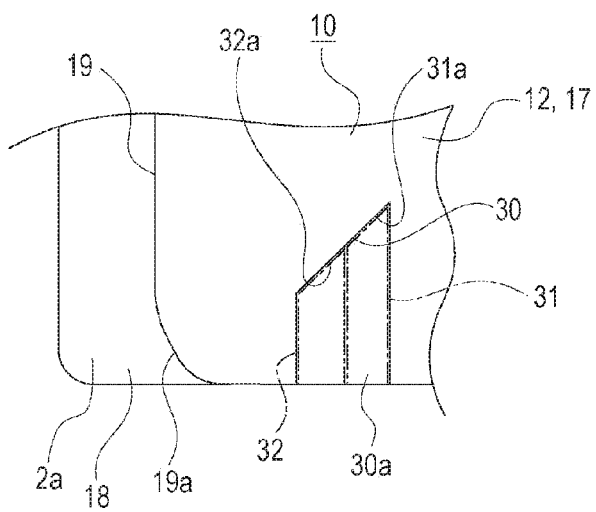
FIG. 47 is a conceptual diagram that illustrates an example of another shape of an identification groove.

In addition, in the description presented above, while an example has been illustrated in which the identification groove 30 is configured by the first identification part 31 and the second identification parts 32 each having a rectangular shape, the identification groove 30, for example, may be formed in a shape in which the inner bottom faces 31a and 32a incline (see FIG. 47). In the identification groove 30 having the shape in which the inner bottom faces 31a and 32a incline, a portion of one of the left and right sides is configured as the first identification part 31, and a portion of the other side is configured as the second identification parts 32. Since a level difference is not present in the identification groove 30 in which the inner bottom faces 31a and 32a incline, the identification groove 30 can be easily formed in the casing 2.

Figure 48:
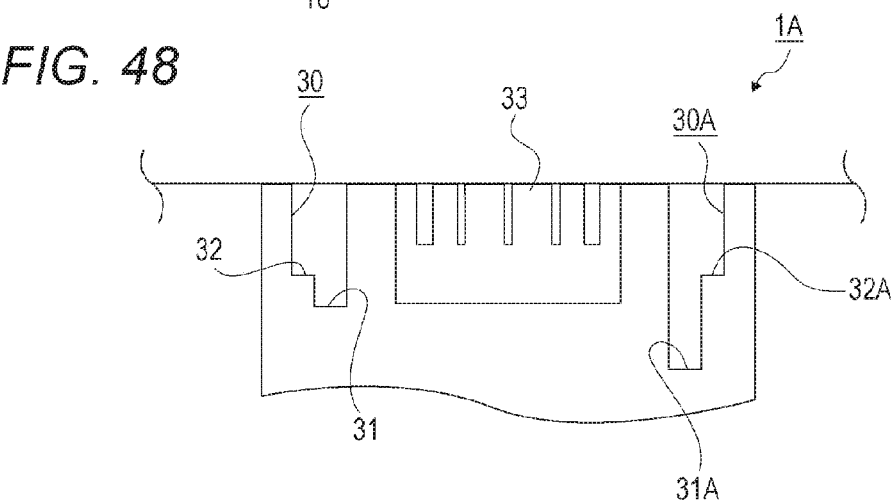
FIG. 48 is a bottom view that illustrates an identification groove and the like of a battery of a large capacity type.
Figure 49:
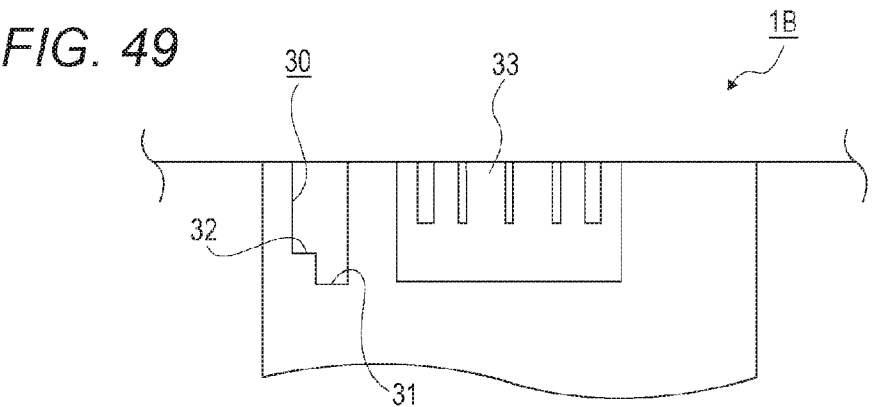
FIG. 49 is a bottom view that illustrates an identification groove and the like of a battery of a small capacity type.

Next, examples of batteries 1A and 1B having identification grooves different from those of the battery 1 will be described (see FIGS. 48 and 49).

As described above, in the battery 1, two identification grooves 30 and 30 are horizontally formed to be spaced apart from each other. For example, the battery 1 is a middle capacity type of which the maximum charging capacity is standard.

The battery 1A, for example, is a large capacity type of which the maximum charging capacity is larger than that of the battery 1. In the battery 1A, one identification groove 30 and one identification groove 30A are formed (see FIG. 48). The identification groove 30A is configured by a first identification part 31A longer than the first identification part 31 in the front/rear direction and the second identification parts 32. The battery 1B, for example, is a small capacity type of which the maximum charging capacity is smaller than that of the battery 1. In the battery 1B, one identification groove 30 is formed (see FIG. 49).

Next, configuration examples of the battery mounting unit of a connection apparatus to which the battery 1, the battery 1A or the battery 1B is mounted will be described (see FIGS. 50 to 53).

As the connection apparatuses, for example, there are a low power camera that can be driven by low power, a middle power camera that can be driven by power higher than that of the low power camera, a high power camera that can be driven by power higher than that of the middle power camera, and a charger 80.

Figure 50:
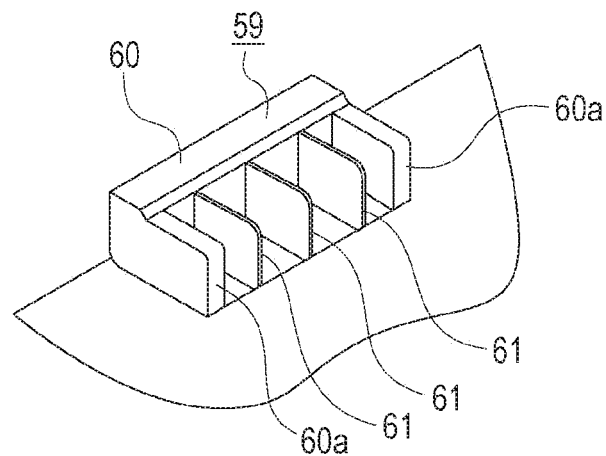
FIG. 50 is a perspective view that illustrates the configuration of a battery mounting unit of a low-power camera.

In a battery mounting unit of the low power camera, the terminal connecting unit 59 is arranged, but an identification protruding portion inserted into the identification groove 30 or the like is not arranged (see FIG. 50).

Figure 51:
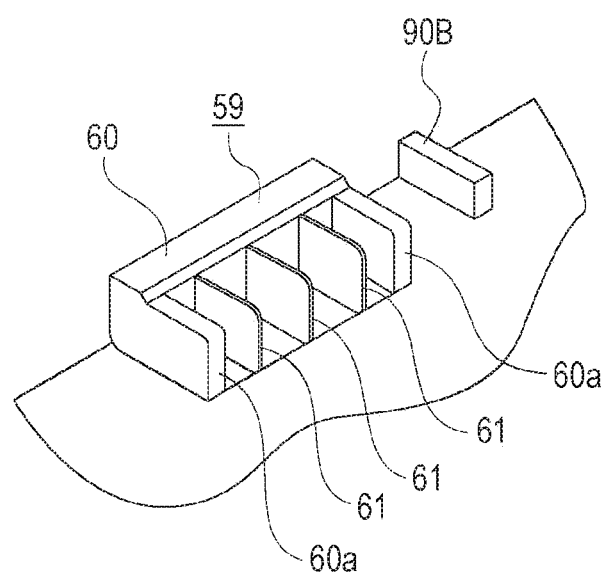
FIG. 51 is a perspective view that illustrates the configuration of a battery mounting unit of a middle-power camera.

In a battery mounting unit of the middle power camera, the terminal connecting unit 59 is arranged, and an identification protruding portion 90B is arranged on the lateral side of the terminal connecting unit 59 (see FIG. 51). The identification protruding portion 90B has such a length that the whole identification protruding portion 90B can be inserted into the first identification part 31 or the first identification part 31A.

Figure 52:
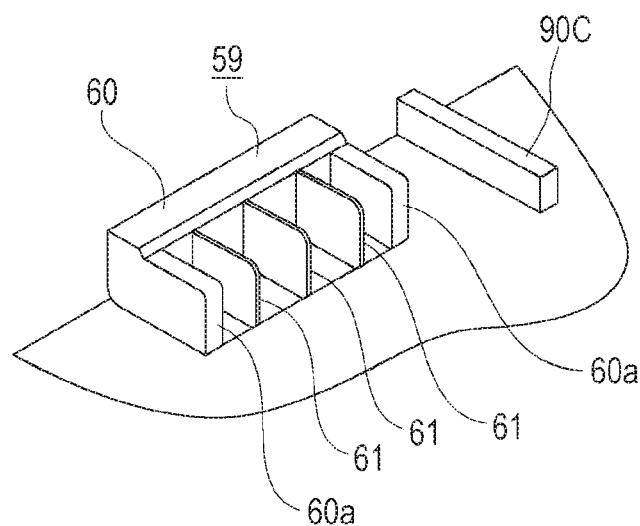
FIG. 52 is a perspective view that illustrates the configuration of a battery mounting unit of a high-power camera.

In a battery mounting unit of the high power camera, the terminal connecting unit 59 is arranged, and an identification protruding portion 90C is arranged on the lateral side of the terminal connecting unit 59 (see FIG. 52). The identification protruding portion 90C has a length longer than the identification protruding portion 90B and has such a length that the whole identification protruding portion 90C is not inserted into the first identification part 31, but the whole identification protruding portion can be inserted into the first identification part 31A.

Figure 53:
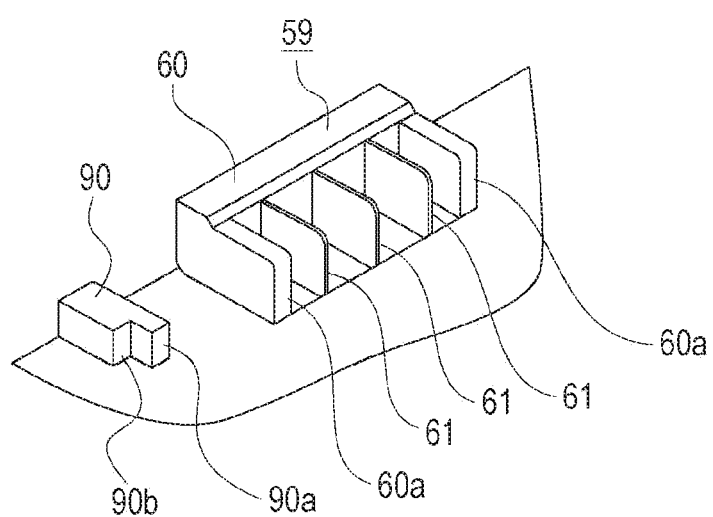
FIG. 53 is a perspective view that illustrates the configuration of a battery mounting unit of a charger.

In the battery mounting unit 83 of the charger 80, as described above, the terminal connecting unit 93 is arranged, and the identification protruding portion 90 is arranged on the lateral side of the terminal connecting unit 93 (see FIG. 53). The identification protruding portion 90 is configured by the long portion 90a and a short portion 90b.

Next, an example of the discriminability of the identification grooves 30 and 30A described above will be described (see FIG. 54).

Hereinafter, as an example, the discriminability of the battery 1, the battery 1A, and the battery 1B for the low power camera, the middle power camera, the high power camera, and the charger 80 will be described. In FIG. 54, "Y" represents that the battery is mountable in a camera or a charger, and "N" represents that the battery is not mountable in a camera or a charger.

The battery 1A of the large capacity type includes an identification groove 30 positioned on the left side and an identification groove 30A positioned on the right side.

The battery 1 of the middle capacity type includes identification grooves 30 and 30 positioned to be spaced apart from each other on the left and right sides. The battery 1B of the small capacity type includes one identification groove 30 positioned on the left side. The low power camera does not include an identification protruding portion in the battery mounting unit, and accordingly, portions to be inserted into the identification grooves 30 and 30A are not present. Accordingly, in the battery mounting unit of the low power camera, any one of the battery 1, the battery 1A, and the battery 1B can be installed, it is identified that any one of the battery 1, the battery 1A, and the battery 1B is a battery usable for the low power camera. The middle power camera includes the identification protruding portion 90C positioned on the right side in the battery mounting unit, and the identification protruding portion 90C can be inserted into any one of the first identification part 31 of the identification groove 30 and the first identification part 31A of the identification groove 30A. The identification protruding portion 90C is inserted into the first identification part 31 of the identification groove 30 positioned on the right side of the battery 1 and is inserted into the first identification part 31A of the identification groove 30A positioned on the right side of the battery 1A. On the other hand, since an identification groove is not formed on the right side of the battery 1B, the identification protruding portion 90C interferes with the battery 1B.

Accordingly, in the battery mounting unit of the middle power camera, while any one of the battery 1A and the battery 1 is mountable, the battery 1B is not mountable. Thus, it is identified that any one of the battery 1A and the battery 1 is a battery usable for the middle power camera, and it is identified that the battery 1B is a battery unusable for the middle power camera.

The high power camera includes the identification protruding portion 90B positioned on the right side of the battery mounting unit, and the identification protruding portion 90B can be inserted into the first identification part 31A of the identification groove 30A. The identification protruding portion 90B is inserted into the first identification part 31A of the identification groove 30A positioned on the right side of the battery 1A. However, while the identification protruding portion 90B can be inserted into the first identification part 31 of the identification groove 30 positioned on the right side of the battery 1 only up to the middle, and the electrode terminal 95 is not connected to the connection terminal 35 of the connector 33 of the battery 1. In addition, since an identification groove is not formed on the right side of the battery 1B, the identification protruding portion 90B interferes with the battery 1B.

Accordingly, in the battery mounting unit of the high power camera, while the battery 1A is mountable, the battery 1 and the battery 1B are not mountable. Thus, it is identified that the battery 1A is a battery usable for the high power camera, and it is identified that the battery 1 and the battery 1B are batteries that are not usable for the high power camera.

The charger 80 includes an identification protruding portion 90 positioned on the left side of the battery mounting unit 83, and the identification protruding portion 90 can be inserted into the identification groove 30. The identification protruding portion 90 is inserted into the identification groove 30 positioned on the left side of any one of the battery 1, the battery 1A, and the battery 1B.

Accordingly, in the battery mounting unit 83 of the charger 80, any one of the battery 1, the battery 1A, and the battery 1B is mountable, and it is identified that any one of the battery 1, the battery 1A, and the battery 1B is a battery usable for the charger 80.

In addition, in the description presented above, while an example relating to identification of a battery using a difference in the charging capacity is illustrated, the identification using the identification groove 30 and the like is not limited to the identification using a difference in the charging capacity but, for example, may be applied also to identification using any other difference such as a difference between a chargeable type and a non-chargeable type or a difference in charging speed or the like.

Further, in the description presented above, while an example of the identification groove 30 configured by two portions including the first identification part 31 and the second identification parts 32 having mutually-different lengths is illustrated, the identification groove 30 may be configured by three or more identification parts having mutually-different lengths.

As described above, in the battery 1 (the batteries 1A and 1B), the identification groove 30 used for identifying a connection apparatus is formed in the casing 2, and, in the identification groove 30, a plurality of identification parts having mutually-different lengths are continuously formed.

Thus, since portions dividing the plurality of identification parts having mutually-different lengths is not present, the size of the identification groove 30 in a direction in which the identification parts are continuous is the size acquired by summing the sizes of the plurality of identification parts, and the size of the battery 1 can be decreased while high discriminability is secured.

In addition, since the first identification part 31 and the second identification parts 32 are formed as identification parts, the size of the identification groove 30 in a direction in which the identification parts are continuous is a size acquired by summing the sizes of the first identification part 31 and the second identification parts 32, and the size of the battery 1 can be decreased while the discriminability is improved. Furthermore, since, in the identification groove 30, a plurality of identification parts are continuously formed in the widthwise direction, the size of the identification groove 30 in the widthwise direction is a size acquired by summing the sizes of the plurality of identification parts. Thus, the size of the battery 1 in the widthwise direction can be smaller than that of a case where the plurality of identification grooves are formed to be spaced apart from each other in the widthwise direction while the discriminability is improved.

In addition, the widths of the plurality of identification parts are configured to be smaller in order of the shortest to longest length. For example, for the first identification part 31 and the second identification parts 32, the width of the second identification parts 32 having a smaller length is configured to be smaller than the width of the first identification part 31 having a larger length.

Accordingly, the size of the identification groove 30 in the widthwise direction is smaller than a width acquired by summing the widths of a case where identification parts of a same width are formed. Therefore, the size of the battery 1 in the widthwise direction can be further decreased while the discriminability is improved.

In addition, since the two identification grooves 30 and 30 are formed to be spaced apart from each other in the widthwise direction, a connection apparatus can be identified using the two identification grooves 30 and 30, and accordingly, the number of types of connection apparatus that can be identified can be increased. Furthermore, in such a case, the shapes or the sizes of the two identification grooves 30 and 30 may be formed to be different from each other.

Figure 55:
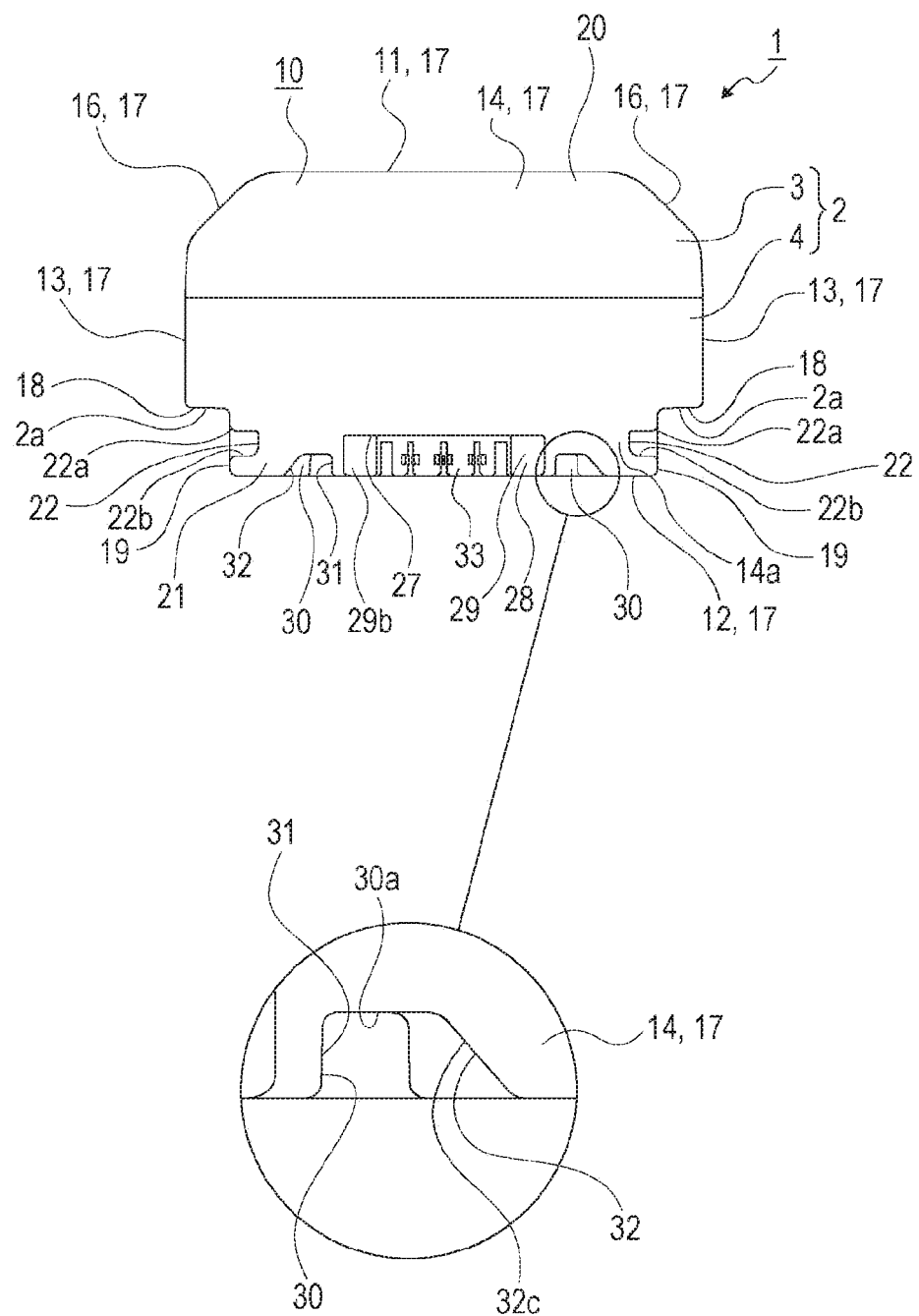
FIG. 55 is an enlarged front view that illustrates an example in which a second portion of an identification groove is formed in a different shape.

In addition, in the identification groove 30, the first identification part 31 and the second identification parts 32 may be formed in mutually-different shapes (see FIG. 55). In the identification groove 30, for example, the second identification parts 32 may be formed in a space of an approximately triangular prism shape. By forming the identification groove 30 in such a shape, a portion of the area of the second identification parts 32 in the inner bottom face 30a of the identification groove 30 is formed as an inclining face 32c. The inclining face 32c inclines to be displaced to the bottom face 12 side as approaching the side face 13 positioned on an opposite side of the first identification part 31 that is continuous in the horizontal direction.

The identification groove 30 is a portion formed near the first guided groove 22, and, by forming the identification groove 30 in such a shape, the thickness (width) of a portion between the first guided groove 22 of the casing 2 and the identification groove 30 is increased, and the peripheral portion of the first guided groove 22 can be reinforced.

Figure 56:
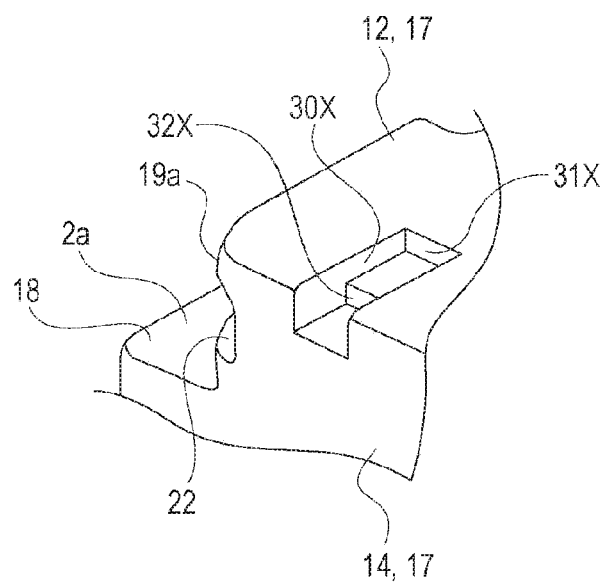
FIG. 56 is an enlarged perspective view that illustrates an example of an identification groove in which a first portion and a second portion are formed to be continuous in the vertical direction.

Further, in the description presented above, while the identification groove 30 in which the first identification part 31 and the second identification parts 32 having mutually-different lengths are continuous in the widthwise direction has been illustrated as an example, instead of the identification groove 30, an identification groove 30X may be formed (see FIG. 56). The identification groove 30X has a configuration in which a first identification part 31X and a second identification parts 32X having mutually-different sizes in the vertical direction (depth direction) are continuous, and, for example, the length of the first identification part 31X is larger than that of the second identification parts 32X, and the first identification part 31 is continuously formed on the lower side of the second identification parts 32.

In addition, similarly to the identification groove 30, the identification groove 30X may be configured by three or more identification parts having mutually-different lengths.

In this way, by forming a plurality of identification parts to be continuous in the depth direction, the size of the identification groove 30X in the depth direction is a size acquired by summing the sizes of the plurality of identification parts. Thus, the size of the battery 1 in the depth direction (vertical direction) can be smaller than that of a case where the plurality of identification grooves are formed to be spaced apart from each other in the depth direction while the discriminability is improved.

In addition, the depths of the plurality of identification parts of the identification groove 30X may be configured to be smaller in order of the shortest to longest length.

Accordingly, by configuring the identification groove 30X as such, the size of the identification groove 30X in the depth direction is smaller than a depth acquired by summing the depths of a case where identification parts of a same depth are formed. Therefore, the size of the battery 1 in the depth direction can be further decreased while the discriminability is improved.

Modified Example

Hereinafter, modified examples of each portion of the battery 1 will be described (see FIGS. 57 to 59).

Figure 57:
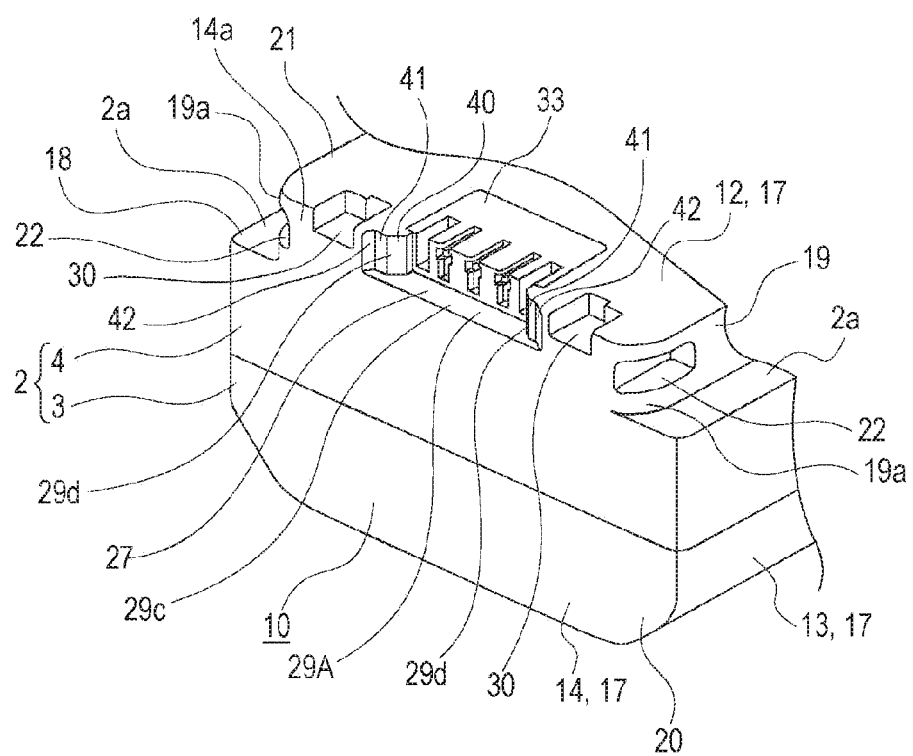
FIG. 57 is a perspective view that illustrates a different shape of a wall portion of a concave part forming face.
Figure 58:
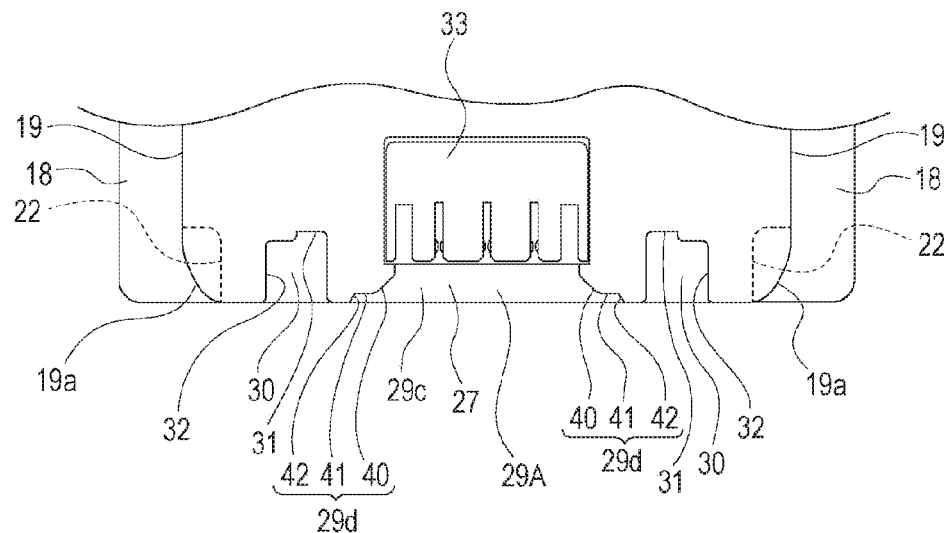
FIG. 58 is a bottom view that illustrates a different shape of a wall portion of a concave part forming face.

A first modified example is a modified example of the concave part forming face (see FIGS. 57 and 58). A concave part forming face 29A according to the first modified example includes wall portions 29*d* and 29*d*. The wall portions 29*d* and 29*d* are formed by first inclining faces 40 and 40 that are continuous from the base portion 29*a*, middle faces 41 and 41 that are continuous from the first inclining faces 40 and 40, and second inclining faces 42 and 42 that are continuous from the middle faces 41 and 41.

The first inclining faces 40 and 40 are continuous from the front end of the base portion 29*a* and incline in directions being spaced apart from each other in the horizontal direction toward the front side. The middle faces 41 and 41 are formed as faces that are continuous from the front ends of the first inclining faces 40 and 40 and face the front side. The second inclining faces 42 and 42 are continuous from the outer ends of the middle faces 41 and 41 in the horizontal direction and incline in directions being spaced apart from each other in the horizontal direction toward the front side. The inclination angle of the first inclining face 40 with respect to the middle face 41 is larger than the inclination angle of the second inclining face 42 with respect to the middle face 41. However, the inclination angle of the first inclining face 40 with respect to the middle face 41 may be configured to be smaller than the inclination angle of the second inclining face 42 with respect to the middle face 41 or may be the same as the inclination angle of the second inclining face 42 with respect to the middle face 41.

In addition, the width of the first inclining face 40 in the inclining direction is larger than the width of the second inclining face 42 in the inclining direction. However, the width of the first inclining face 40 in the inclining direction may be configured to be smaller than the width of the second inclining face 42 in the inclining direction or may be the same as the width of the second inclining face 42 in the inclining direction. By forming the concave part forming face 29A including the wall portions 29*d* and 29*d* described above, the front/rear depth of a portion disposed on the rear side of the wall portions 29*d* and 29*d* in the casing 2 is increased, whereby the strength of the casing 2 can be improved.

Figure 59:
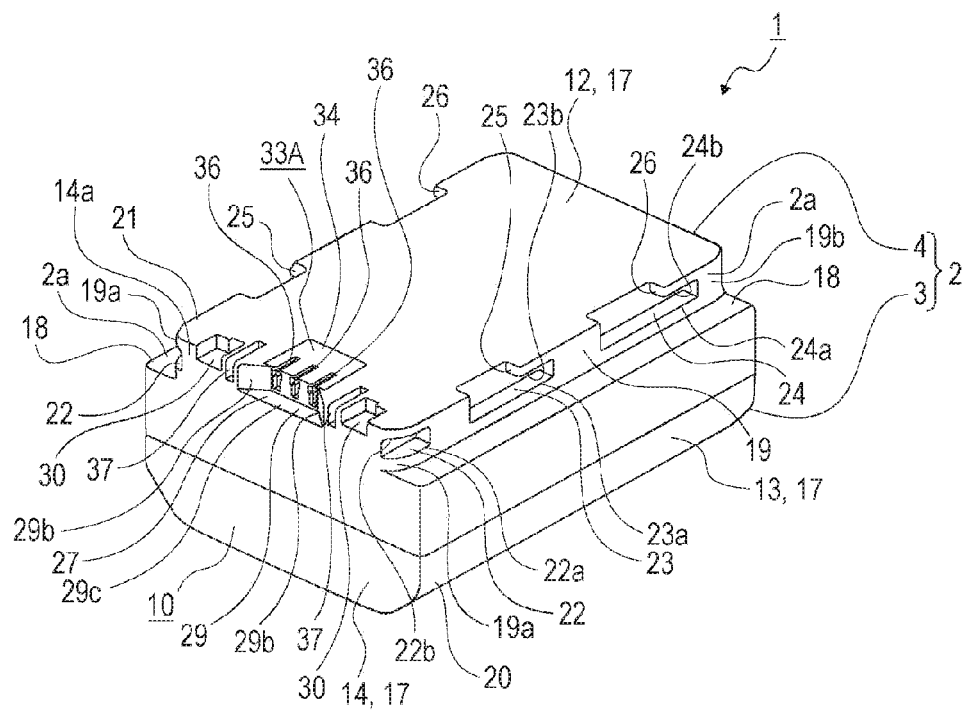
FIG. 59 is a perspective view that illustrates an example of a battery in which a positioning groove is formed in a casing.

A second modified example is a modified example of the connector (see FIG. 59). A connector 33A according to the second modified example includes a housing 34 formed using a non-conductive material and connection terminals 35, 35, and 35 formed using a conductive material. In the housing 34, while terminal arrangement grooves 36, 36, and 36 in which the connection terminals 35, 35, and 35 are arranged are formed, the positioning grooves 37 and 37 are not formed.

In each of the terminal arrangement grooves 36, 36, and 36, connection terminals 35, 35, and 35 functioning as a positive electrode terminal, a negative electrode terminal, and information terminals, respectively, are arranged. In addition, in the connector 33A, two terminal arrangement grooves 36 and 36 or four terminal arrangement grooves 36, 36, . . . may be formed. In a case where two terminal arrangement grooves 36 and 36 are formed in the connector 33A, a positive electrode terminal and a negative electrode terminal are arranged in the two terminal arrangement grooves 36 and 36, respectively. In a case where four terminal arrangement grooves 36, 36, . . . are formed in the connector 33A, a positive electrode terminal, a negative electrode terminal, an information terminal, and a communication terminal are arranged in the four terminal arrangement grooves 36, 36, . . . , respectively.

In a case where the connector 33A is used, positioning grooves 37 and 37 are formed on both left and right sides of the connector 33A in the casing 2.

By using the connector 33A as described above, the widths of portions disposed on both sides of the arrangement concave part 27 in the casing 2 in the horizontal direction are increased, whereby the strength of the casing 2 can be improved.

<Configuration of Another Battery>

The configuration of a battery 1C other than the battery 1 will be described (see FIGS. 60 and 61).

In addition, the battery 1C represented below is different from the battery 1 described above in that only the connector is not present, and the configurations of the other portions and a positional relation between the portions, and the sizes of the portions are similar to those of the battery 1. Thus, hereinafter, only portions different from those of the battery 1 will be described in detail, and same reference numerals assigned to similar portions of the battery 1 will be assigned to the other portions, and description thereof will not be presented.

Figure 60:
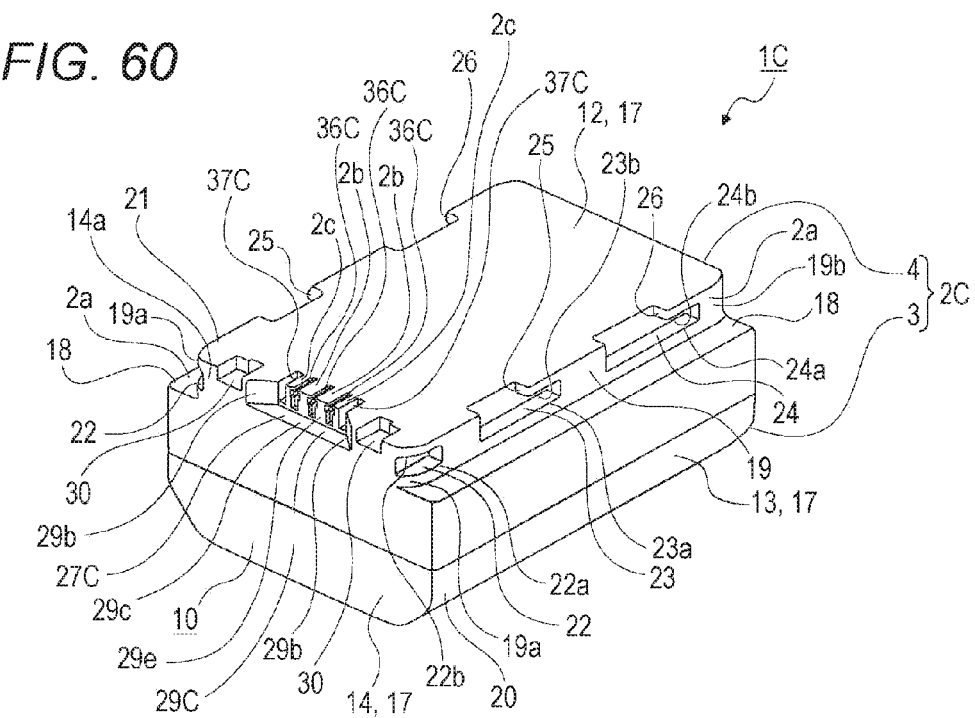
FIG. 60 is a perspective view that illustrates an example of a battery in which a terminal arrangement groove and a positioning groove are formed in a casing.

In the front end portion of a bottom part 21, a concave part 27C is formed (see FIG. 60). The concave part 27C is formed at approximate center in the horizontal direction and is open to the front side and the lower side.

The concave part 27C is formed by a concave part forming face 29C. The concave part forming face 29C is formed by a base portion 29e, wall portions 29b and 29b, and a middle portion 29c.

The base portion 29e is formed in a state facing the front side. The wall portions 29b and 29b are continuous from left and right both ends of the base portion 29e and are formed as inclining faces spaced apart from each other in the horizontal direction toward the front side. The middle portion 29c is formed between the lower edges of the wall portions 29b and 29b facing the lower side. In a portion continuous from the rear side of the concave part 27C in the casing 2C, terminal arrangement grooves 36C, 36C, and 36C are formed to be spaced apart from each other to the left and right sides. An opening, which is open to the lower side and the front side, of the front side of the terminal arrangement groove 36C is formed in the base portion 29e. The connection terminals 35, 35, and 35 are held by the casing 2C in a state in which at least parts thereof are arranged in the terminal arrangement grooves 36C, 36C, and 36C. In the battery 1C, a connector is not arranged, but the connection terminals 35, 35, and 35 are configured as terminal portions.

In the casing 2C, positioning grooves 37C and 37C that are open to the front side and the lower side are formed on the outer side of the terminal arrangement grooves 36C, 36C, and 36C in the horizontal direction.

In the casing 2C, portions between the terminal arrangement grooves 36C, 36C, and 36C are arranged as terminal separation ribs 2b and 2b, and portions between the terminal arrangement grooves 36C and 36C and the positioning grooves 37C and 37C in the casing 2C are arranged as inter-groove ribs 2c and 2c. The horizontal width of the terminal separation rib 2b is configured to be larger than the horizontal width of the inter-groove rib 2c so as to prevent a contact among the connection terminals 35, 35, and 35.

Figure 61:
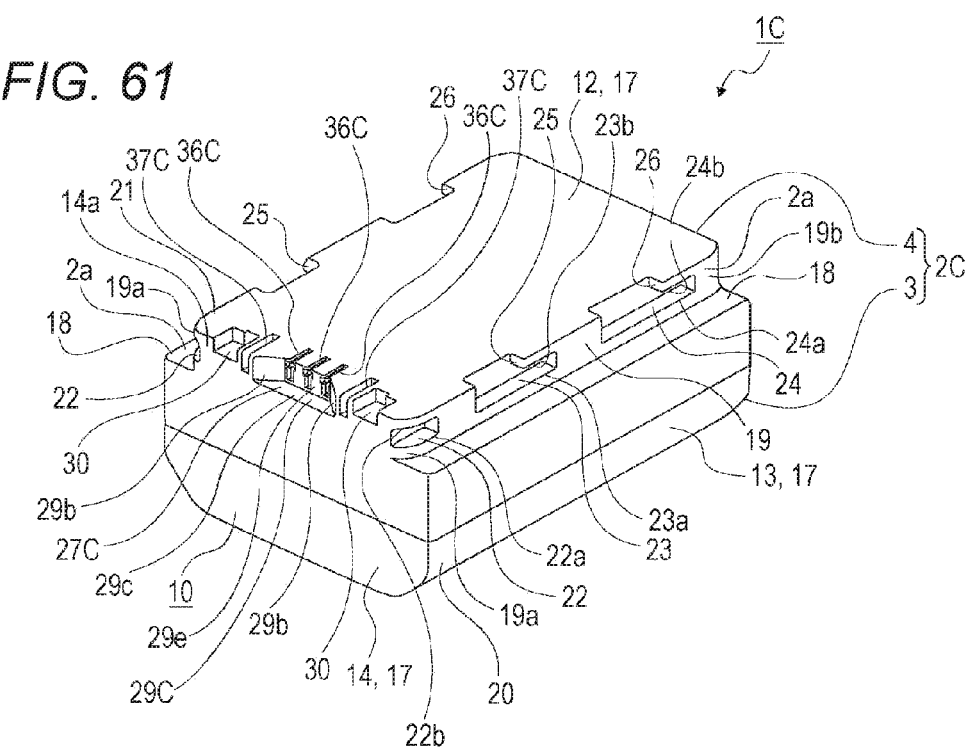
FIG. 61 is a perspective view that illustrates another example of a battery in which a terminal arrangement groove and a positioning groove are formed in a casing.

In addition, in the description presented above, while an example has been illustrated in which the positioning grooves 37C and 37C are formed at positions continuous from the concave part 27C, the positioning grooves 37C and 37C may be formed on left and right both sides of the concave part 27C in the casing 2C (see FIG. 61).

In addition, in the battery 1C, similarly to the battery 1, two terminal arrangement grooves 36C and 36C or four terminal arrangement grooves 36C, 36C, . . . may be formed. As described above, in the battery 1C, since a connector is not arranged, and the terminal arrangement groove 36C and the positioning groove 37C are formed in the casing 2C, the manufacturing cost can be reduced according to the simplification of the structure and a decrease in the number of components.

<Present Technology>

The present technology may have the following configurations.

(1) A battery including: a casing that includes a plurality of exterior faces having outer faces facing mutually-different directions and has an arrangement concave part formed; a cell that is housed inside the casing; and a connector that includes a connection terminal connected to an electrode terminal of a connection apparatus and is arranged in the arrangement concave part, wherein a face forming the arrangement concave part of the casing is formed as a concave part forming face, and the concave part forming face is present between the exterior faces and the connector.

(2) The battery described in (1) described above, wherein the arrangement concave part is open at least in a connection direction of the connection terminal and the electrode terminal, and the concave part forming face is present between the exterior faces and the connector in the connection direction.

(3) The battery described in (1) described above, wherein the arrangement concave part is open in two orthogonal directions, and the concave part forming face is present between the exterior faces and the connector in each of the two directions.

(4) The battery described in (2) or (3) described above wherein a part of the concave part forming face is formed in an inclining face in which an opening area of the arrangement concave part increases as being further spaced apart from the connector in the opening direction of the arrangement concave part.

(5) The battery described in (4) described above, wherein the concave part forming face includes one pair of wall portions positioned to be spaced apart from each other in a direction orthogonal to the connection direction, and the one pair of wall portions is formed as inclining faces further spaced apart from each other as being further spaced apart from the connector in the connection direction.

(6) The battery described in (5) described above, wherein the concave part forming face includes a middle portion between the one pair of wall portions, and the middle portion is formed in an inclining face in which the opening area of the arrangement concave part increases as being further spaced apart from the connector in the connection direction.

(7) The battery described in any one of (4) to (6) described above, wherein an inclination angle of the concave part forming face with respect to the connection direction is larger than 0 degrees and equal to or smaller than 45 degrees.

(8) A connection apparatus to which a battery is detachably attached, the battery including a casing that includes a plurality of exterior faces having outer faces facing mutually-different directions and has an arrangement concave part formed, a cell that is housed inside the casing, and a connector that includes a connection terminal connected to an electrode terminal and is arranged in the arrangement concave part, wherein, in the battery, a face forming the arrangement concave part of the casing is formed as a concave part forming face, and the concave part forming face is present between the exterior faces and the connector.

(9) A battery including: a casing that includes a front portion and a rear portion arranged in a longitudinal direction, a right portion and a left portion arranged between the front portion and the rear portion in a widthwise direction orthogonal to the longitudinal direction, and a top portion and a bottom portion arranged between the front portion and the rear portion and the right portion and the left portion in a height direction orthogonal to both the longitudinal direction and the widthwise direction; a cell that is housed inside the casing; and connection terminals including a positive electrode terminal and a negative electrode terminal that are arranged in a terminal arrangement groove formed on a front end side of the casing and are connected to electrode terminals of a connection apparatus, wherein a front end of at least one of the positive electrode terminal and the negative electrode terminal is positioned on a further rear side than a front end of the front portion.

(10) The battery described in (9) described above, wherein a concave part, in which at least a part of the electrode terminals is arranged, continuous from the terminal arrangement groove is formed in the casing in a state in which the positive electrode terminal and the negative electrode terminal are connected to the electrode terminals, the concave part is open at least in a connection direction of the connection terminals and the electrode terminals, and a concave part forming face forming the concave part is present between an outer face of the casing and the terminal arrangement groove in the connection direction.

(11) The battery described in (9) described above, wherein a concave part, in which at least a part of the electrode terminals is arranged, continuous from the terminal arrangement groove is formed in the casing in a state in which the positive electrode terminal and the negative electrode terminal are connected to the electrode terminals, the concave part is open in two orthogonal directions, and a concave part forming face that is a face forming the concave part is present between an outer face of the casing and the terminal arrangement groove in each of the two directions.

(12) The battery described in (10) or (11) described above, wherein a part of the concave part forming face is formed in an inclining face in which an opening area of the concave part increases as being further spaced apart from the terminal arrangement groove in the opening direction of the concave part.

(13) The battery described in (12) described above, wherein the concave part forming face includes one pair of wall portions positioned to be spaced apart from each other in a direction orthogonal to the connection direction, and the one pair of wall portions is formed as inclining faces further spaced apart from each other as being further spaced apart from the terminal arrangement groove in the connection direction.

(14) The battery described in (13) described above, wherein the concave part forming face includes a middle portion between the one pair of wall portions, and the middle portion is formed in an inclining face in which the opening area of the concave part increases as being further spaced apart from the terminal arrangement groove in the connection direction.

(15) The battery described in any one of (12) to (14) described above, wherein an inclination angle of the concave part forming face with respect to the connection direction is larger than 0 degrees and equal to or smaller than 45 degrees.

(16) A connection apparatus to which a battery is detachably attached, the battery including a casing that includes a front portion and a rear portion arranged in a longitudinal direction, a right portion and a left portion arranged between the front portion and the rear portion in a widthwise direction orthogonal to the longitudinal direction, and a top portion and a bottom portion arranged between the front portion and the rear portion and the right portion and the left portion in a height direction orthogonal to both the longitudinal direction and the widthwise direction, a cell that is housed inside the casing, and a positive electrode terminal and a negative electrode terminal that are arranged in a terminal arrangement groove formed on a front end side of the casing and are connected to electrode terminals, wherein, in the battery, a front end of at least one of the positive electrode terminal and the negative electrode terminal is positioned on a further rear side than a front end of the front portion. It should be understood by those skilled in the art that various modifications, combinations, sub-combinations and alterations may occur depending on design requirements and other factors insofar as they are within the scope of the appended claims or the equivalents thereof.

REFERENCE SIGNS LIST

1 Battery
2 Casing
6 Cell
10 Outer face
17 Exterior face
27 Arrangement concave part
29 Concave part forming face
29b Wall portion
29c Middle portion
33 Connector
35 Connection terminal
36 Terminal arrangement groove
50 Imaging apparatus (connection apparatus)
61 Electrode terminal
80 Charger (connection apparatus)
95 Electrode terminal
80A Charger (connection apparatus)
80B Charger (connection apparatus)
1A Battery
1B Battery
29X Concave part forming face
29d Wall portion
33A Connector
1C Battery
2C Casing
27C Concave part
29C Concave part forming face
36C Terminal arrangement groove
37C Positioning groove

The invention claimed is:

1. A battery comprising:
a casing including a concave portion and a plurality of exterior surfaces,
the plurality of exterior surfaces including a front surface and a rear surface positioned on opposite sides of the casing, and a first side surface and a second side surface positioned on other opposite sides of the casing and orthogonal to the front surface and the rear surface;
a battery cell that is housed inside the casing; and
a connector including a connection terminal configured to be connected to an electrode terminal of a connection apparatus,
wherein the concave portion includes an opening defined by a first wall portion and a second wall portion, the first wall portion being inclined towards the first side surface, the second wall portion being inclined towards the second side surface, such that the first wall portion and the second wall portion extend to an outermost edge of the front surface, the opening of the concave portion extends from the connector to the outermost edge of the front surface and is continuously wider from the connector to the outermost edge of the front surface.

2. The battery according to claim 1,
wherein the concave portion is open at least in a connection direction of the connection terminal and the electrode terminal.

3. The battery according to claim 2, wherein the first wall forming face and the second wall forming face of the concave portion are formed in an inclining surface in which an opening area of the concave portion increases as being further spaced apart from the connector in the opening direction of the concave portion.

4. The battery according to claim 3, wherein the concave portion includes a middle portion between the first wall forming face and the second wall forming face, and the middle portion is formed in an inclining surface in which the opening area of the concave portion increases as being further spaced apart from the connector in the connection direction.

5. The battery according to claim 3, wherein an inclination angle of the concave portion with respect to the connection direction is larger than 0 degrees and equal to or smaller than 45 degrees.

6. The battery according to claim 1, wherein the concave portion is open in two orthogonal directions, and the first wall forming face and the second wall forming face are present between the exterior surfaces and the connector in each of the two directions.

7. A connection apparatus to which a battery is detachably attached, the battery including a casing including a concave portion and a plurality of exterior surfaces, the plurality of exterior surfaces including a front surface and a rear surface positioned on opposite sides of the casing, and a first side surface and a second side surface positioned on other opposite sides of the casing and orthogonal to the front surface and the rear surface, a battery cell that is housed inside the casing, and a connector including a connection terminal configured to be connected to an electrode terminal, wherein the concave portion includes an opening defined by a first wall portion and a second wall portion, the first wall portion being inclined towards the first side surface, the second wall portion being inclined towards the second side surface, such that the first wall portion and the second wall portion extend to an outermost edge of the front surface, the opening of the concave portion extends from the connector to the outermost edge of the front surface and is continuously wider from the connector to the outermost edge of the front surface.

8. A battery comprising:

a casing including a concave portion and a plurality of exterior surfaces, the plurality of exterior surfaces including a front surface and a rear surface arranged in a longitudinal direction, a first side surface and a second side surface arranged between the front surface and the rear surface in a widthwise direction orthogonal to the longitudinal direction, and a top surface and a bottom surface arranged between the front surface and the rear surface and the first side surface and the second side surface in a height direction orthogonal to both the longitudinal direction and the widthwise direction;

a battery cell that is housed inside the casing; and connection terminals including a positive electrode terminal and a negative electrode terminal that are arranged in a terminal arrangement groove configured for connection to electrode terminals of a connection apparatus, wherein the concave portion includes an opening defined by a first wall portion and a second wall portion, the first wall portion being inclined towards the first side surface, the second wall portion being inclined towards the second side surface, such that the first wall portion and the second wall portion extend to an outermost edge of the front surface, the opening of the concave portion extends from the terminal arrangement groove to the outermost edge of the front surface and is continuously wider from the connector to the outermost edge of the front surface.

9. The battery according to claim 8, wherein the concave part is open at least in a connection direction of the connection terminals and the electrode terminals.

10. The battery according to claim 9, wherein the concave portion includes a middle portion between the first wall forming face and the second wall forming face, and the middle portion is formed in an inclining surface in which the opening area of the concave part increases as being further spaced apart from the terminal arrangement groove in the connection direction.

11. The battery according to claim 9, wherein an inclination angle of the concave portion with respect to the connection direction is larger than 0 degrees and equal to or smaller than 45 degrees.

12. The battery according to claim 8, wherein the concave part is open in two orthogonal directions.

13. A connection apparatus to which a battery is detachably attached, the battery including a casing that includes a concave portion and a plurality of exterior surfaces, the plurality of exterior surfaces including a front surface and a rear surface arranged in a longitudinal direction, a first side surface and a second side surface arranged between the front surface and the rear surface in a widthwise direction orthogonal to the longitudinal direction, and a top surface and a bottom surface arranged between the front surface and the rear surface and the first side surface and the second side surface in a height direction orthogonal to both the longitudinal direction and the widthwise direction, a cell that is housed inside the casing, and a positive electrode terminal and a negative electrode terminal that are arranged in a terminal arrangement groove and are connected to electrode terminals, wherein the concave portion includes an opening defined by a first wall portion and a second wall portion, the first wall portion being inclined towards the first side surface, the second wall portion being inclined towards the second side surface, such that the first wall portion and the second wall portion extend to an outermost edge of the front surface, the opening of the concave portion extends from the terminal arrangement groove to the outermost edge of the front surface and is continuously wider from the connector to the outermost edge of the front surface.

* * * * *